(12) United States Patent
Keller et al.

(10) Patent No.: US 7,495,664 B2
(45) Date of Patent: Feb. 24, 2009

(54) INSTANT RAY TRACING

(75) Inventors: Alexander Keller, Ulm (DE); Carsten Waechter, Ulm (DE)

(73) Assignee: Mental Images GmbH, Berlin (DE)

( * ) Notice: Subject to any disclaimer, the term of this patent is extended or adjusted under 35 U.S.C. 154(b) by 0 days.

(21) Appl. No.: 11/737,424

(22) Filed: Apr. 19, 2007

(65) Prior Publication Data

US 2008/0043018 A1 Feb. 21, 2008

Related U.S. Application Data

(63) Continuation-in-part of application No. 11/474,517, filed on Jun. 23, 2006, and a continuation-in-part of application No. 10/299,574, filed on Nov. 19, 2002, now Pat. No. 7,184,042, which is a continuation-in-part of application No. 09/884,861, filed on Jun. 19, 2001, now Pat. No. 7,227,547.

(60) Provisional application No. 60/793,063, filed on Apr. 19, 2006, provisional application No. 60/693,231, filed on Jun. 23, 2005, provisional application No. 60/265,934, filed on Feb. 1, 2001, provisional application No. 60/212,286, filed on Jun. 19, 2000.

(51) Int. Cl.
*G06T 15/50* (2006.01)

(52) U.S. Cl. ............................................. 345/426

(58) Field of Classification Search ............... None
See application file for complete search history.

(56) References Cited

U.S. PATENT DOCUMENTS

| | | | |
|---|---|---|---|
| 5,933,146 A * | 8/1999 | Wrigley | 345/420 |
| 6,028,606 A | 2/2000 | Kolb | |
| 6,300,965 B1 * | 10/2001 | Sowizral et al. | 345/622 |
| 6,529,193 B1 | 3/2003 | Herken | |
| 6,587,110 B1 * | 7/2003 | Kunimatsu et al. | 345/502 |
| 6,597,359 B1 * | 7/2003 | Lathrop | 345/440 |
| 6,762,756 B2 | 7/2004 | Lewis | |
| 6,825,839 B2 | 11/2004 | Huang | |
| 7,002,571 B2 * | 2/2006 | Lake et al. | 345/420 |
| 7,042,448 B2 * | 5/2006 | Kunimatsu et al. | 345/419 |
| 7,164,420 B2 * | 1/2007 | Ard | 345/423 |
| 2003/0160776 A1 | 8/2003 | Sowrizal | |
| 2004/0125103 A1 | 7/2004 | Kaufman | |
| 2005/0264565 A1 | 12/2005 | Keller | |

OTHER PUBLICATIONS

Vlastimil Havran, "Heurisitic Ray Shooting," Nov. 2000, Ph.D. Thesis, Czech Technical University, Prague, Chapter 4, p. 49-92 [retrieved on Oct. 27, 2007]. Retrieved from the Internet: <URL:http:// http://www.cgg.cvut.cz/u/havran/DISSVH/dissvh.pdf>.*

* cited by examiner

*Primary Examiner*—Ulka Chauhan
*Assistant Examiner*—Jason M Repko
(74) *Attorney, Agent, or Firm*—Jacobs & Kim LLP; David Jacobs

(57) ABSTRACT

Methods, systems, devices and computer program products operable in a computer graphics system include constructing a hierarchical ray tracing acceleration data structure comprising a tree structure, the nodes of which are generated utilizing a bounding interval hierarchy based on defining an axis-aligned scene bounding box and two parallel planes to partition a set of objects in a sense into left objects and right objects, and matching split planes to object bounding boxes. The two planes are perpendicular to a selected one of x, y, or z-axes. Given a splitting plane, each object in an image is classified either left or right based on a left/right selection criterion, and two splitting plane values of the child modes are determined by the maximum and minimum coordinate of the left and right objects, respectively.

20 Claims, 50 Drawing Sheets

```
void Triangle::Transfers()
{
    Point *p = (Point *)this;

Vector n3d;
    Vector n_abs = n3d = (p[1]-p[0])|(p[2]-p[0]);

// search largest component for projection (0=x,1=y,2=z)
    uintCast(n_abs.dx) &= 0x7FFFFFFF;
    uintCast(n_abs.dy) &= 0x7FFFFFFF;
    uintCast(n_abs.dz) &= 0x7FFFFFFF;

// Degenerated Triangles must be handled (set edge-signs)
    if(!((n_abs.dx+n_abs.dy+n_abs.dz) > DEGEN_TRI_EPSILON))
    //(!(...) > EPS) to handle NaN's
    {
        d    =  p[0].x;
        p0.u = -p[0].y;
        p0.v = -p[0].z;
        n.u=n.v = 0.0f;
        e[0].u = e[1].u = e[0].v = e[1].v = 1.0f;

return;
    }

U32 axis = 2;
    if(n_abs.dx > n_abs.dy)
    {
        if(n_abs.dx > n_abs.dz)
            axis = 0;
    }
    else if(n_abs.dy > n_abs.dz)
        axis = 1;

Point p03d = p[0];
    Point p13d = p[1];
    Point p23d = p[2];

float t_inv = 2.0f/n3d[axis];

e[0].u = (p23d[PlusOneMod3[axis]]-p03d[PlusOneMod3[axis]])*t_inv;
    e[0].v = (p23d[PlusOneMod3[axis+1]]-p03d[PlusOneMod3[axis+1]])*t_inv;

e[1].u = (p13d[PlusOneMod3[axis]]-p03d[PlusOneMod3[axis]])*t_inv;
    e[1].v = (p13d[PlusOneMod3[axis+1]]-p03d[PlusOneMod3[axis+1]])*t_inv;

t_inv *= 0.5f;

n.u = n3d[PlusOneMod3[axis]]   *t_inv;
    n.v = n3d[PlusOneMod3[axis+1]]*t_inv;

p0.u = -p03d[PlusOneMod3[axis]];
    p0.v = -p03d[PlusOneMod3[axis+1]];

d = p03d[axis] + n.u*p03d[PlusOneMod3[axis]] + n.v*p03d[PlusOneMod3[axis+1]];
}
```

```
U32 *idx = pointer_to_face_indices;
U32 ofs = projection_case;

for(U32 ii = num_triData; ii; ii--,idx++)
{
    float t = (triData[*idx].d - ray.from[ofs]
                - triData[*idx].n.u*ray.from[PlusOneMod3[ofs]]
                - triData[*idx].n.v*ray.from[PlusOneMod3[ofs+1]])
            / (ray.d[ofs] + triData[*idx].n.u*ray.d[PlusOneMod3[ofs]]
                          + triData[*idx].n.v*ray.d[PlusOneMod3[ofs+1]]);

if(uintCast(t)-1 > uintCast(result.tfar)) //-1 for +0.0f
        continue;

float h1 = t*ray.d[PlusOneMod3[ofs]]   + ray.from[PlusOneMod3[ofs]]
                                           + triData[*idx].p0.u;
    float h2 = t*ray.d[PlusOneMod3[ofs+1]] + ray.from[PlusOneMod3[ofs+1]]
                                           + triData[*idx].p0.v;

float u = h1*triData[*idx].e[0].v - h2*triData[*idx].e[0].u;
    float v = h2*triData[*idx].e[1].u - h1*triData[*idx].e[1].v;
    float uv = u+v;
    if((uintCast(u) | uintCast(v) | uintCast(uv)) > 0x40000000)
        continue;

result.tfar = t;
    result.tri_index = *idx;
}
```

```c
Point *p = (Point *)&triData[tri_index];
int boxMinIdx, boxMaxIdx;

// boxMinIdx and boxMaxIdx index the smallest and largest vertex of the triangle
// in the component dir[0] of the split plane if(p[0][dir[0]] < p[1][dir[0]])
{
    if(p[2][dir[0]] < p[0][dir[0]])
    {
        boxMinIdx = 2;
        boxMaxIdx = 1;
    }
    else
    {
        boxMinIdx = 0;
        boxMaxIdx = p[2][dir[0]] < p[1][dir[0]] ? 1 : 2;
    }
}
else
{
    if(p[2][dir[0]] < p[1][dir[0]])
    {
        boxMinIdx = 2;
        boxMaxIdx = 0;
    }
    else
    {
        boxMinIdx = 1;
        boxMaxIdx = p[2][dir[0]] < p[0][dir[0]] ? 0 : 2;
    }
}

/* If the triangle is in the split plane or completely on one side of the split plane
   is decided without any numerical errors, i.e. at the precision the triangle is
   entered to the rendering system. Using epsilons here is wrong and not necessary.
*/ if((p[boxMinIdx][dir[0]] == split) && (p[boxMaxIdx][dir[0]] == split))  // in split plane ?
{
    on_splitItems++;

if(split < middle_split)            // put to smaller volume
        left_num_divItems++;
    else
    {
        unsorted_border--;
        U32 t = itemsList[unsorted_border];
        right_num_divItems--;
        itemsList[right_num_divItems] = itemsList[left_num_divItems];
        itemsList[left_num_divItems] = t;
    }
}
else if(p[boxMaxIdx][dir[0]] <= split)   // triangle completely left ?
    left_num_divItems++;
else if(p[boxMinIdx][dir[0]] >= split)   // triangle completely right ?
{
    unsorted_border--;
    U32 t = itemsList[unsorted_border];
```

```
        right_num_divItems--;
        itemsList[right_num_divItems] = itemsList[left_num_divItems];
        itemsList[left_num_divItems] = t;
    }
else
// and now detailed decision, triangle must intersect split plane ...
{
    /* In the sequel we determine whether a triangle should go left and/or right, where
       we already know that it must intersect the split plane in a line segment.

All computations are ordered so that the more precise computations are done
       first. Scalar products and cross products are evaluated last.
       In some situations it may be necessary to expand the bounding box by
       an epsilon. This, however, will blow up the required memory by large amounts.
       If such a situation is encountered, it may be better to analyze it numerically
       in order not to use any epsilons...

Arriving here we know that p[boxMaxIdx][dir[0]] < split < p[boxMaxIdx][dir[0]]
       and that p[boxMidIdx][dir[0]] \in [p[boxMaxIdx][dir[0]], p[boxMaxIdx][dir[0]]].
       We also know, that the triangle has a non-empty intersection with the current
       voxel. The triangle also cannot lie in the split plane, and its vertices cannot
       lie on one side only.
    */ int boxMidIdx = 3 - boxMaxIdx - boxMinIdx; // missing index, found by 3 = 0 + 1 + 2

/* We now determine the vertex that is alone on one side of the split plane.
       Depending on whether the lonely vertex is on the left or right side,
       we have to later swap the decision, whether the
       triangle should be going to the left or right.
    */ int Alone    = (split < p[boxMidIdx][dir[0]]) ? boxMinIdx : boxMaxIdx;
    int NotAlone = 3 - Alone - boxMidIdx;
    // == (split < p[boxMidIdx][dir[0]]) ? boxMaxIdx : boxMinIdx;
    // since sum of idx = 3 = 0 + 1 + 2 float dist = split - p[Alone][dir[0]];
    U32 swapLR = uintCast(dist)>>31; // == p[Alone][dir[0]] > split;

/* Now the line segments connecting the lonely vertex with the remaining two vertices
       are intersected with the split plane. a1 and a2 are the intersection points.

The special case "if(p[boxMidIdx][dir[0]] == split)" [yields a x / x, which could
       be optimized] does not help at all since it only can happen as often as the highest
       valence of a vertex of the mesh is...
    */ float at  = dist / (p[boxMidIdx][dir[0]] - p[Alone][dir[0]]);
    float at2 = dist / (p[NotAlone][dir[0]] - p[Alone][dir[0]]);

float a1x = (p[boxMidIdx][dir[1]] - p[Alone][dir[1]]) * at;
    float a1y = (p[boxMidIdx][dir[2]] - p[Alone][dir[2]]) * at;

float a2x = (p[NotAlone][dir[1]] - p[Alone][dir[1]]) * at2;
    float a2y = (p[NotAlone][dir[2]] - p[Alone][dir[2]]) * at2;
```

```
// n is a vector normal to the line of intersection a1a2 of the triangle
// and the split plane float nx = a2y - a1y;
float ny = a2x - a1x;

// The signs indicate the quadrant of the vector normal to the intersection line U32 nxs = uintCast(nx)>>31; // == (nx < 0.0f)
U32 nys = uintCast(ny)>>31; // == (ny < 0.0f)

/* Numerical precision: Due to cancellation, floats of approximately same exponent
   should be subtracted first, before adding something of a different order of
   magnitude. All brackets in the sequel are ESSENTIAL for numerical precision.
   Change them and you will see more errors in the BSP...

pMin is the lonely point in the coordinate system with the origin at
        bBox.bMinMax[0]
   pMax is the lonely point in the coordinate system with the origin at
        bBox.bMinMax[1]
*/ float pMinx = p[Alone][dir[1]] - bBox.bMinMax[0][dir[1]];
float pMiny = p[Alone][dir[2]] - bBox.bMinMax[0][dir[2]];
float pMaxx = p[Alone][dir[1]] - bBox.bMinMax[1][dir[1]];
float pMaxy = p[Alone][dir[2]] - bBox.bMinMax[1][dir[2]];

// Determine coordinates of the bounding box, however, with respect to p + a1 being the origin.

float boxx[2];
float boxy[2];
boxx[0] = (pMinx + a1x) * nx;
boxy[0] = (pMiny + a1y) * ny;
boxx[1] = (pMaxx + a1x) * nx;
boxy[1] = (pMaxy + a1y) * ny;

/* Test, whether line of intersection of the triangle and the split plane passes by the
   bounding box. This is done by indexing the coordinates of the bounding box by the
   quadrant of the vector normal to the line of intersection. In fact this is
   the nifty implementation of the 2d test introduced by in the book with Haines:
   "Real-Time Rendering"
   By the indexing the vertices are selected, which are farthest from the line.

Note that the triangle CANNOT completely pass the current voxel, since it must have
   a nonempty intersection with it.
*/

U32 resultS;

if(pMinx + MAX(a1x,a2x) < 0.0f)        // line segment of intersection a1a2 left of box
    resultS = uintCast(pMinx)>>31;
else if(pMiny + MAX(a1y,a2y) < 0.0f)   // line segment of intersection a1a2 below box
    resultS = uintCast(pMiny)>>31;
else if(pMaxx + MIN(a1x,a2x) > 0.0f)   // line segment of intersection a1a2 right of box
    resultS = (pMaxx > 0.0f);
else if(pMaxy + MIN(a1y,a2y) > 0.0f)   // line segment of intersection a1a2 above box
    resultS = (pMaxy > 0.0f);
```

```
else if(boxx[1^nxs] > boxy[nys])
        // line passes beyond bbox ? => triangle can only be on one side
    resultS = (a1y*a2x > a1x*a2y);
        // sign of cross product a1 x a2 is checked to determine side
else if(boxx[nxs] < boxy[1^nys])
    resultS = (a1y*a2x < a1x*a2y);
else
// Ok, now the triangle must be both left and right
{
    stackList[currStackItems++] = itemsList[left_num_divItems];
    unsorted_border--;
    itemsList[left_num_divItems] = itemsList[unsorted_border];

continue;
} if(swapLR != /*^*/ resultS)
{
    unsorted_border--;
    U32 t = itemsList[unsorted_border];
    right_num_divItems--;
    itemsList[right_num_divItems] = itemsList[left_num_divItems];
    itemsList[left_num_divItems] = t;
}
else
    left_num_divItems++;
}
```

FIG. 7D

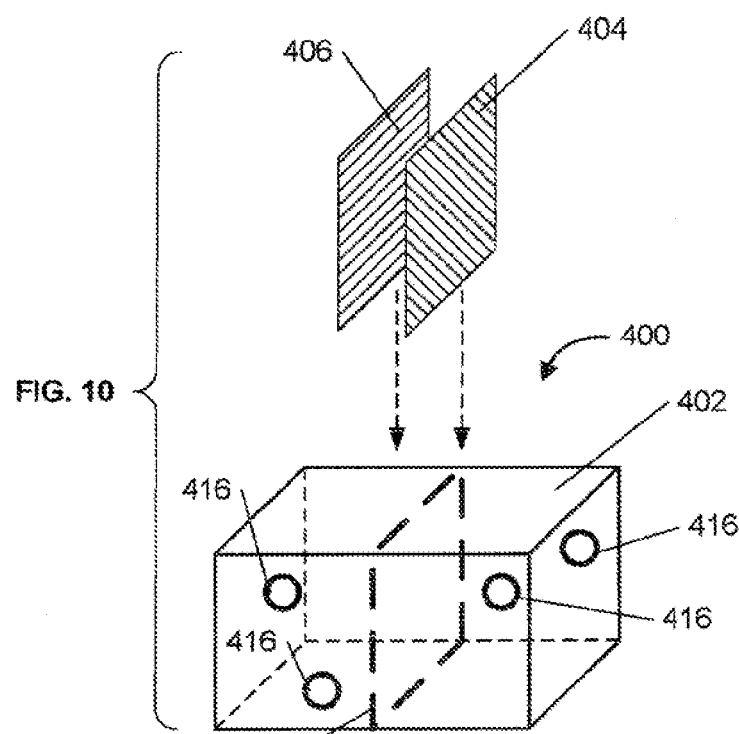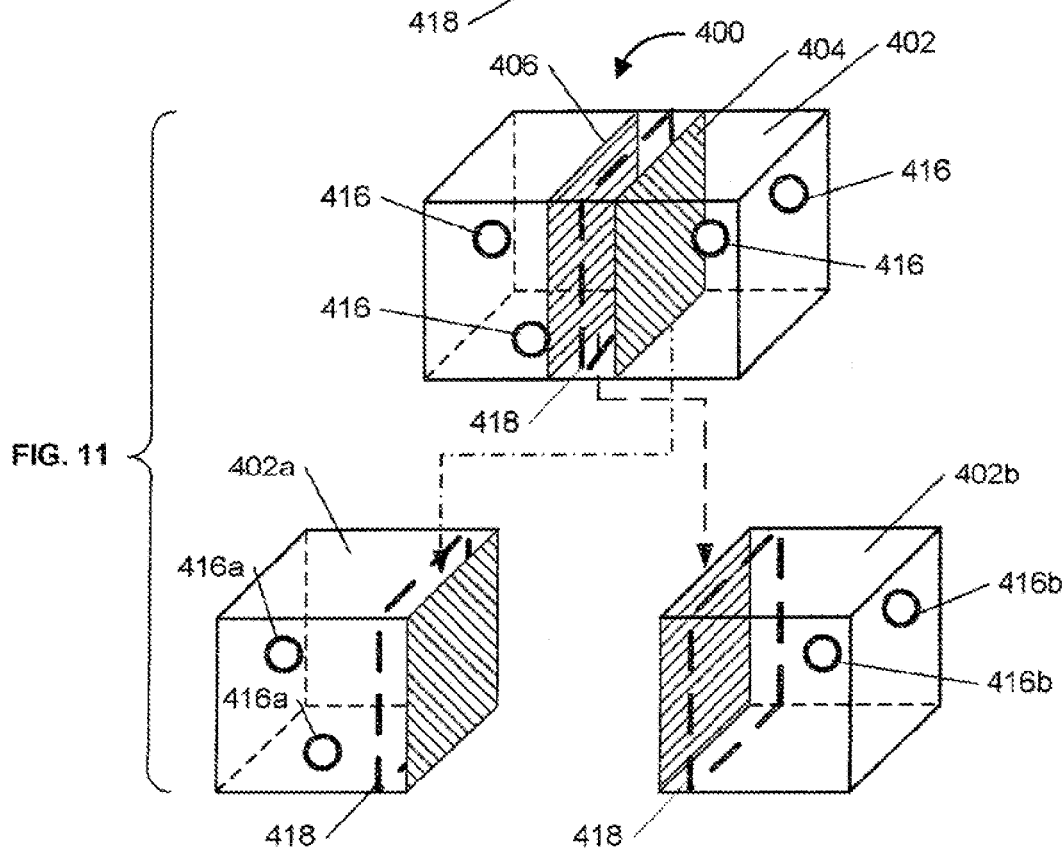

```
Intersection Boundary::Intersect(Ray &ray) //ray.tfar is changed!
{
    // Optimized inverse calculation (saves 2 of 3 divisions)
    float inv_tmp = (ray.d.dx*ray.d.dy)*ray.d.dz;

if((uintCast(inv_tmp)&0x7FFFFFFF) > uintCast(DIV_EPSILON))
    {
        inv_tmp = 1.0f / inv_tmp;

ray.inv_d.dx = (ray.d.dy*ray.d.dz)*inv_tmp;
        ray.inv_d.dy = (ray.d.dx*ray.d.dz)*inv_tmp;
        ray.inv_d.dz = (ray.d.dx*ray.d.dy)*inv_tmp;
    }
    else
    {
        ray.inv_d.dx = ((uintCast(ray.d.dx)&0x7FFFFFFF) > uintCast(DIV_EPSILON)) ?
                       (1.0f / ray.d.dx) : INVDIR_LUT[uintCast(ray.d.dx) >> 31];
        ray.inv_d.dy = ((uintCast(ray.d.dy)&0x7FFFFFFF) > uintCast(DIV_EPSILON)) ?
                       (1.0f / ray.d.dy) : INVDIR_LUT[uintCast(ray.d.dy) >> 31];
        ray.inv_d.dz = ((uintCast(ray.d.dz)&0x7FFFFFFF) > uintCast(DIV_EPSILON)) ?
                       (1.0f / ray.d.dz) : INVDIR_LUT[uintCast(ray.d.dz) >> 31];
    }

Intersection result;
    result.tfar = ray.tfar;
    result.tri_index = -1;

//
    //BBox-Check
    // float tnear = 0.0f;
    worldBBox.Clip(ray,tnear);
    if(uintCast(ray.tfar) == 0x7F7843B0) //ray.tfar==3.3e38f //!!
            return(result);
```

```
//
U32 current_bspStack = 1; //wegen empty stack case == 0
U32 node = 0;

//
//BSP-Traversal
// const U32 whatnode[3] = {(uintCast(ray.inv_d.dx)>>27) & sizeof(BSPNODELEAF),
                         (uintCast(ray.inv_d.dy)>>27) & sizeof(BSPNODELEAF),
                         (uintCast(ray.inv_d.dz)>>27) & sizeof(BSPNODELEAF)};

U32 bspStackNode[128];
float bspStackFar[128];
float bspStackNear[128];
bspStackNear[0] = -3.4e38f; // sentinel do
{
    //Ist Node ein Leaf (type<0) oder nur ne Verzweigung (type>=0)
    while (((BSPNODELEAF&)bspNodes[node]).type >= 0)
    {
        //Split-Dimension (x|y|z)
        U32 proj = ((BSPNODELEAF&)bspNodes[node]).type & 3;

float distl = (((BSPNODELEAF&)bspNodes[node]).splitlr[whatnode[proj]>>4]
                      - ray.from[proj])*ray.inv_d[proj];
        float distr = (((BSPNODELEAF&)bspNodes[node]).splitlr[(whatnode[proj]>>4)^1]
                      - ray.from[proj])*ray.inv_d[proj];

node = (((BSPNODELEAF&)bspNodes[node]).type - proj) | whatnode[proj];
                //type & 0xFFFFFFF0 if(tnear <= distl)
        {
            if(ray.tfar >= distr)
            {
                bspStackNear[current_bspStack] = MAX(tnear,distr);
                bspStackNode[current_bspStack] = node^sizeof(BSPNODELEAF);
                bspStackFar[current_bspStack]  = ray.tfar;

current_bspStack++;
            }
```

FIG. 14B

```
            ray.tfar = MIN(ray.tfar,distl);
        }
        else
            if(ray.tfar >= distr)
            {
                tnear = MAX(tnear,distr);
                node ^= sizeof(BSPNODELEAF);
            }
            else
                goto stackPop;
    }

//
    //Faces-Intersect
    ... code omitted ...
    //
    //
    //Hit gefunden?
    // do //!!! NEEDS bspStackNear[0] = -3.4e38f;   !!!!!
        {
stackPop:
            current_bspStack--;
            tnear = bspStackNear[current_bspStack];
        }while(result.tfar < tnear);

if(current_bspStack == 0)
            return(result);

node   = bspStackNode[current_bspStack];
        ray.tfar = bspStackFar[current_bspStack];
    } while (true);
}
```

FIG. 14C

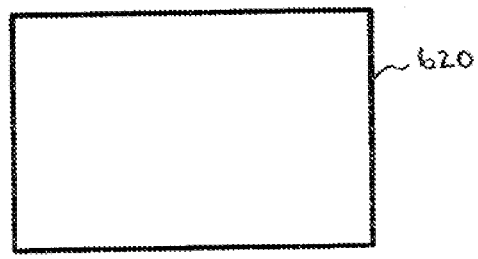
FIG. 15A
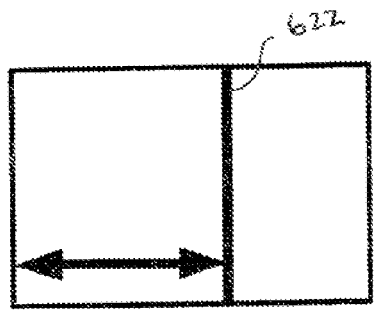
FIG. 15B
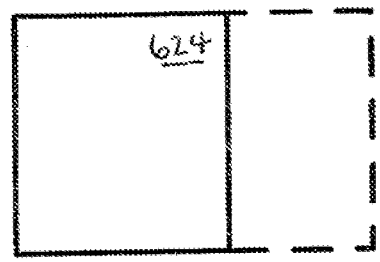
FIG. 15C
```
typedef ALIGN(4) struct \\ example encoding
{
  int type;
  //sign bit=LEAF,
  //lowest 2 bits=PROJECTION_AXIS,
  //else bits=index of BVH or triangles
  union
  {
    U32 endItems;      //NODE: number of tri's
    float splitlr[4];
  };
}BVHNODELEAF;
```
FIG. 16

640

```
Intersection BVH::Intersect(Ray &ray)
{
    //Optimized inverse calculation (saves 2 of 3 divisions)
    float inv_tmp = (ray.d.dx*ray.d.dy)*ray.d.dz;
    if((uintCast(inv_tmp)&0x7FFFFFFF) > uintCast(DIV_EPSILON))
    {
        inv_tmp = 1.0f / inv_tmp;

ray.inv_d.dx = (ray.d.dy*ray.d.dz)*inv_tmp;
        ray.inv_d.dy = (ray.d.dx*ray.d.dz)*inv_tmp;
        ray.inv_d.dz = (ray.d.dx*ray.d.dy)*inv_tmp;
    }
}
else
{
    ray.inv_d.dx = ((uintCast(ray.d.dx)&0x7FFFFFFF) > uintCast(DIV_EPSILON)) ?
        (1.0f / ray.d.dx) : INVDIR_LUT[uintCast(ray.d.dx) >> 31];
    ray.inv_d.dy = ((uintCast(ray.d.dy)&0x7FFFFFFF) > uintCast(DIV_EPSILON)) ?
        (1.0f / ray.d.dy) : INVDIR_LUT[uintCast(ray.d.dy) >> 31];
    ray.inv_d.dz = ((uintCast(ray.d.dz)&0x7FFFFFFF) > uintCast(DIV_EPSILON)) ?
        (1.0f / ray.d.dz) : INVDIR_LUT[uintCast(ray.d.dz) >> 31];
}

Intersection result;
result.tfar = ray.tfar;
result.tri_index = -1;

//
//BBox-Check
// float tnear = 0.0f;
worldBBox.Clip(ray,tnear);
if(uintCast(ray.tfar) == 0x7F7843B0) //ray.tfar==3.3e38f
    return(result);

```
U32 current_bspStack = 1;
U32 node = 0;

//
//BSP-Traversal
// const U32 whatnode[3] = {(uintCast(ray.inv_d.dx)>>28) & sizeof(BVHNODELEAF),
            (uintCast(ray.inv_d.dy)>>28) & sizeof(BVHNODELEAF),
            (uintCast(ray.inv_d.dz)>>28) & sizeof(BVHNODELEAF)};

U32 bspStackNode[128];
float bspStackFar[128];
float bspStackNear[128];
bspStackNear[0] = -3.4e38f; //Sentinel

// do
{
    while(((BVHNODELEAF&)bspNodes[node]).type >= 0)
    {
        //Split-Dimension (x|y|z)
        U32 proj = ((BVHNODELEAF&)bspNodes[node]).type & 3;

U32 leftside = (((BVHNODELEAF&)bspNodes[node]).type & 4)*2;
         //sizeof(BVHNODELEAF)=8 float dist = (((BVHNODELEAF&)bspNodes[node]).split
            - ray.from[proj])*ray.inv_d[proj];

node = (((BVHNODELEAF&)bspNodes[node]).type & (~7)) | whatnode[proj];

if(leftside != whatnode[proj])
        {
            if(dist >= tnear)
            {
                bspStackNear[current_bspStack] = tnear;
                bspStackNode[current_bspStack] = node ^ sizeof(BVHNODELEAF);
                bspStackFar[current_bspStack]  = ray.tfar;

//only "put on stack"(inc) if not an empty leaf
                current_bspStack += ((((BVHNODELEAF&)bspNodes[node
                        ^ sizeof(BVHNODELEAF)]).type
                    & (int)(((BVHNODELEAF&)bspNodes[node
```

FIG. 17B

```
                    ^ sizeof(BVHNODELEAF)]).endItems-1)) >= 0);
                ray.tfar = MIN(ray.tfar,dist);
            }
            else
                node ^= sizeof(BVHNODELEAF);
        }
        else
            if(dist <= ray.tfar)
            {
                if((((BVHNODELEAF&)bspNodes[node]).type
                  & (int)(((BVHNODELEAF&)bspNodes[node]).endItems-1)) >= 0)
                {
                    bspStackNear[current_bspStack] = MAX(tnear,dist);
                    bspStackNode[current_bspStack] = node ^ sizeof(BVHNODELEAF);
                    bspStackFar[current_bspStack]  = ray.tfar;

current_bspStack++;
                }
                else //empty leaf
                {
                    tnear = MAX(tnear,dist);
                    node ^= sizeof(BVHNODELEAF);
                }
            }
    }
}

//
//Faces-Intersect
//

U32 *idx = bspFaces + (((BVHNODELEAF&)bspNodes[node]).type & 0x7FFFFFFF);

for(U32 ii = ((BVHNODELEAF&)bspNodes[node]).endItems; ii != 0; ii--,idx++)
{
    Intersection ri;
    ri.tri_index = (*idx) & ((1<<29)-1);
    U32 ofs = (bspFaces[ri.tri_index]>>29) & 3;

ri.tfar = (triData[ri.tri_index].d - ray.from[ofs]
             - triData[ri.tri_index].n.u*ray.from[PlusOneMod3[ofs]]
             - triData[ri.tri_index].n.v*ray.from[PlusOneMod3[ofs+1]])
             / (ray.d[ofs] + triData[ri.tri_index].n.u*ray.d[PlusOneMod3[ofs]]
             + triData[ri.tri_index].n.v*ray.d[PlusOneMod3[ofs+1]]);
```

FIG. 17C

```
    if(uintCast(ri.tfar)-1 > uintCast(result.tfar)) //-1 for +0.0f
        continue;

float h1 = ri.tfar*ray.d[PlusOneMod3[ofs]]
        + ray.from[PlusOneMod3[ofs]]   + triData[ri.tri_index].p0.u;
    float h2 = ri.tfar*ray.d[PlusOneMod3[ofs+1]]
        + ray.from[PlusOneMod3[ofs+1]] + triData[ri.tri_index].p0.v;

float u = h1*triData[ri.tri_index].e[0].v - h2*triData[ri.tri_index].e[0].u;
    float v = h2*triData[ri.tri_index].e[1].u - h1*triData[ri.tri_index].e[1].v;
    float uv = u+v;
    if((uintCast(u) | uintCast(v) | uintCast(uv)) > 0x40000000)
        continue;

result = ri;
} do{}while(result.tfar < bspStackNear[--current_bspStack]);

if(current_bspStack == 0)
    return result;

tnear = bspStackNear[current_bspStack];
node  = bspStackNode[current_bspStack];
ray.tfar = MIN(result.tfar,bspStackFar[current_bspStack]);
}while(true);
}
```

```
typedef ALIGN(4) struct \\ example encoding
{
  int type;
  //sign bit=LEAF,
  //lowest 2 bits=PROJECTION_AXIS,
  //else bits=index of BVH or triangles
  union
  {
    U32 endItems;    //NODE: number of tri's
    float splitlr[4];
  };
}BVHNODELEAF;
```

```
Intersection BVH::Intersect(Ray &ray)
{
    //Optimized inverse calculation (saves 2 of 3 divisions)
    float inv_tmp = (ray.d.dx*ray.d.dy)*ray.d.dz;
    if((uintCast(inv_tmp)&0x7FFFFFFF) > uintCast(DIV_EPSILON))
    {
        inv_tmp = 1.0f / inv_tmp;

ray.inv_d.dx = (ray.d.dy*ray.d.dz)*inv_tmp;
        ray.inv_d.dy = (ray.d.dx*ray.d.dz)*inv_tmp;
        ray.inv_d.dz = (ray.d.dx*ray.d.dy)*inv_tmp;
    }
    else
    {
        ray.inv_d.dx = ((uintCast(ray.d.dx)&0x7FFFFFFF) > uintCast(DIV_EPSILON)) ?
            (1.0f / ray.d.dx) : INVDIR_LUT[uintCast(ray.d.dx) >> 31];
        ray.inv_d.dy = ((uintCast(ray.d.dy)&0x7FFFFFFF) > uintCast(DIV_EPSILON)) ?
            (1.0f / ray.d.dy) : INVDIR_LUT[uintCast(ray.d.dy) >> 31];
        ray.inv_d.dz = ((uintCast(ray.d.dz)&0x7FFFFFFF) > uintCast(DIV_EPSILON)) ?
            (1.0f / ray.d.dz) : INVDIR_LUT[uintCast(ray.d.dz) >> 31];
    }

Intersection result;
    result.tfar = ray.tfar;
    result.tri_index = -1;

//
    //BBox-Check
    // float tnear = 0.0f;
    worldBBox.Clip(ray,tnear);
    if(uintCast(ray.tfar) == 0x7F7843BC)
        return(result);

//

U32 current_bspStack = 1; //wegen empty stack case == 0
    U32 node = 0;

//
    //BSP-Traversal
    // const U32 whatnodelr[3] = {(uintCast(ray.inv_d.dx)>>31),
                               (uintCast(ray.inv_d.dy)>>31),
                               (uintCast(ray.inv_d.dz)>>31)};

const U32 whatnode[3] = {whatnodelr[0] * sizeof(BVHNODELEAF),
                             whatnodelr[1] * sizeof(BVHNODELEAF),
                             whatnodelr[2] * sizeof(BVHNODELEAF)};

U32 bspStackNode[128];
    float bspStackFar[128];
    float bspStackNear[128];
```

```
bspStackNear[0] = -3.4e38f; //Sentinel (necessary for StackPops)

do
{
    //Ist Node ein Leaf (type<0) oder nur ne Verzweigung (type>=0)
    while(((BVHNODELEAF&)bspNodes[node]).type >= 0)
    {
        //Split-Dimension (x|y|z)
        U32 proj = ((BVHNODELEAF&)bspNodes[node]).type & 3;

float distff = (((BVHNODELEAF&)bspNodes[node]).splitlr[3-whatnodelr[proj]]
                - ray.from[proj])*ray.inv_d[proj];
        if(distff < tnear)
            goto stackPop;

float distn = (((BVHNODELEAF&)bspNodes[node]).splitlr[whatnodelr[proj]]
            - ray.from[proj])*ray.inv_d[proj];
        float distf = (((BVHNODELEAF&)bspNodes[node]).splitlr[whatnodelr[proj]^1]
            - ray.from[proj])*ray.inv_d[proj];

U32 oldnode = node;

node = ((BVHNODELEAF&)bspNodes[node]).type - proj;

if(tnear <= distn)
        {
            float distnn = (((BVHNODELEAF&)bspNodes[oldnode]).splitlr[3-(whatnodelr[proj]^1)]
                - ray.from[proj])*ray.inv_d[proj];

if(distnn > ray.tfar)
                goto stackPop;

tnear = MAX(tnear,distnn);

if(ray.tfar >= distf)
            {
                bspStackNear[current_bspStack] = MAX(tnear,distf);
                bspStackNode[current_bspStack] = node + (whatnode[proj]^sizeof(BVHNODELEAF));
                bspStackFar[current_bspStack]  = MIN(ray.tfar,distff);

current_bspStack++;
            } node += whatnode[proj];
            ray.tfar = MIN(ray.tfar,distn);
        }
```

FIG. 20B

```
        else
            if(ray.tfar >= distf)
            {
                tnear = MAX(tnear,distf);
                ray.tfar = MIN(ray.tfar,distff);
                node += whatnode[proj]*sizeof(BVHNODELEAF);
            }
            else
                goto stackPop;
    }

//
    //Faces-Intersect
    //

//Pointer auf Faces
    U32 *idx = bspFaces + (((BVHNODELEAF&)bspNodes[node]).type & 0x7FFFFFFF);

U32 ii = ((BVHNODELEAF&)bspNodes[node]).endItems;

do
    {
        Intersection ri;
        ri.tri_index = (*idx) & ((1<<29)-1);
        U32 ofs  = (bspFaces[ri.tri_index]>>29) & 3;

ii--;
        idx++;

ri.tfar  = (triData[ri.tri_index].d - ray.from[ofs] - triData[ri.tri_index].n.u
            *ray.from[PlusOneMod3[ofs]] - triData[ri.tri_index].n.v*ray.from[PlusOneMod3[ofs+1]])
            / (ray.d[ofs] + triData[ri.tri_index].n.u*ray.d[PlusOneMod3[ofs]]
            + triData[ri.tri_index].n.v*ray.d[PlusOneMod3[ofs+1]]);

if(uintCast(ri.tfar)-1 > uintCast(result.tfar))
            continue;

float h1 = ri.tfar*ray.d[PlusOneMod3[ofs]]   + ray.from[PlusOneMod3[ofs]]
            + triData[ri.tri_index].p0.u;
        float h2 = ri.tfar*ray.d[PlusOneMod3[ofs+1]] + ray.from[PlusOneMod3[ofs+1]]
            + triData[ri.tri_index].p0.v;

float u = h1*triData[ri.tri_index].e[0].v - h2*triData[ri.tri_index].e[0].u;
        float v = h2*triData[ri.tri_index].e[1].u - h1*triData[ri.tri_index].e[1].v;
        float uv = u+v;
        if((uintCast(u) | uintCast(v) | uintCast(uv)) > 0x40000000)
                    continue;

result = ri;
        }while(ii != 0);

stackPop:
            do{}while(result.tfar < bspStackNear[--current_bspStack]);

if(current_bspStack == 0)
                return result;

tnear = bspStackNear[current_bspStack];
            node  = bspStackNode[current_bspStack];
            ray.tfar = MIN(result.tfar,bspStackFar[current_bspStack]);
        }while(true);
    }
```

FIG. 20C

VARIANT RECORD DEFINITION
```
typedef struct
{
  int Index;
  //lowest bits: axis (00,01,10) or leaf (11)
  union
  {
    int    Items;    // leaf only
    float  Clip[2];  // internal node only
  };
} BIH_Node;
```
FIG. 24A
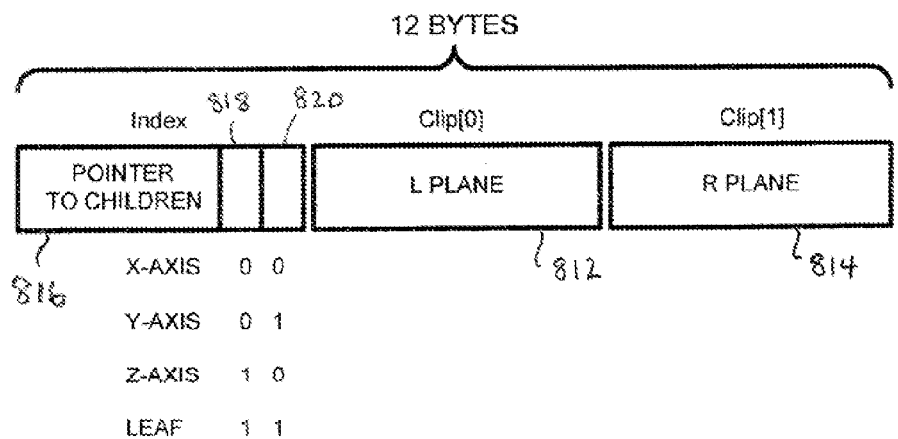
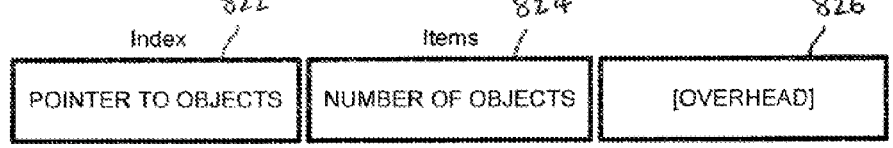
FIG. 24B

 
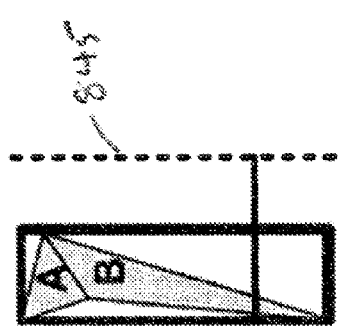
FIG. 33B
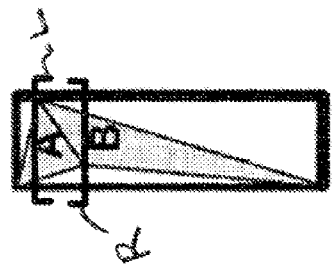
FIG. 33D
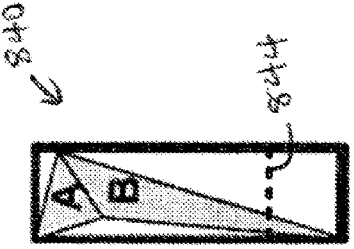
FIG. 33A
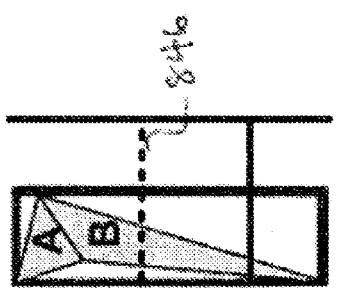
FIG. 33C

← 940

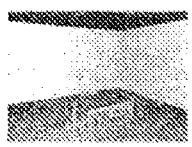
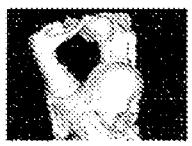
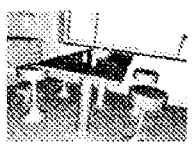

| Shirley Scene 6 | InView | WH06 | kD | BIH | on demand |
|---|---|---|---|---|---|
| Triangles | 1,380 | n.a. | 804 | dto. | dto. |
| Triangle memory | 66,240 | n.a. | 28,944 | dto. | dto. |
| Acc. Data memory | 115,312 | n.a. | 55,188 | 12,828 | 11,972 |
| FPS | 5,02 | n.a. | 11,17 | 11,99 | n.a. |
| Time to image (msec) | 199 | n.a. | 89 | 83 | 87 |
| Stanford Dragon | InView | WH06 | kD | BIH | on demand |
| Triangles | 863,334 | 863k | 871,414 | dto. | dto. |
| Triangle memory | 41,440,032 | n.a. | 31,370,904 | dto. | dto. |
| Acc. Data memory | 26,207,404 | n.a. | 24,014,264 | 13,466,176 | 5,175,936 |
| FPS | 2,49 | n.a. | 5,92 | 5,98 | n.a. |
| Time to image (msec) | 44,500 | 23,900 | 3,106 | 1,557 | 1,102 |
| Stanford Buddha | InView | WH06 | kD | BIH | on demand |
| Triangles | 987,361 | 1.07M | 1,087,716 | dto. | dto. |
| Triangle memory | 47,393,328 | n.a. | 39,157,776 | dto. | dto. |
| Acc. Data memory | 32,518,372 | n.a. | 30,566,796 | 17,344,944 | 2,719,628 |
| FPS | 3,13 | n.a. | 7,55 | 7,41 | n.a. |
| Time to image (msec) | 53,819 | 32,200 | 3,695 | 1,837 | 705 |
| BART Tra.fo. Kitchen | InView | WH06 | kD | BIH | on demand |
| Triangles | 111,116 | n.a. | 110,561 | dto. | dto. |
| Triangle memory | 5,333,568 | n.a. | 3,980,196 | dto. | dto. |
| Acc. Data memory | 9,989,240 | n.a. | 5,812,276 | 1,792,880 | 1,145,972 |
| FPS | 1,77 | n.a. | 4,65 | 1,76 | n.a. |
| Time to image (msec) | 16,565 | n.a. | 871 | 724 | 770 |
| Ward Conference | InView | WH06 | kD | BIH | on demand |
| Triangles | 964,471 | n.a. | 1,064,498 | dto. | dto. |
| Triangle memory | 46,294,608 | n.a. | 38,321,928 | dto. | dto. |
| Acc. Data memory | 101,627,372 | n.a. | 84,222,332 | 16,007,852 | 1,331,780 |
| FPS | 2,9 | n.a. | 9,55 | 4,12 | n.a. |
| Time to image (msec) | 171,344 | n.a. | 11,204 | 1,523 | 630 |
| Stanford Bunny | InView | WH06 | kD | BIH | on demand |
| Triangles | 70,027 | 69k | 69,451 | dto. | dto. |
| Triangle memory | 3,361,296 | n.a. | 2,500,236 | dto. | dto. |
| Acc. Data memory | 6,186,288 | n.a. | 4,352,248 | 974,080 | 504,744 |
| FPS | 3,53 | n.a. | 9,9 | 10,2 | n.a. |
| Time to image (msec) | 9,283 | 4,800 | 445 | 176 | 165 |
| Car 1 | InView | WH06 | kD | BIH | on demand |
| Triangles | 313,460 | n.a. | 312,888 | dto. | dto. |
| Triangle memory | 15,046,080 | n.a. | 11,263,968 | dto. | dto. |
| Acc. Data memory | 26,785,196 | n.a. | 15,093,468 | 4,989,168 | 1,271,168 |
| FPS | 3,15 | n.a. | 7,97 | 6,99 | n.a. |
| Time to image (msec) | 39,817 | n.a. | 1,656 | 581 | 371 |
| Blender Suzanne | InView | WH06 | kD | BIH | on demand |
| Triangles | 252,436 | n.a. | 251,904 | dto. | dto. |
| Triangle memory | 12,116,928 | n.a. | 9,068,544 | dto. | dto. |
| Acc. Data memory | 12,508,532 | n.a. | 12,139,800 | 3,707,292 | 2,083,020 |
| FPS | 3,84 | n.a. | 7,35 | 8,31 | n.a. |
| Time to image (msec) | 18,260 | n.a. | 1,229 | 448 | 359 |

FIG. 37

| Car 2 | kD | BIH | on demand |
|---|---|---|---|
| Triangles | 542.108 | dto. | dto. |
| Triangle memory | 19.515.888 | dto. | dto. |
| Acc. Data memory | 23.756.320 | 8.807.636 | 8.132.108 |
| FPS (1st Pass) | 0,46 | 0,44 | n.a. |
| Time to image (msec) | 4.595 | 2.944 | 2.830 |

FIG. 38

| BART Museum (10k) | kD | BIH | on demand |
|---|---|---|---|
| Triangles | 10.412 | dto. | dto. |
| Average FPS (Primary Ray) | 3,48 | 3,34 | 3,26 |
| Rendering time for complete animation (msec) | 86.286 | 89.935 | 92.327 |
| Average FPS (3,917 Rays) | 0,91 | 0,79 | 0,78 |
| Rendering time for complete animation (msec) | 329.060 | 381.754 | 388.114 |
| BART Museum (75k) | kD | BIH | on demand |
| Triangles | 75.884 | dto. | dto. |
| Average FPS (Primary Ray) | 0,39 | 2,04 | 2,08 |
| Rendering time for complete animation (msec) | 776.568 | 147.002 | 144.444 |
| Average FPS (4,024 Rays) | 0,28 | 0,49 | 0,48 |
| Rendering time for complete animation (msec) | 1.057.259 | 614.503 | 620.728 |
| BART Kitchen | kD | BIH | on demand |
| Triangles | 110.561 | dto. | dto. |
| Average FPS | 1,45 | 1,96 | 2,17 |
| Rendering time for complete animation (msec) | 552.207 | 407.460 | 368.903 |
| BART Robots | kD | BIH | on demand |
| Triangles | 71.708 | dto. | dto. |
| Average FPS | 1,51 | 1,41 | 1,49 |
| Rendering time for complete animation (msec) | 539.561 | 567.988 | 537.974 |
| Utah Fairy Forest | kD | BIH | on demand |
| Triangles | 174.117 | dto. | dto. |
| Average FPS | 0,78 | 1,79 | 1,95 |
| Rendering time for complete animation (msec) | 26.780 | 11.695 | 10.771 |

FIG. 39

| Boeing | View 1 | View 2 | View 3 | View 4 | View 5 | View 6 |
|---|---|---|---|---|---|---|
| Acc. Data | 326,447,848 | 12,748,120 | 15,471,692 | 259,261,404 | 50,963,768 | 324,602,460 |
| FPS | 0.26 | 0.13 | 0.13 | 0.38 | 0.11 | 0.34 |
| Total | 8 min. | 133 sec. | 153 sec. | 270 sec. | 118 sec. | 252 sec. |

FIG. 40

| Boeing | View 1 | View 2 | View 3 | View 4 | View 5 | View 6 |
|---|---|---|---|---|---|---|
| Triangles | 349,569,456 | dto. | dto. | dto. | dto. | dto. |
| Peak memory | 1,075,418,112 | 538,697,728 | 1,054,035,968 | 1,267,494,912 | 1,078,779,904 | 1,190,248,448 |
| Rendering time | 5 min. 19 sec. | 33 sec. | 68 sec. | 6 min. 45 sec. | 95 sec. | 5 min. 57 sec. |

FIG. 41

| Stanford Buddha | WH06 | BIH+Bucket | BIH | Ward Conference | BIH+Bucket | BIH |
|---|---|---|---|---|---|---|
| Triangles | 1.07M | 1,087,716 | dto. | Triangles | 1,064,498 | dto. |
| FPS | n.a. | 94% | 100% | FPS | 96% | 100% |
| Construction (msec) | 32,200 | 765 | 1,703 | Construction (msec) | 937 | 1,281 |
| Stanford Dragon | WH06 | BIH+Bucket | BIH | Car 1 | BIH+Bucket | BIH |
| Triangles | 863k | 871,414 | dto. | Triangles | 312,888 | dto. |
| FPS | n.a. | 93% | 100% | FPS | 100% | 100% |
| Construction (msec) | 23,900 | 657 | 1,390 | Construction (msec) | 250 | 438 |
| Stanford Thai Statue | WH06 | BIH+Bucket | BIH | UNC Power Plant | BIH+Bucket | BIH |
| Triangles | 10M | 10,000,000 | dto. | Triangles | 12,748,510 | dto. |
| FPS | n.a. | 94% | 100% | FPS | 79% | 100% |
| Construction (msec) | 61,000 | 7,812 | 17,484 | Construction (msec) | 11,609 | 20,282 |

FIG. 42

Processor 102 hierarchical ray tracing acceleration data structure construction module, 122 module for generating tree structure nodes utilizing bounding interval hierarchy based on defining axis-aligned scene bounding box and parallel planes to partition set of objects in a scene into left objects and right objects; match split planes to object bounding boxes; the planes are perpendicular to a selected one of x, y, or z-axes; each object in an image is classified either left or right based on a left/right selection criterion, e.g., either left or right depending on which side of the plane it extends most; two splitting plane values of the child nodes are determined by the maximum and minimum coordinate of the left and right objects, respectively):

(given bounding box and the selected axis, left child L results from replacing a maximum value of left object's coordinates along selected axis by first plane, and right child R results from replacing minimum value of right object's coordinates by the second plane, wherein any resulting zero volumes are used to represent empty children)

(splitting planes determined by: selecting candidate splitting planes by hierarchically subdividing an axis-aligned scene bounding box along the longest side in the middle, wherein all candidate splitting planes form a regular grid; if candidate plane is outside the bounding box of a volume element to subdivide, continuing with candidate planes from the half where the volume element resides)

(recursively partitions bounding box into object bounding boxes; if split plane candidate separates objects without overlap, fits resulting split planes to objects on left and right, thereby maximizing empty space; terminates recursion when no more than a predetermined number of objects remains)

(computes scene bounding box and average object size to determine resolution of grid for partitioning space, or use user-specified resolution, allocate counter for each grid cell, initializing all counters, each corresponding to a respective grid cell, to zero; select point for each object to increment respective counter for grid cell containing selected point, transform counter values to offset values by replacing each counter value by the sum of values of all previous counters; allocate global object index array, use offset values to sort objects into buckets, using for each respective object the corresponding point selected for incrementing counter for grid cell containing that point, and for each bucket, computing the bounding box of objects it contains.)

FIG. 45

Disk or other storage, 120

--- hierarchical ray tracing acceleration data structure construction module, 124 module for generating tree structure nodes utilizing bounding interval hierarchy based on defining axis-aligned scene bounding box and parallel planes to partition set of objects in a scene into left objects and right objects; match split planes to object bounding boxes; the planes are perpendicular to a selected one of x, y, or z-axes; each object in an image is classified either left or right based on a left/right selection criterion, e.g., either left or right depending on which side of the plane it extends most; two splitting plane values of the child nodes are determined by the maximum and minimum coordinate of the left and right objects, respectively):

(given bounding box and the selected axis, left child L results from replacing a maximum value of left object's coordinates along selected axis by first plane, and right child R results from replacing minimum value of right object's coordinates by the second plane, wherein any resulting zero volumes are used to represent empty children)

(splitting planes determined by: selecting candidate splitting planes by hierarchically subdividing an axis-aligned scene bounding box along the longest side in the middle, wherein all candidate splitting planes form a regular grid; if candidate plane is outside the bounding box of a volume element to subdivide, continuing with candidate planes from the half where the volume element resides)

(recursively partitions bounding box into object bounding boxes; if split plane candidate separates objects without overlap, fits resulting split planes to objects on left and right, thereby maximizing empty space; terminates recursion when no more than a predetermined number of objects remains)

(computes scene bounding box and average object size to determine resolution of grid for partitioning space, or use user-specified resolution, allocate counter for each grid cell, initializing all counters, each corresponding to a respective grid cell, to zero; select point for each object to increment respective counter for grid cell containing selected point, transform counter values to offset values by replacing each counter value by the sum of values of all previous counters; allocate global object index array, use offset values to sort objects into buckets, using for each respective object the corresponding point selected for incrementing counter for grid cell containing that point, and for each bucket, computing the bounding box of objects it contains.)

FIG. 46

INSTANT RAY TRACING

CROSS-REFERENCE TO RELATED APPLICATIONS

This application for patent claims the priority benefit of U.S. Provisional Patent Application Ser. No. 60/793,063, filed Apr. 19, 2006 (expired), and is a Continuation-In-Part of U.S. patent application Ser. No. 11/474,517, filed Jun. 23, 2006, entitled "Real-Time Precision Ray Tracing") (pending).

U.S. patent application Ser. No. 11/474,517 claims the priority benefit of U.S. Provisional Patent Application Ser. No. 60/693,231, filed Jun. 23, 2005 (expired), and is in turn a Continuation-In-Part of U.S. patent application Ser. No. 10/299,574, filed Nov. 19, 2002 (issued as U.S. Pat. No. 7,184,042).

U.S. patent application Ser. No. 10/299,574 is in turn a Continuation-In-Part of U.S. Ser. No. 09/884,861, filed Jun. 19, 2001 (issued as U.S. Pat. No. 7,227,547), which claims the priority benefit of U.S. Provisional Patent Application Ser. No. 60/265,934, filed Feb. 1,2001, and U.S. Provisional Patent Application Ser. No. 60/212,286, filed Jun. 19, 2000 (both expired). Each of these noted patent applications, including the provisional and non-provisional applications, is incorporated by reference herein as if set forth in its entirety.

FIELD OF THE INVENTION

The present invention relates generally to methods and systems for image rendering in and by digital computing systems, such as for motion pictures and other applications, and in particular, relates to methods, systems, devices, and computer software for substantially instantaneous, precision ray tracing.

BACKGROUND OF THE INVENTION

The term "ray tracing" describes a technique for synthesizing photorealistic images by identifying all light paths that connect light sources with cameras and summing up these contributions. The simulation traces rays along the line of sight to determine visibility, and traces rays from the light sources in order to determine illumination.

Ray tracing has become mainstream in motion pictures and other applications. However, current ray tracing techniques suffer from a number of known limitations and weaknesses, including numerical problems, limited capabilities to process dynamic scenes, slow setup of acceleration data structures, and large memory footprints. Thus, current ray tracing techniques lack the capability to deal efficiently with fully animated scenes, such as wind blowing through a forest or a person's hair. Overcoming the limitations of current ray tracing systems would also enable the rendering of, for example, higher quality motion blur in movie productions.

Current attempts to improve the performance of ray tracing systems have fallen short for a number of reasons. For example, current real-time ray tracing systems generally use 3D-trees as their acceleration structure, which are based on axis-aligned binary space partitions. Because the main focus of these systems is on rendering static scenes, they typically fail to address the significant amount of setup time required to construct the required data structures in connection with fully animated scenes. Along these lines, one manufacturer has improved real-time ray tracing by building efficient 3D-trees and developing an algorithm able to shorten the time needed to traverse the tree. However, it can be shown that the expected memory requirement for the system increases quadratically with an increase in the number of objects to be ray-traced.

Another manufacturer has designed a ray tracing integrated circuit that uses bounding volume hierarchies to improve system performance. However, it has been found that the architecture's performance breaks down if too many incoherent secondary rays are traced.

In addition, attempts have made to improve system performance by implementing 3D-tree traversal algorithms using field-programmable gate arrays (FPGAs). The main increase in processing speed in these systems is obtained by tracing bundles of coherent rays and exploiting the capability of FPGAs to perform rapid hardwired computations. The construction of acceleration structures has no yet been implemented in hardware. The FPGA implementations typically use floating point techniques at reduced precision.

SUMMARY OF THE INVENTION

One aspect of the invention relates to an improvement in a computer graphics system of the type comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of points in a scene as recorded on an image plane of a simulated camera, the computer being operable to generate pixel values for an image using a ray-tracing methodology, the ray-tracing methodology comprising the use of a ray tree and an associated ray tracing data structure, the ray tree including at least on ray shot from the pixel into a scene along a selected direction, the ray-tracing methodology further comprising the calculating of the intersections of rays and surfaces of objects in the scene, and the ray-tracing being determined in response to the results of processing of objects in an image.

In this aspect of the invention, the improvement comprises constructing a hierarchical ray tracing acceleration data structure comprising a tree structure, the nodes of which are generated utilizing a bounding interval hierarchy based on defining an axis-aligned scene bounding box and two parallel planes to partition a set of objects in a scene into left objects and right objects, and matching split planes to object bounding boxes, wherein:

(A) the two planes are perpendicular to a selected one of x, y, or z-axes;

(B) given a splitting plane, each object in an image is classified either left or right based on a left/right selection criterion, and two splitting plane values of the child nodes are determined by the maximum and minimum coordinate of the left and right objects, respectively, (C) given a bounding box and the selected axis, a left child L results from replacing a maximum value of a left object's coordinates along the selected axis by the first plane, and a right child R results from replacing a minimum value of a right object's coordinates by the second plane, and wherein any resulting zero volumes are used to represent empty children, and (D) splitting planes are determined by:

(1) selecting candidate splitting planes by hierarchically subdividing an axis-aligned scene bounding box along the longest side in the middle, wherein all candidate splitting planes form a regular grid;

(2) if a candidate plane is outside the bounding box of a volume element to subdivide, continuing with candidate planes from the half where the volume element resides; and (E) further comprising:

(a) recursively partitioning the bounding box into object bounding boxes, (b) if a split plane candidate separates objects without overlap, fitting the resulting split planes to the objects on the left and right, thereby maximizing empty space, and (c) terminating the recursion when no more than a predetermined number of objects remains.

In another aspect of the invention, the left/right selection criterion comprises, given a splitting plane, classifying each object in an image either left or right depending on which side of the plane it extends most; and the construction of the hierarchical ray tracing acceleration data structure is based on bucket sorting, and comprises hierarchical execution of:

(A) computing a scene bounding box and average object size to determine resolution of an ordered, regular grid for partitioning space, or alternately, using a user-specified resolution.

(B) allocating a counter for each grid cell, (C) initializing all counters, each corresponding to a respective grid cell, to zero, (D) selecting a point for each object to increment the respective counter for the grid cell containing the selected point, (E) transforming counter values to offset values by replacing each counter value by the sum of values of all previous counters, (F) allocating a global object index array, (G) using the offset values to sort the objects into buckets, using for each respective object the corresponding point selected for incrementing the counter for the grid cell containing that point, and (H) for each bucket, comprising the bounding box of the objects it contains.

A further aspect of the invention comprises the hierarchical acceleration data structure only where rays traverse or where geometry is visible to the ray.

Yet a further aspect of the invention comprises configuring a processing and memory structure in accordance with the foregoing method, the processing and memory structure being operable to provide:

(A) pre-processing by sorting image triangles into buckets and storing corresponding bucket values on a storage device, (B) for rendering, creating a top-level bounding interval hierarchy out of the buckets, without needing to construct the tree for the triangles immediately, and wherein each bucket that is intersected by a ray creates its own tree utilizing on-demand creation of the tree, (C) wherein the bucket's triangles and the acceleration data structure are stored in a cache of either dynamic or fixed user-defined size, and (D) wherein the bucket with the largest number of triangles defines the maximum memory footprint.

In a further aspect of the invention, the amount of memory required can be bounded in advance, linearly in the number of objects to be ray traced.

Those skilled in the art will appreciate that the invention can take the form of a method carried out in computer software, hardware, or a combination of software and hardware; a computer-based device or system that carries out such methods; a computer software product comprising computer-executable code stored on a magnetic disk, RAM card, ROM element, FPGA, ASIC, or other processing and/or storage element that can be communicated with by a computer, the code being executable by a computer to carry out such methods; or some combination of such embodiments.

It will also be understood and appreciated by those skilled in the art that the invention can be practiced without a display element, for example, and without use of a particular pre-defined computing apparatus. For example, pixel values and image data can be created and stored for later display.

These and other aspects will be discussed in greater detail below in the following Detailed Description of the Invention and in connection with the attached drawing figures.

BRIEF DESCRIPTION OF THE DRAWINGS

FIG. 5 shows an example of a code listing for implementing a described technique for encoding degenerate triangles.

FIG. 6 shows an example of a code listing for implementing a described technique for extending triangles for a robust intersection test.

FIGS. 7A-7D show an example of a code listing for implementing a described triangle-box intersection technique.

FIGS. 9-11 are a series of diagrams, in isometric view, or the axis-aligned bounding box shown in FIG. 5, illustrating the partitioning of the bounding box with L- and R-planes.

FIGS. 14A-14C show an example of a code listing for implementing a described technique for traversing bounding volume hierarchies.

FIGS. 15A-C show a series of diagrams illustrating a technique according to a further aspect of the invention in which a bounding box is intersected by an axis-aligned plane to define a half-space.

FIG. 16 shows an example of a code listing for implementing a described technique for encoding leaf nodes.

FIGS. 17A-D show an example of a code listing for implementing the tracing of one ray through a bounding volume hierarchy.

FIGS. 20A-C show an example of a code listing for implementing a traversal of bounding volume hierarchies using a tree built using the data structure illustrated in FIGS. 18 and 19.

FIG. 24A shows an example of a code listing for implementing a technique for defining a data structure for use with the described ray tracing techniques, and FIG. 24B shows a memory lay out of the data structure.

FIGS. 33A-E show the generation of children for objects A and B in the scene shown in FIG. 26.

FIGS. 37-42 show a series of tables illustrating the results of comparisons between currently used techniques and improved techniques according to the present invention.

FIG. 45 is a schematic block diagram of processing modules within a computer 102 in accordance with one process of the invention.

FIG. 46 is a schematic block diagram of software product modules within a disk (removable or non-removable) or other storage element 120 in a computer or other processing device in accordance with the invention.

DETAILED DESCRIPTION OF THE INVENTION

Digital Processing Environment In Which Invention Can Be Implemented

Figure 1:
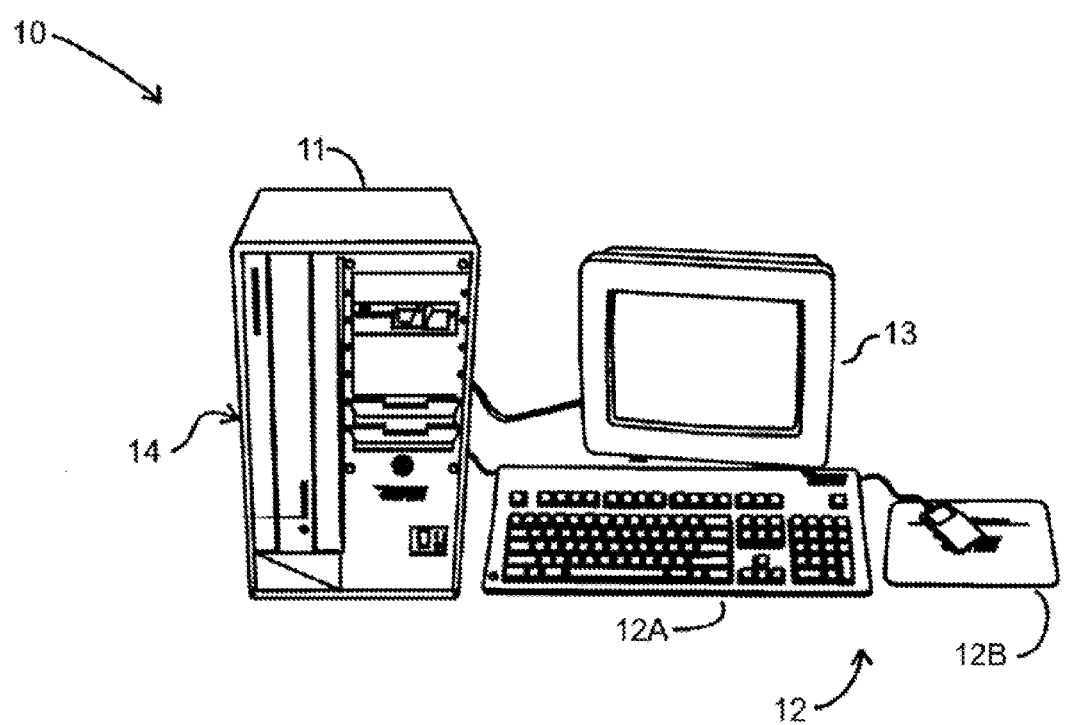
FIG. 1 shows a schematic diagram of a conventional personal computer, or like computing apparatus, in which aspects of the present invention can be deployed.

Before describing particular examples and embodiments of the invention, the following is a discussion, to be read in connection with FIGS. 1 and 2, of underlying digital processing structures and environments in which the invention may be implemented and practiced.

It will be understood by those skilled it the art that the present invention provides methods, systems, devices and computer program products that enable more efficient ray tracing and other activities in computer graphics systems, whose output is typically a human-perceptible (or digitally stored and/or transmitted) image or series of images that can comprise, for example, an animated motion picture, computer aided design representation, or other typical computer graphics output. The present invention can thus be implemented as part of the computer software or computer hardware of a computer that forms part of a computer graphics system, along with a display, user interface elements such as a keyboard, tablet and/or mouse, memory, storage, and other conventional computer graphics system components. While conventional components of such kind are well known to those skilled in the art, and thus need not be described in great detail herein, the following overview indicates how the present invention can be implemented in conjunction with such components in a computer graphics system.

More, particularly, those skilled in the art will understand that the present invention can be utilized in the generation and synthesis of images, such as for display in a motion picture or other dynamic display. The techniques described herein can be practiced as part of a computer graphics system, in which a pixel value is generated for pixels in an image. The pixel value is representative of a point in a scene as recorded on an image plane of a simulated camera. The underlying computer graphics system can be configured to generate the pixel value for an image using a selected methodology, such as that of the present invention.

The following detailed description illustrates examples of methods, structures, systems, and computer software products in accordance with these techniques. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or reconfigurable hardware.

As an example, FIG. 1 attached hereto depicts an illustrative computer system 10 that can carry out such computer graphics processes. With reference to FIG. 1, the computer system 10 in one embodiment includes a processor module 11 and operator interface elements comprising operator input components such as a keyboard 12A and/or a mouse 12B (or digitized tablet or other analogous element(s), generally identified as operator input element(s) 12) and an operator output element such as a video display device 13. The illustrative computer system 10 can be of a conventional stored-program computer architecture. The processor module 11 can include, for example, one or more processor, memory and mass storage devices, such as disk and/or tape storage elements (not separately shown), which perform processing and storage operations in connection with digital data provided thereto. The operator input element(s) 12 can be provided to permit an operator to input information for processing. The video display device 13 can be provided to display output information generated by the processor module 11 on a screen 14 to the operator, including data that the operator may input for processing, information that the operator may input to control processing, as well as information generated during processing. The processor module 11 can generate information for display by the video display device 13 using a so-called "graphical user interface" ("GUI"), in which information for various applications programs is displayed using various "windows."

The terms "memory", "storage" and "disk storage devices" can encompass any computer readable medium, such as a computer hard disk, computer floppy disk, computer-readable flash drive, computer-readable RAM or ROM element or any other known means of encoding digital information. The term "applications programs", "applications", "programs", "computer program product" or "computer software product" can encompass any computer program product consisting of computer-readable programs instructions encoded and/or stored on a computer readable medium, whether that medium is fixed or removable, permanent or erasable, or otherwise. As noted, for example, in block 122 of the schematic block diagram of FIG. 2B, applications and data can be stored on a disk, in RAM, ROM, on other removable or fixed storage, whether internal or external, and can be downloaded or uploaded, in accordance with practices and techniques well known in the art. As will also be noted in this document, the present invention can take the form of software or a computer program product stored on a computer-readable medium, or it can be in the form of computer program code that can be uploaded or downloaded, or fixed in an FPGA, ROM or other electronic structure, or it can take the form of a method or a system for carrying out such a method. In each case, the invention is operable to enable a computer or computer system to calculate a pixel value for pixels in an image or scene, and the pixel value can be used by other elements of a computer graphics system, which can be conventional elements such as graphics cards, display controllers, or display elements such as LCDs and/or CRTs, to generate a display-controlling electrical or electronic output, and ultimately to enable the display of an image in a human-perceptible form, and/or the storage of such an image (or data specifying such an image) for later display and/or processing.

Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 can include one or more network ports, generally identified by reference numeral 14, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

Figure 2A:
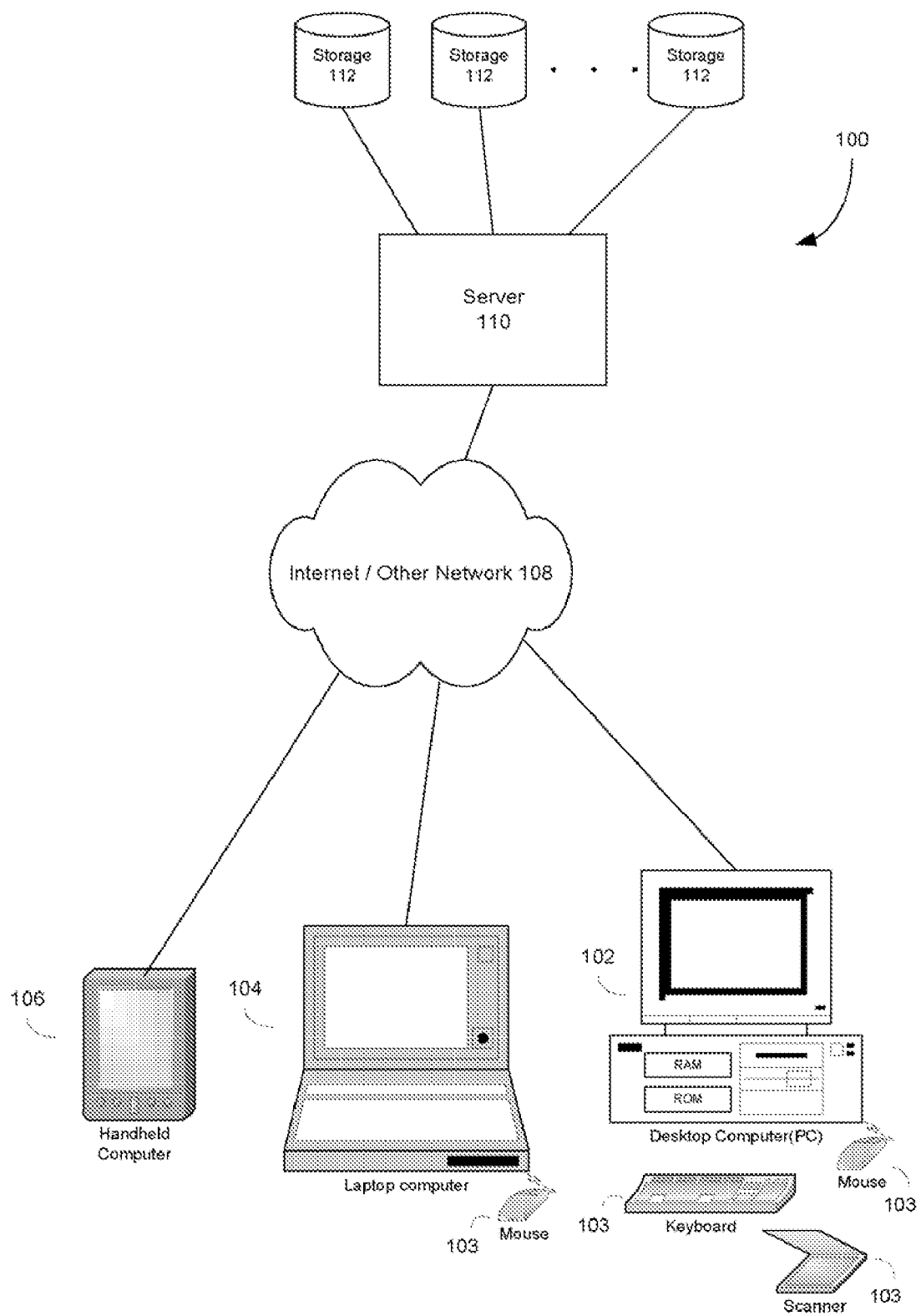
FIGS. 2A-B show schematic diagrams illustrating a conventional network-based computing system and network devices, in which aspects of the present invention can be deployed.
Figure 2B:
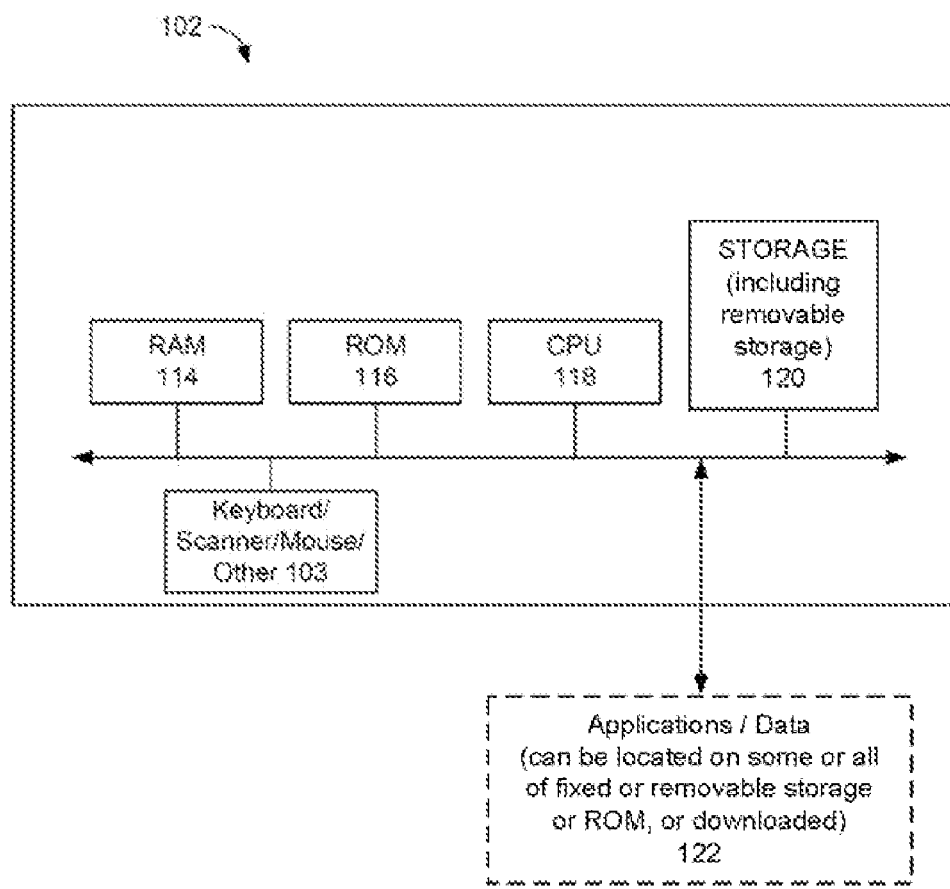

In addition to the computer system 10 shown in the drawings, methods, devices or software products in accordance with the present invention can operate on any of a wide range of conventional computing devices and systems, such as those depicted by way of example in FIGS. 2A and 2B (e.g., network system 100), whether standalone, networked, portable or fixed, including conventional PCs 102, laptops 104, handheld or mobile computers 106, or across the Internet or other networks 108, which may in turn include servers 110 and storage 112.

In line with conventional computer software and hardware practice, a software application configured in accordance with the invention can operate within, e.g. a PC 102 like that shown in FIGS. 1 and 2A-B, in which program instructions can be read from ROM or CD ROM 116 (FIG. 2B), magnetic disk or other storage 120 and loaded into RAM 114 for execution by CPU 118. Data can be input into the system via any known device or means, including a conventional keyboard, scanner, mouse, digitizing tablet, or other elements 103. As shown in FIG. 2B, the depicted storage 120 includes removable storage. As further shown in FIG. 2B, applications and data 122 can be located on some or all of fixed or removable storage or ROM, or downloaded.

Those skilled in the art will understand that the method aspects of the invention described herein can be executed in hardware elements, such as a Field-Programmable Gate Array (FPGA) or an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Such manufacturers include Intel Corporation and NVIDIA Corporation, both of Santa Clara, CA. The actual semiconductor elements of a conventional ASIC or equivalent integrated circuit are not part of the present invention, and will not be discussed in detail herein.

Those skilled in the art will also understand that ASICs or other conventional integrated circuit or semiconductor elements can be implemented in such a manner, using the teachings of the present invention as described in greater detail herein, to carry out the methods of the present invention as shown, for example, in FIGS. 3 et seq. discussed in greater detail below.

Those skilled in the art will also understand that method aspects of the present invention can be carried out within commercially available digital processing systems, such as workstations and personal computers (PCs), operating under the collective command of the workstation or PC's operating system and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer-readable RAM or ROM element, or any other known means of encoding, storing or providing digital information, whether local to or remote from the workstations, PC or other digital processing device or system. Various forms of computer readable elements and media are well known in the computing arts, and their selection is left to the implementer. In each case, the invention is operable to enable a computer system to calculate a pixel value, and the pixel value can be used by hardware elements in the computer system, which can be conventional elements such as graphics cards or display controllers, to generate a display-controlling electronic output. Conventional graphics cards and display controllers are well known in the computing arts, are not necessarily part of the present invention, and their selection can be left to the implementer.

EMBODIMENTS OF THE INVENTION

The invention will next be described in detail in the following pages, taken in connection with the attached drawing figures. Those skilled in the art will appreciate that various additions, subtractions, and other modifications and implementations of the invention can be practiced, and are within the spirit and scope of the present invention.

As noted above, known forms of integrated circuit or semiconductor elements such as FPGAs or ASICs can be implemented in such a manner, using the teachings of the present invention described herein, to carry out the methods of the present invention as shown, for example, in the drawings discussed in greater detail below.

Figure 3:
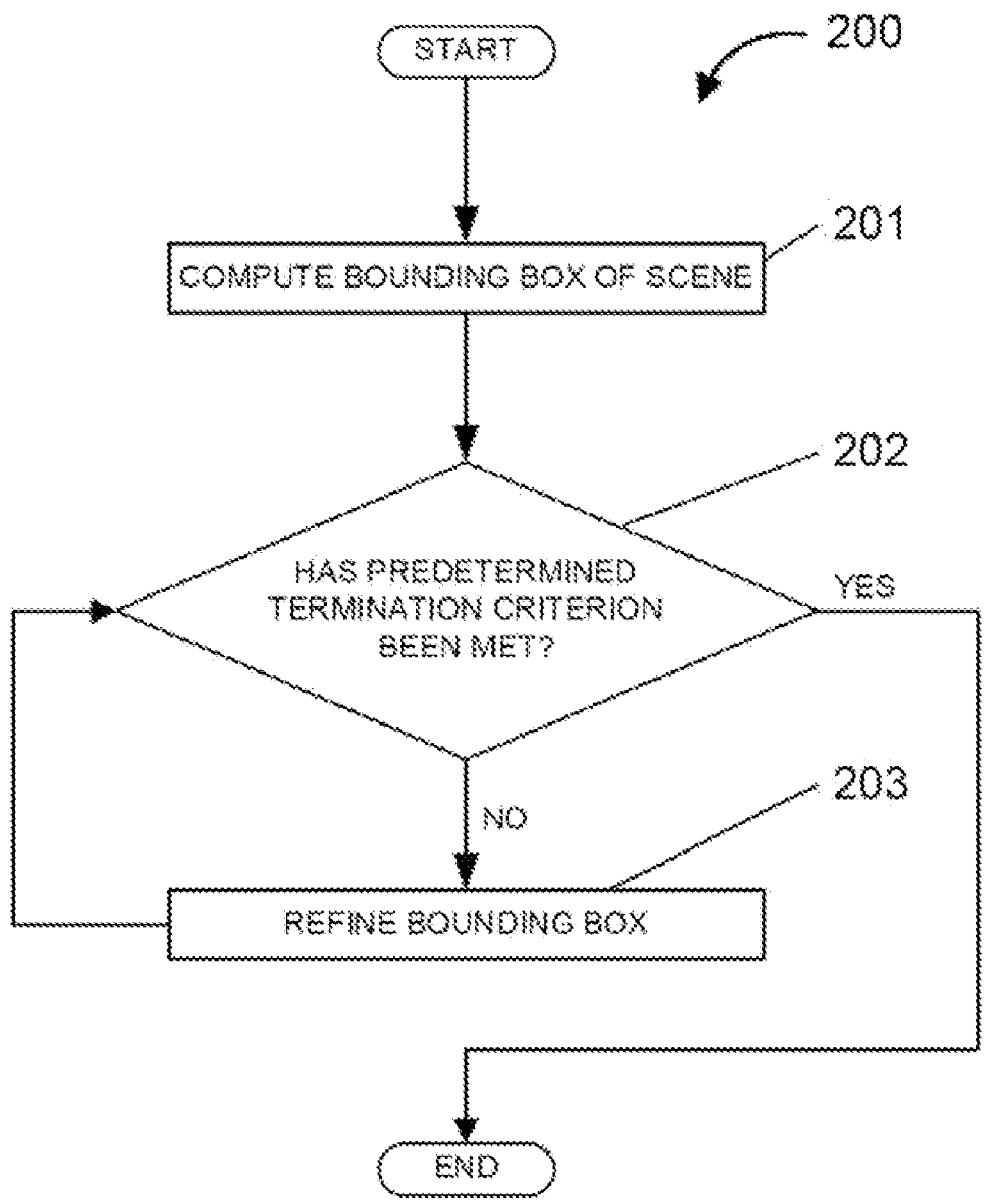
FIG. 3 is a diagram illustrating an overall method in accordance with a first aspect of the present invention.

The following discussion should thus be read with reference to FIGS. 3 et seq.; and is organized into the following sections:

I. Real-Time Precision Ray Tracing
  1. Overall Method
  2. Precision Ray Tracing Architecture
    2.1 Self-Intersection Problem
      2.1.1. Floating Point Precision Ray Freeform Surface Intersection
    2.2. Ray-Triangle Intersection
    2.3. High-Performance 3D-Tree Construction
      2.3.1. Splitting Plane Selection
      2.3.2. Minimum Storage Construction
      2.3.3. Tree Pruning by Left-Balancing
      2.3.4. High Numerical Precision Triangle Rectangle Intersection
    2.4. High-Performance Bounding Volume Hierarchy
      2.4.1. Construction
        2.4.1.1. Finding the Splitting Planes
        2.4.1.2. Inefficient Axis-Aligned Bounding Boxes
      2.4.2. Traversal
      2.4.3. On-the-Fly Bounding Volume Construction
    2.5. Radix Sort Processing
      2.5.1. Construction on Demand
  3. Summary of Real-Time Precision Ray Tracing Techniques
  4. Additional Techniques
    4A. Constructing a Bounding Volume Hierarchy by Cutting off Half Spaces
    4B. Clipping an Axis-Aligned Bounding Box by Four Axis-Aligned Planes
    4C. High-Performance Setup of Acceleration Data Structures
    4D. Efficient Tree Entry Node Determination
    4E. Bundle Traversal
II. Instant Ray Tracing
  1. Introduction
  2. Principles of Accelerated Ray Tracing
    2.1. Accelerated Ray Tracing Based on Partitioning of Space
      2.1.1 Space Partitioning Using Regular Grids
      2.1.2. Binary Space Partition
    2.2. Accelerated Ray Tracing Based on Partitioning of Object Lists
      2.2.1. Bounding Volume Hierarchy
    2.3. Summarizing Current Approaches to Accelerated Ray Tracing
  3. The Bounding Interval Hierarchy
    3.1. Data Structure
    3.2. Ray Intersection
    3.3. Construction of the Hierarchy
      3.3.1. Global Heuristic for Determining Splitting Planes
      3.3.2. Approximate Sorting -continued 3.3.3. Implementation Details
    3.4. Construction on Demand
  4. Discussion
    4.1. Memory Footprint
    4.2. Numerical Precision
    4.3. Tracing Ensembles of Rays
    4.4. Hardware Considerations
    4.5. Massive Data Sets
    4.6. Large Objects
  5. Results
  6. Conclusion I. Real-Time Precision Ray Tracing There are now described a precision ray tracing architecture and associated techniques. The described architecture and techniques address a number of issues, including problems in ray tracing due to floating point quantization and large memory requirements, as well as others.

1. Overall Method

FIG. 3 is a diagram depicting on overall method 200 in accordance with the techniques described herein. The method is practiced in the context of a computer graphics system, in which a pixel value is generated for each pixel in an image. Each generated pixel value is representative of a point in a scene as recorded on an image plane of a simulated camera. The computer graphics system is configured to generate the pixel value for an image using a selected ray-tracing methodology. The selected ray-tracing methodology includes the use of a ray tree that includes at least one ray shot from the pixel into a scene along a selected direction, and further includes calculations of the intersections of rays and objects (and/or surfaces of objects) in the scene.

In the FIG. 3 method 200, bounding volume hierarchies are used to calculate the intersections of rays and surfaces in the scene. In step 201, a bounding box of a scene is computed. In step 202, it is determined whether a predetermined termination criterion is met. If not, then in step 203 the axis-aligned bounding box is refined. The process continues recursively until the termination criterion is met. According to an aspect of the invention, the termination criterion is defined as a condition at which the bounding box coordinates differ only in one unit of resolution from a floating point representation of the ray surface intersection point. However, the scope of the present invention extends to other termination criteria.

The use of bounding volume hierarchies as an acceleration structure is advantageous for a number of reasons. The memory requirements for bounding volume hierarchies can be linearly bounded in the number of objects to be ray traced. Also, as described below, bounding volume hierarchies can be constructed much more efficiently than 3D-trees, which makes them very suitable for an amortized analysis, as required for fully animated scenes.

2. Precision Ray Tracing Architecture

The following discussion describes in greater detail certain issues in ray tracing technology, and particular aspects of the invention that address those issues.

2.1. Self-Intersection Problem

Figure 4:
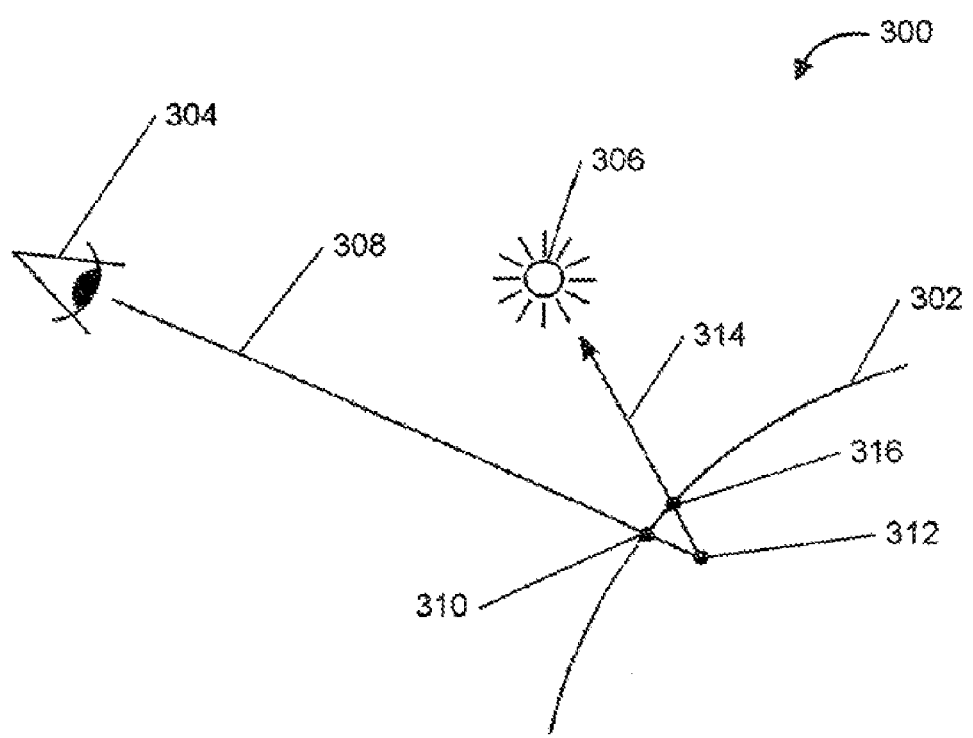
FIG. 4 is a diagram of a ray tracing procedure, illustrating the problem of self-intersection.

FIG. 4 is a diagram illustrating the "self-intersection" problem. FIG. 4 shows a ray tracing procedure 300, including a surface 302, an observation point 304, and a light source 306. In order to synthesize an image of the surface, a series of computations are performed in order to locate rays extending between the observation point 304 and the surface 302. FIG. 4 shows one such ray 308. Ideally, there is then calculated the exact point of intersection 310 between the ray 308 and the surface 302.

However, due to floating point arithmetic computations on computers, it is sometimes possible for the calculated ray/surface intersection point 312 to be different from the actual intersection point 310. Further, as illustrated in FIG. 4, it is possible for the calculated point 312 to be located on the "wrong" side of the surface 302. In that case, when computations are performed to locate a secondary ray 314 extending from the calculated ray/surface intersection point 312 to the light source 306, these computations indicate that the secondary ray 314 hits the surface 302 at a second intersection point 316 rather than extending directly to the light source 306, thus resulting in an imaging error.

One known solution to the self-intersection problem is to start each secondary ray 314 at a safe distance from the surface 302. This safe distance is typically expressed as a global floating point $\in$. However, the determination of the global floating point $\in$ depends heavily on the scene, and the particular location within the scene itself, for which an image is being synthesized.

An aspect or the invention provides a more precise alternative. After arriving at a calculated ray/surface intersection point 312, the calculated point 312 and the direction of the ray 308 are then used to re-compute an intersection point that is closer to the actual intersection point 310. This re-computation of the intersection point is incorporated into the ray tracing technique as an iteration that increases precision. If the iteratively computed intersection point turns out to be on the "wrong" side of the surface 302, it is moved to the "correct" side of the surface 302. The iteratively computed intersection point can be moved along the surface normal, or along the axis determined by the longest component of the normal. Instead of using a global floating point $\in$, the point is moved by an integer $\in$ to the last bits of the floating point mantissas.

The described procedure avoids computations in double precision and has the advantage that it implicitly adapts to the scale of the floating point number, which is determined by its exponent. Thus, in this implementation, all secondary rays directly start from these modified points making an $\in$-offset unnecessary. During intersection computation, it can therefore be assumed that the ray interval of validity to begin at 0 rather than some offset.

Modifying the integer representation of the mantissa also avoids numerical problems when intersecting a triangle and a plane in order to decide which points are on what side.

2.1.1. Floating Point Precision Ray Freeform Surface Intersection

Exploiting the convex hull property of convex combinations, intersections of rays and freeform surfaces can be found by refining an axis-aligned bounding box, which contains the point of intersection nearest to the ray original. This refinement can be continued until the resolution of floating point numbers is reached, i.e., until the bounding box coordinates differ only in one unit of resolution from the floating point representation. The self-intersection problem then is avoided by selecting the bounding box corner that is closest to the surface normal in the center of the bounding box. This corner point then is used to start the secondary ray.

2.2. Ray-Triangle Intersection

The above-described "ray object intersection test" is very efficient and benefits from the avoidance of the self-intersection problem. After constructing the acceleration data structure, the triangles are transformed in-place. The new representation encodes degenerate triangles so that the intersection test can handle them without extra effort. FIG. 5 shows an example of a code listing 320 for implementing the described technique. It of course is also possible to just prevent degenerate triangles to enter the graphics pipeline.

The test first determines the intersection of the ray and the plane of the triangle and then excludes intersections outside the valid interval [0.result.tfar] on the ray. This is achieved by only one integer test. Note that the +0 is excluded from the valid interval. This is important if denormalized floating point numbers are not supported. If this first determination is successful, the test proceeds by computing the Barycentric coordinates of the intersection. Note that again only an integer test, i.e., more specifically only testing two bits, is required to perform the complete inclusion test. Thus the number of branches is minimal. In order to enable this efficient test, the edges and the normal of the triangle are scaled appropriately in the transformation step.

The precision of the test is sufficient to avoid wrong or missed ray intersections. However, during traversal situations may occur in which it is appropriate to extend the triangles for a robust intersection test. This can be done before transforming the triangles. Since the triangles are projected along the axis identified by the longest component of their normal, this projection case has to be stored. This is achieved by counters in the leaf nodes of the acceleration data structure. The triangle references are sorted by the projection case and a leaf contains a byte for the number of triangles in each class. FIG. 6 shows a code listing 340 for implementing this aspect of the invention.

2.3. High-Performance 3D-Tree Construction

A further aspect of the present invention provides an improved approach for constructing acceleration data structures for ray tracing. Compared with prior software implementations that follow a number of different optimizations, the approach described herein yields significantly flatter trees with superior ray tracing performance.

2.3.1. Splitting Plane Selection

Candidates for splitting planes are given by the coordinates of the triangle vertices inside the axis-aligned bounding box to be partitioned. Note that this includes vertices that actually lie outside the bounding box, but have at least one coordinate that lies in one of the three intervals defined by the bounding box. Out of these candidates, there is selected the plane closest to middle of the longest side of the current axis-aligned bounding box. A further optimization selects only coordinates of triangles whose longest component of the surface normal matches the normal of the potential splitting plane. This procedure yields much flatter trees, since placing splitting planes through the triangle vertices implicitly reduces the number of triangles split by splitting planes. In addition, the surface is approximated tightly and empty space is maximized. If the number of triangles is higher than a specified threshold and there are no more candidates or splitting planes, the box is split in the middle along its longest side. This avoids inefficiencies of other approaches, including the use, for example, of long diagonal objects.

2.3.2. Minimum Storage Construction

The recursive procedure of deciding which triangles belong to the left and right child of a node in the hierarchy has typically required extensive bookkeeping and memory allocation. There is a much simpler approach that only fails in exceptional cases. Only two arrays of references to the objects to be ray traced are allocated. The first array is initialized with the object references. During recursive space partitions, a stack of the elements on the left is grown from the beginning of the array, while the elements, which are classified right, are kept on a stack growing from the end of the array towards the middle. In order to be able to quickly restore the elements that are intersecting a split plane, i.e., are both left and right, the second array keeps a stack of them. Thus backtracking is efficient and simple.

2.3.3. Tree Pruning by Left-Balancing

Instead of pruning branches of the tree by using the surface area heuristic, tree depth is pruned by approximately left-balancing the binary space partition starting from a fixed depth. As observed by exhaustive experimentation, a global fixed depth parameter can be specified across a vast variety of scenes. This can be understood by observing that after a certain amount of binary space partitions usually there remain connected components that are relatively flat in space.

2.3.4. High Numerical Precision Triangle Rectangle Intersection

In order to decide whether a triangle intersection the splitting plane is contained in the left and/or right partition of a bounding box, a numerically optimized 2d-version of a triangle-box intersection technique has been developed. There is first computed the intersection of the triangle with the splitting plane. A check is then performed as to how this line lies relative to the rectangle give by the intersection of the splitting plane and the bounding box. FIGS. 7A-D show all exemplary code listing 360 for implementing the described technique. Despite the apparent complexity of the code, the technique is more efficient and numerically stable than previous methods.

2.4. High-Performance Bounding Volume Hierarchy

Using bounding volume hierarchies, each object to be ray traced is referenced exactly once. As a consequence, and in contrast with 3D-trees, no mailbox mechanisms are required to prevent the multiple intersection of an object with a ray during the traversal of the hierarchy. This is a significant advantage from the viewpoint of system performance and makes implementations on a shared memory system much simpler. A second important consequence is that there cannot be more inner nodes in the tree of a bounding volume hierarchy than the total number of objects to be ray-traced. Thus the memory footprint of the acceleration data structure can be linearly bounded in the number of objects before construction. Such an a priori bound is not available for the construction of a 3D-tree, where the memory complexity is expected to increase quadratically with the number of objects to be ray-traced.

Thus, there is now described a new concept of bounding volume hierarchies that are significantly faster than current 3D-tree ray tracing techniques, and in which the memory requirements grow linearly, rather than expected quadratically, with the number of objects to be ray-traced.

2.4.1. Construction

The core concept that allows bounding volume hierarchies to outperform 3D-trees is to focus on how space can be partitioned, rather than focusing on the bounding volumes themselves.

Figure 8:
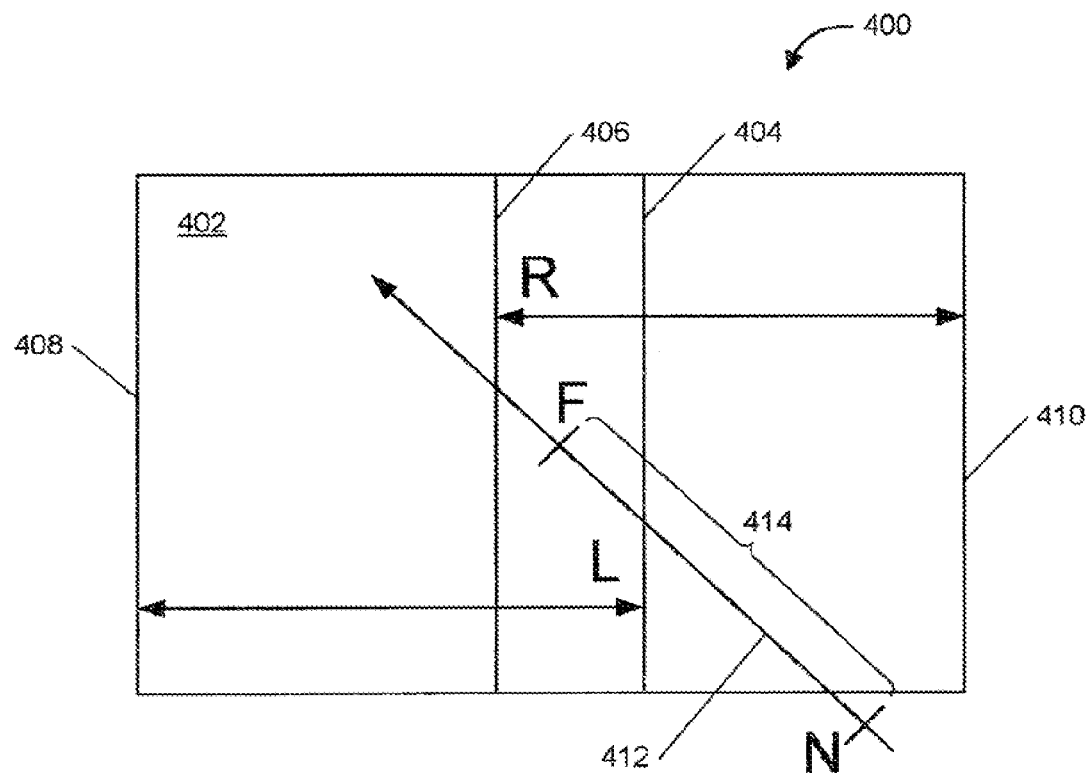
FIG. 8 shows a diagram, in elevation view, of a partitioned axis-aligned bounding box that is used as an acceleration data structure in accordance with a further aspect of the invention.

In a 3D-tree a bounding box is partitioned by a single plane. According to the present aspect of the invention, two parallel planes are used to define two axis-aligned bounding boxes. FIG. 8 is a diagram illustrating the principal data structure 400.

FIG. 8 shows an axis-aligned bounding box 402, in elevation view. Art L-plane 404 and an R-plane 406, which are axis-aligned and parallel with each other, are used to partition bounding box 402 into left and right axis-aligned bounding box. The left bounding box extends from the left wall 408 of the original bounding box 402 to the L-plane 404. The right bounding box extends from the R-plane 406 to the right wall 410 of the original bounding box 402. Thus, the left and right bounding boxes may overlap each other. The traversal of ray 412 is determined by the positions of intersection with the L- and R-planes 404 and 406 relative to the interval of validity [N, F] 414 of the ray 412.

In the FIG. 8 data structure 400, the L- and R-planes 404 and 406 are positioned with respect to each other to partition the set of objects contained within the original bounding box 402, rather than the space contained within the bounding box 402. In contrast with a 3D-tree partition, having two planes offers the possibility of maximizing the empty space between the two planes. Consequently the bounding of the scene can be approximated much faster.

Figure 9:
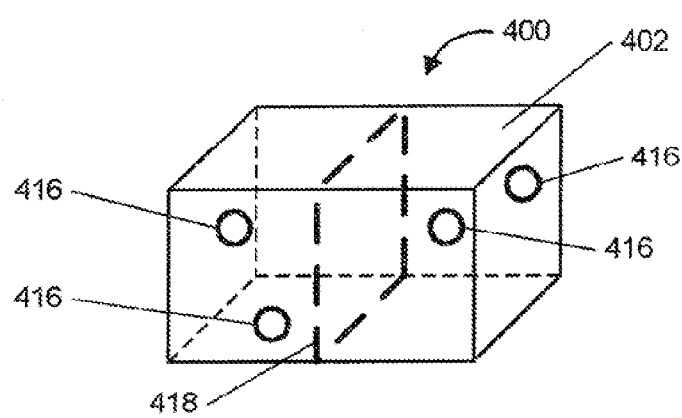

FIGS. 9-11 are a series of three-dimensional diagrams further illustrating data structure 400. FIG. 9 shows a diagram of bounding box 402. For purposes of illustration, virtual objects within bounding box 402 are depicted as abstract circles 416. As shown in FIGS. 10 and 11, L-plane 404 and R-plane 406 are then used to partition bounding box 402 into a left bounding box 402a and a right bounding box 402b. The L- and R-planes are selected such that empty space between them is maximized. Each virtual object 416 ends up in either the left bounding box 402a or the right bounding box 402b. As shown at the bottom of FIG. 11, the virtual objects 416 are partitioned into "left" objects 416a and "right" objects 416b. Each of the resulting bounding boxes 402a and 402b are themselves partitioned, and so on, until a termination criterion has been satisfied.

Figure 12:
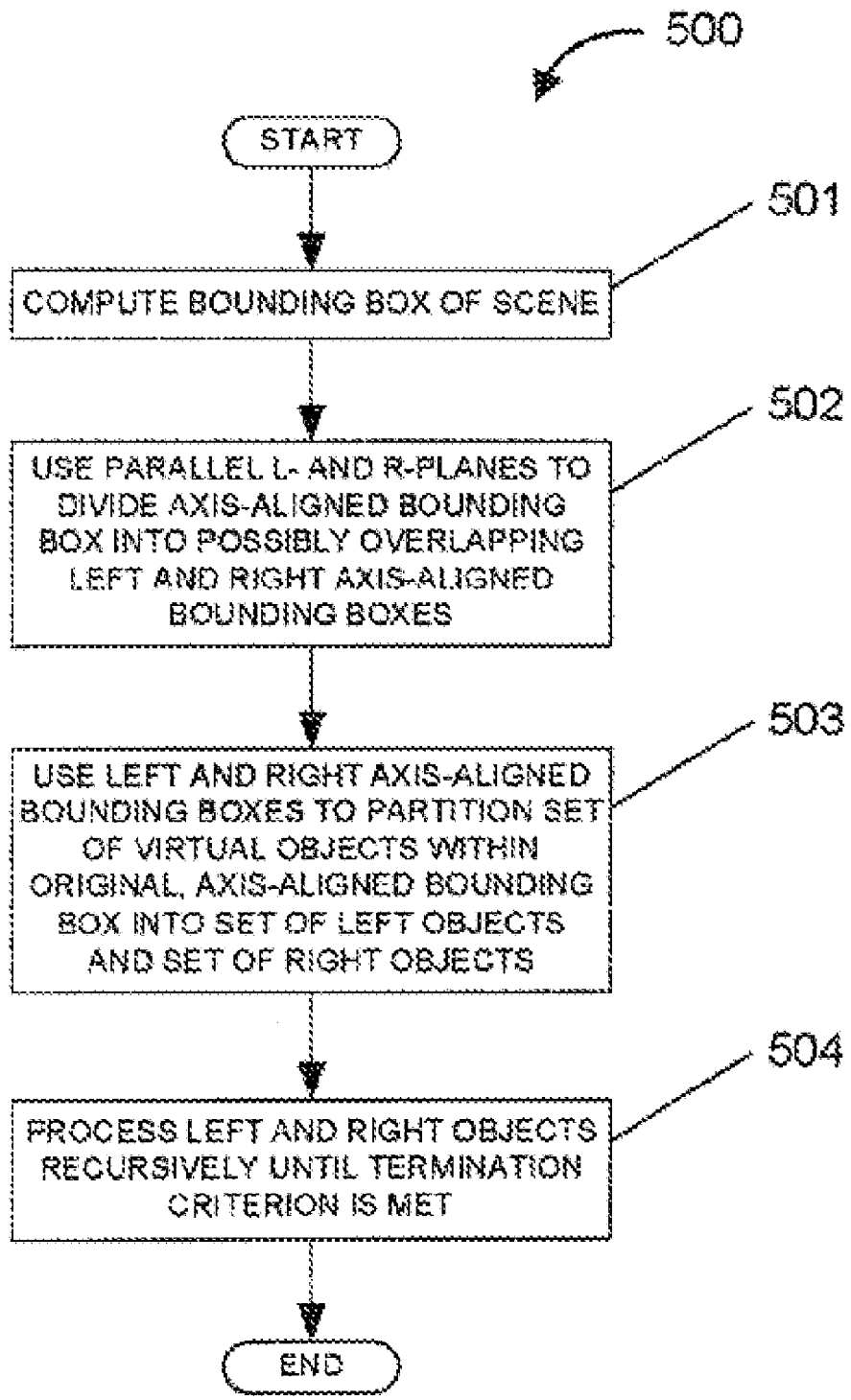
FIGS. 12 and 13 are flowcharts of ray tracing methods according to further aspects of the invention.

FIG. 12 is a flowchart of the described method 500. In step 501, a bounding box of a scene is computed. In step 502, parallel L- and R-planes are used to partition the axis-aligned bounding box left and right axis-aligned bounding boxes, which may overlap. In step 503, the left and right bounding boxes are used to partition the set of virtual objects contained with the original axis-aligned bounding box into a set of left objects and a set of right objects. In step 504, the left and right objects are processed recursively until a termination criterion is met.

Instead of one split parameter, used in earlier implementations, two split parameters are stored within a node. Since the number of nodes is linearly bounded by the number of objects to be ray traced, an array of all nodes can be allocated once. Thus, the costly memory management of 3D-trees during construction becomes unnecessary.

The construction technique is much simpler than the analog for 3D-tree construction and is easily implemented in a recursive way, or by using an iterative version and a stack. Given a list of objects and an axis-aligned bounding box, the L- and R-planes are determined, and the set of objects is determined accordingly. The left and right objects are then processed recursively until some termination criterion is met. Since the number of inner nodes is bounded, it is safe to rely on termination when there is only one object left.

It should be noted that the partition only relies on sorting objects along planes that are perpendicular to the x-, y-, and z-axes, which is very efficient and numerically absolutely stable. In contrast with 3D-trees, no exact intersections of objects with splitting planes need to be computed, which is more costly and hard to achieve in a numerically robust way. Numerical problems of 3D-trees, such as missed triangles at vertices and along edges, can be avoided by extending the triangles before the construction of the bounding volume hierarchy. Also, in a 3D--tree, overlapping objects have to be sorted both into the left and right axis-aligned bounding boxes, thereby causing an expected quadratic growth of the tree.

2.4.1.1. Finding the Splitting Planes

Various techniques may be used to determine the L- and R-planes, and thus the actual tree layout. Returning to FIGS. 9-11, one technique is to determine a plane M 418 using the 3D-tree construction technique described above and partition the objects such at the overlap of the resulting L-pane and R-plane of the new axis-aligned bounding boxes minimally overlaps the suggested splitting plane M 418. The resulting tree is very similar to the corresponding 3D-tree, however, since the object sets are partitioned rather than space, the resulting tree is much flatter. Another approach is to select the R-plane and L-plane in such a way that the overlap of child boxes is minimal and the empty space is maximized if possible.

2.4.1.2. Inefficient Axis-Aligned Bounding Boxes

It should be noted that for some objects axis-aligned bounding boxes are inefficient. An example of such a situation is a long cylinder with small radius on the diagonal of an axis-aligned bounding box.

Figure 13:
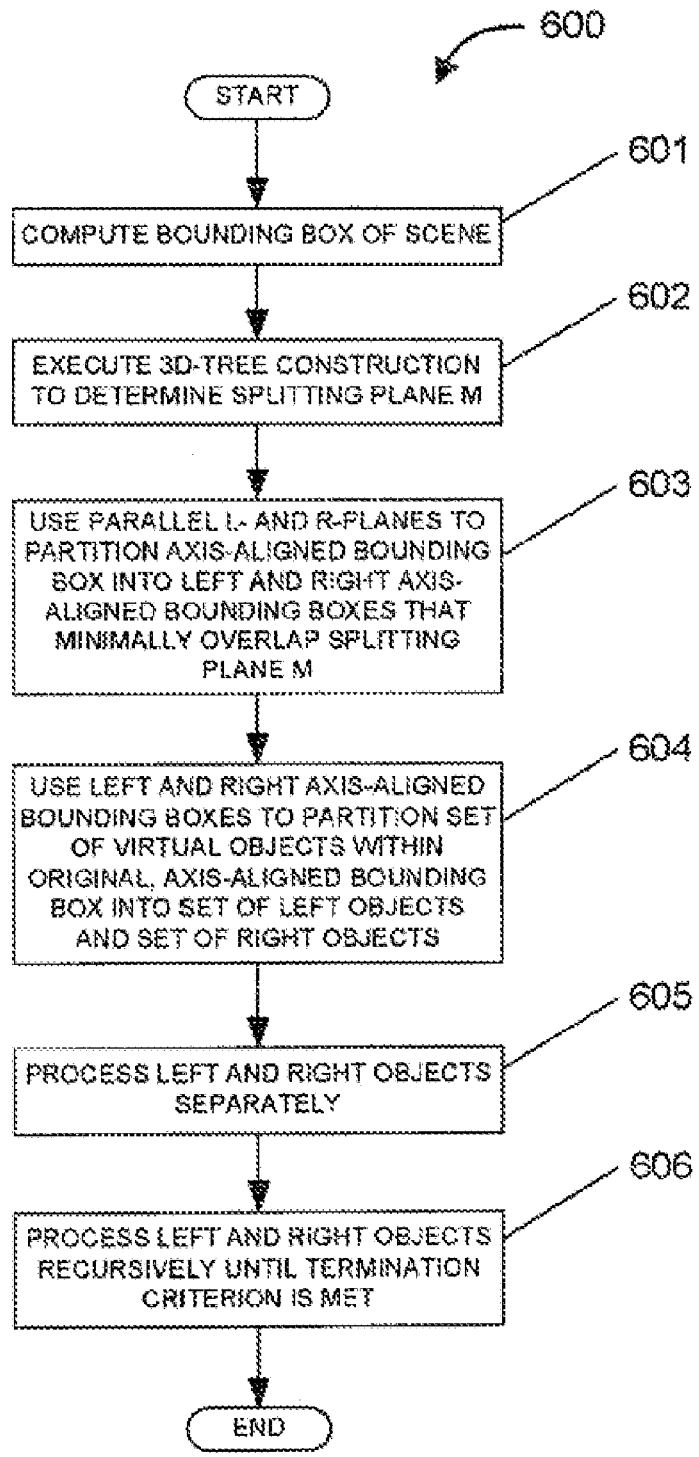

FIG. 13 is a flowchart of a method 600 according to this aspect of the invention. In step 601, a bounding box of a scene is computed. In step 602, a 3D-tree construction is executed to determine a splitting plane M. In step 603, parallel L- and R-planes are used to partition the axis-aligned bounding box into left and right axis-aligned bounding boxes that minimally overlap the splitting plane M. In step 604, the left and right bounding boxes are used to partition the set of virtual objects contained within the original axis-aligned bounding box into a set of left objects and a set of right objects. In step 605, the left and right objects are processed recursively until a termination criterion is met. It should be noted that the method 600 illustrated in FIG. 13, as well as the method 200 illustrated in FIG. 3, may be combined with other techniques described herein, including techniques relating to 3D-tree construction, real-time processing, bucket sorting, self-intersection and the like.

In the case of the 3 D-tree, the spatial subdivision is continued so as to cut off the empty portions of the space around the object. In the case of the described bounding volume hierarchy, partitioning such objects into smaller ones results in a similar behavior. In order to maintain the predictability of the memory requirements, a maximum bounding box size is defined. All objects with an extent that exceeds the maximum bounding box size are split into smaller portions to meet the requirement. The maximum allowed size can be found by scanning the data set for the minimal extent among all objects.

2.4.2. Traversal

The data structure described herein allows the transfer of the principles of fast 3D-tree traversal to bounding volume hierarchies. The cases of traversal are similar: (1) only the left child; (2) only the right child; (3) the left child and then the right child; (4) the right child and then the left child; or (5) the ray is between split planes (i.e., empty space). Since one node in the described technique is split by two parallel planes, the order of how to traverse the boxes is determined by the ray direction. FIGS. 14A-C set forth a source code listing 610 incorporating the techniques described above.

Previous bounding volume hierarchy techniques could not efficiently determine the order of how traverse the child nodes or required additional effort, such as updating a heap data structure. In addition a whole bounding volume had to be loaded and tested against the ray, while the present approach only requires the two plane distances. Checking the ray against the two planes in software seems to be more expensive, however. The traversal is the bottle neck in 3D-trees, and doing some more computation here better hides the latencies of memory access. In addition, the bounding volume hierarchy trees tend to be much smaller than corresponding 3D-trees of same performance.

Although there is herein described a new bounding volume hierarchy, there is a strong link to traversing 3D-trees: Setting L=R, the classical binary space partition is obtained, and the traversal algorithm collapses to the traversal algorithm for 3D-trees.

2.4.3. On-the-Fly Bounding Volume Construction

The described bounding volume hierarchy also can be applied to efficiently find ray freeform surface intersections by subdividing the freeform surface. Doing so allows the intersection of a freeform surface with a convex hull property and a subdivision algorithm efficiently to be computed up to floating point precision, depending on the actual floating point arithmetic. A subdivision step is performed, for example, for polynomial surfaces, rational surfaces, and approximating subdivision surfaces. For each axis in space the possibly overlapping bounding boxes are determined as discussed above. In case of a binary subdivision, the intersection of the L-boxes and the intersection of the R-boxes for new bounding boxes of the new meshes. Now the above-described traversal can be efficiently performed, since the spatial order of the boxes is known. Instead of pre-computing the hierarchy of bounding volumes, it can be computed on the fly. This procedure is efficient for freeform surfaces and allows one to save the memory for the acceleration data structure, which is replaced by a small stack of the bounding volumes that have to be traversed by backtracking. The subdivision is continued until the ray surface intersection lies in a bounding volume that collapsed to a point in floating point precision or an interval of a small size. Section 2.1.1 of the Appendix sets forth a code listing in accordance with this aspect of the invention.

2.5. Radix Sort Processing

Using regular grids as an acceleration data structure in ray tracing is simple, but efficiency suffers from a lack of spatial adaptivity and the subsequent traversal of many empty grid cells. Hierarchical regular grids can improve on the situation but still are inferior as compared to bounding volume hierarchies and 3D-trees. However, regular grids can be used to improve on the construction speed of acceleration data structures. The technique for constructing the acceleration data structures are similar to quick sorting and are expected to run in O(n log n). An improvement can be obtained by applying bucket sorting, which runs in linear time. Therefore the axis-aligned bounding box of the objects is partitioned into $n_x \times n_y \times n_z$ axis-aligned boxes. Each object then is sorted into exactly one of these boxes by one selected point, e.g., the center of gravity or the first vertex of each triangle could be used. Then the actual axis-aligned bounding box of the objects in each grid cell is determined. These axis-aligned bounding boxes are used instead of the objects they contain as long as the box does not intersect one of the division planes. In that case the box is unpacked and instead the objects in the box will be used directly. This procedure saves a lot of comparisons and memory accesses, noticeably improves the constant of the order of the construction techniques, and also can be applied recursively. The above technique is especially appealing to hardware implementations, since it can be realized by processing a stream of objects.

2.5.1. Construction on Demand

The acceleration data structures can be built on demand, i.e., at the time when a ray is traversing a specific axis-aligned bounding box with its objects. Then on the one hand the acceleration data structure never becomes refined in regions of space, which are invisible to the rays, and caches are not polluted by data that is never touched. On the other hand after refinement the objects possibly intersected by a ray are already in the caches.

3. Summary of Real-Time Precision Ray Tracing Techniques

From the above discussion, it will be seen that the present invention addresses long known issues in ray tracing and provides techniques for ray tracing having improved precision, overall speed and memory footprint of the acceleration data structures. the improvements in numerical precision transfer to other number systems as well as, for example, to the logarithmic number system used in the hardware of the ART ray tracing chips. It is noted that the specific implementation of the IEEE floating point standard on a processor or a dedicated hardware can severely influence performance. For example, on a Pentium 4 chip denormalized numbers can degrade performance by a factor of 100 and more. As discussed above, an implementation of the invention avoids these exceptions. The view of bounding volume hierarchies described herein makes them suited for real-time ray tracing. In an amortized analysis, the described techniques outperform the previous state of the art, thus allowing more precise techniques to be used, for example, for computing motion blur in fully animated scene, as in a production setting or the like. It will be apparent from the above discussion that the described bounding volume hierarchies have significant advantages when compared with 3D-trees and other techniques, particularly in hardware implementations and for huge scenes. In an amorized analysis, the described bounding volume hierarchies outperform current 3D-trees by at least a factor of two. In addition, the memory footprint can be determined beforehand and is linear in the number of objects.

4. Additional Techniques

In addition to the above-described techniques, other techniques according to further aspects of the invention may be used to improve the performance of a ray tracing system. These aspects of the invention include the following:

4A. Constructing a Bounding Volume Hierarchy by Cutting off Half Spaces

4B. Clipping an Axis-Aligned Bounding Box by Four Axis-Aligned Planes

4C. High Performance Setup of Acceleration Data Structures

4D. Efficient Tree Entry Node Determination

4E. Bundle Traversal

Each of the aspects of the invention is described in further detail below.

4A. Constructing a Bounding Volume Hierarchy by Cutting off Half Spaces

It is possible to construct a bounding volume hierarchy by cutting off half-spaces. Using a half-space, which intersects an axis-aligned bounding box, a bounding volume hierarchy is given by the original bounding box and the new bounding box, which results from the intersection with the given half-space.

FIG. 15 shows a diagram illustrating the described technique. In FIG. 15, a bounding box 620 that is intersected by an axis-aligned plane 622. The plane 622 defines a smaller axis-aligned box 624, i.e., a half-space, which is a subset of the original box 620. The part of the original box, which is to be clipped, is determined by the normal of the clipping plane 622. During ray traversal, three cases have to be determined. The valid interval [N, F] on the ray intersects (1) only the original box 620; (2) first the original box 620, and then the clipped box 624; or (3) first the clipped box 624, and then the original box 620.

The described technique can be applied recursively in order to represent a bounding volume hierarchy constructed from the axis-aligned bounding box of the scene and half-spaces. A binary tree is used to represent the hierarchy. The inner nodes of the tree represent the half-spaces.

The described technique provides many of the advantages as the techniques described above. In addition, the memory footprint of the nodes is smaller. FIG. 16 shows an exemplary code listing 630 embodying the described technique. It should be noted that leafs can also be encoded by using the 4th case of the protection axis, i.e., bits 0 and 1 are "one," which is not used in the code example.

Intersecting a ray with the bounding volume hierarchy is done depth first, where in each node, only three cases have to be distinguished, as discussed above. The valid interval of the ray intersects (1) only the original bounding box; (2) first the clipped box and then the original box; or (3) first the original box and then the clipped box.

FIGS. 17A-D show an example of a code listing 640 for implementing the tracing of one ray through a bounding volume hierarchy. For the sake of efficiency, the implementation avoids visiting empty leaf nodes. Visiting all empty leaf nodes simplifies the implementation at the cost of efficiency.

The triangle test used is highly optimized. However, any other triangle ray intersection test can be used as well.

4B. Clipping an Axis-Aligned Bounding Box by Four Axis-aligned Planes

Figures 18, 19:
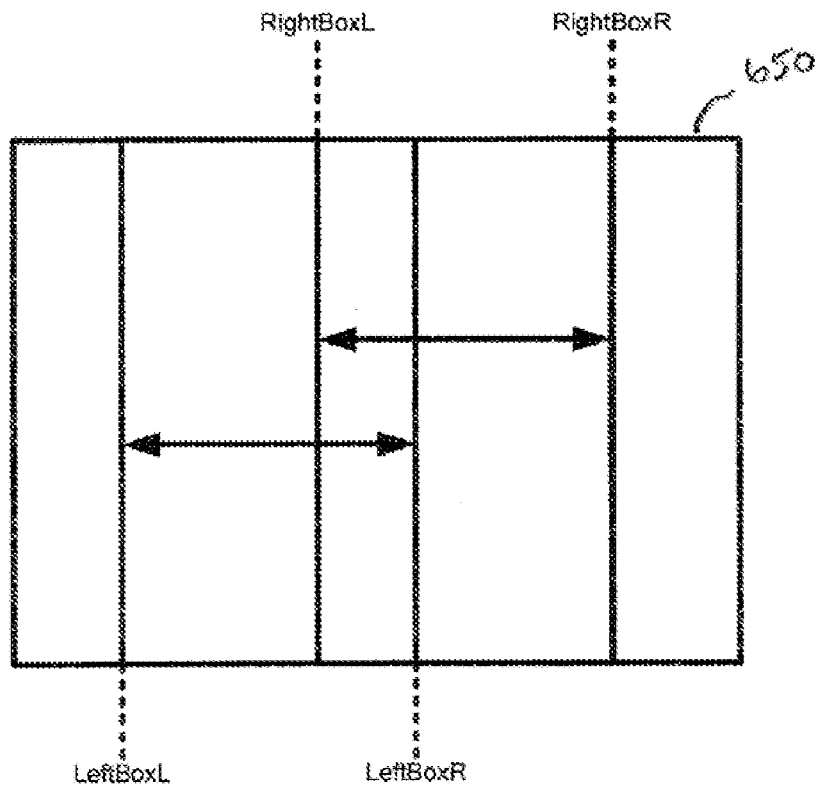
FIG. 18 shows a diagram of a bounding box that has been clipped by four axis-aligned planes in accordance with a further aspect of the invention.
FIG. 19 shows an example of a code listing for implementing a data structure in accordance with the diagram shown in FIG. 18.

FIG. 18 shows a diagram illustrating a technique according to a further aspect of the invention. In FIG. 18, an axis-aligned bounding box 650 has been clipped by four axis-aligned planes LeftBoxL, RightBoxL, LeftBoxR and RightBoxR, resulting in a left child box and a right child box. The left and right boundaries of the left child box are defined by planes LeftBoxL and LeftBoxR. The left and right boundaries of the right child box are defined by planes RightBoxL and RightBoxR. During ray traversal, five cases have to be determined. The valid interval [N, F] on the ray intersects: (1) only the left child box; (2) only the right child box; (3) first the left child box and the right child box; (4) first the right child box and then the left child box; or (5) neither the left child box nor the right child box.

The hierarchy is represented as a binary tree, where each node specifies two intervals along a selected axis. Opposite to a classic bounding volume hierarchy implementation, an ordering of the children nodes is possible and it is not necessary to store full axis-aligned bounding boxes. Compared with the technique described in the previous section, a single node requires more memory. However, no special case of empty nodes can occur. In total, the memory then remains substantially the same.

FIG. 19 shows an exemplary code listing 660 embodying the described technique. It should be noted that leafs can also be encoded by using the 4th case of the projection axis, i.e., bits 0 and 1 are "one," which is not used in the code example.

FIGS. 20A-C show an exemplary code listing 670 of an implementation of a traversal using a tree built using the above data structure. The depicted implementation does not include certain optimizations. For example, as one of the intervals defined by a node can completely include the other one along the specified axis, a more efficient traversal would consider that case by not only selecting the first node to be traversed by the ray direction, but also by the relative position of the intervals itself. As this optimization is relatively straightforward, it has not been included in the present example.

4C. High-Performance Setup of Acceleration Data Structures

The setup procedure of the tree acceleration data structures implicitly invokes sorting algorithms, which have a time complexity of $\sigma(n \log n)$ in the number n of triangles. Only radix, bucket, and related sorting algorithms can obtain a lower order of time complexity In Section II, below, there is described an instant ray tracing technique, in which rapid tree setup procedures are developed. These setup procedures in fact were used for setting up all the data structures mentioned above. As described below, a bucket sort preprocessing is described that also can be used in a hierarchical fashion, i.e., using a hierarchy of regular grids. As further described below, a global subdivision criterion is used rather than local one.

This setup routine is rapid for kd-trees and bounding volume hierarchies. The described technique is especially efficient for setting up the hierarchy from subsection 4B, above. A lot of candidate splitting planes are immediately rejected, since the described technique does not only separate right from left objects, but in fact bounds the intervals spanned by the right and left objects. Thus, the hierarchy becomes flatter and is even more efficient to traverse. As these optimizations are relatively straightforward, they have not been included in the example code listings herein.

While the specification of intervals along an axis as in section 4B allows the efficient rejection of rays that are outside these intervals, it can, in addition, allow the efficient cutting off of empty volumes on the other axes. This can be done by specifying the clip volume in the leaf nodes of the hierarchies. A single heuristic inserts a bounding box test in a leaf if the empty volume of the leaf node is beyond a certain threshold. Alternatively, in the case of the techniques described in section 4B, there may be inserted a test for the maximally missing two axes.

As further described below, the acceleration data structures can be built on demand, meaning that only the parts of the trees are constructed that are traversed by rays. The required data is easily stored in preliminary leaf nodes. Considering the techniques described in section 4B, it is also possible to maximize empty space instead of minimizing overlap.

4D. Efficient Tree Entry Node Determination

For a given set of rays the axis-aligned bounding box can be determined in linear time in the number of rays or determined in even constant time, if more properties are known. For this bounding box, it is relatively straightforward and numerically robust to determine whether it lies on one side or a splitting plane or intersects the splitting plane. This technique can be used in a recursive procedure to traverse down an acceleration data structure as mentioned above. If the box lies on one side of the splitting planes identified by the inner nodes of the tree, this branch is used for further traversal. Upon encountering a leaf node or a plane, which intersects the ray bounding box, this node is identified as the common entry node for the bundle of rays. Then instead of traversing the rays from the root node of the acceleration data structure, the traversal can be started from the entry node.

The advantage of this technique is that, instead of intersecting all rays with the splitting planes, only one bounding box is tested against the splitting planes, thus saving a lot of arithmetic computations.

The described technique relies on ray bundles that take a small fraction of space instead of coherent directions, which is much harder to achieve, especially for secondary rays. It is simple to implement and more general than other techniques.

4E. Bundle Traversal

According to a further aspect of the invention, ray bundle intersection routines have been implemented wherein SIMD instructions are used to simultaneously trace a bundle of rays through the different acceleration structures. The implementation is derived from traversed ray bundles in 3d trees. It is noted that the optimization introduced can also be used with the described bounding volume hierarchy representations.

II. Instant Ray Tracing

There are now described ray tracing techniques and systems that allow an acceleration data structure to be constructed instantly. The described techniques and systems are based on a global heuristic, while significantly improves upon previous techniques based on local criteria. Besides speed, the described techniques and systems have a number of advantages compared to previous techniques. The described techniques and systems are simpler to implement, exhibit higher numerical precision, and use only a fraction of the memory used by prior techniques. The described techniques and systems have been demonstrated by extensive measurements of their application to massive as well as dynamic scenes.

The present description is organized into the following sections:

1. Introduction

As discussed above, ray tracing is a core technique in photorealistic image synthesis by global illumination simulation. It also underlies many other simulation methods. Recently, real-time ray tracing has become available. Current ray tracing algorithms owe their efficiency to additional data structures that ate constructed beforehand based upon an analysis of the scene geometry. The construction of additional data structures typically requires considerable amounts of processing time and memory. Consequently, preprocessing has typically amortized only for environments that are static or that contain moderate dynamics.

Software ray tracing can compete with high-end graphics image synthesis hardware for massive geometry. Further, the acceleration data structures of ray tracing can be used to enhance the performance of rasterization. Compared to immediate-mode rendering on a rasterizer, however, the construction time and memory footprint of the acceleration data structures have been prohibitive.

Described herein is a hierarchical acceleration data structure for ray tracing that can be constructed much more efficiently than data structures constructed using prior techniques. The procedure has proven to be sufficiently rapid to allow interactive ray tracing of dynamic scenes to be made available even on monoprocessor systems.

Figure 21A:
FIGS. 21A-D show a series of images from animations and interactive applications generated using the described ray tracing techniques.
Figure 21B:
Figure 21C:
Figure 21D:
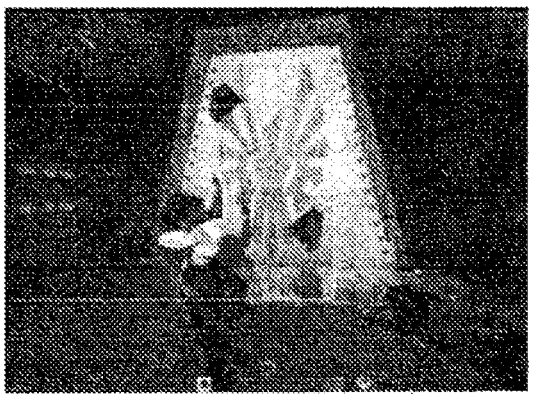

FIGS. 21A-D shows a series of images 701-704 from animations and interactive applications generated using the ray tracing techniques described herein at interactive rates on a single processor. FIG. 21D shows a scene from Quake II (Id Software, www.idsoftware.com). Applying the techniques described herein, it has been found that Quake II can be played smoothly on a dual-core processor with one shadow, reflections, and transparency.

2. Principles of Accelerated Ray Tracing

Generally speaking, a "scene" is an arrangement of objects within a three-dimensional space. The basic task in ray tracing is to search for the closest point of intersection of each ray with objects within a scene. Generally speaking, when tracing extremely large numbers of rays for image synthesis, it is not efficient to test for intersections of each ray with all of the objects in a scene. Therefore, it typically amortizes to construct additional data structures that split the scene into a number of partitions. Once the scene has been partitioned, a partition-level search, often a backtracking search, can be conducted that excludes most of the objects in the scene from actual intersection testing.

Two basic approaches are currently used to partition a scene. A first approach is based on spatial partitioning, according to which the scene is partitioned into a set of disjoint volume elements that may or may not be the same size. A second approach is based on object listing, according to which the scene is partitioned into a hierarchy of lists of objects contained in the scene. These two approaches are briefly sketched in the following subsections. As further discussed below, aside from amortizing the construction cost of the acceleration data structure, there are situations in which the additional cost of not only tracing single rays, but also ensembles of rays, can amortize.

2.1. Accelerated Ray Tracing Based on Partitioning of Space

The space containing the objects is partitioned into disjoint volume elements. Efficiency is obtained by enumerating the volume elements intersected by a ray and then testing the objects within the enumerated volume elements for intersection. A major disadvantage of space partitions is that objects often have non-empty intersections with more than one volume element, and are therefore referenced more than once. This redundancy results in a huge memory footprint and may require a mailbox mechanism to avoid performance losses arising from multiple tested intersections of a single ray with the same geometric object.

In partitioning the space, the resulting volume elements may form a regular grid. Alternatively, for example, using a binary space partitioning scheme, the space may be split into a hierarchical tree of voxels (volume cells), and sub-voxels. Each approach is discussed in turn.

2.1.1. Space Partitioning Using Regular Grids

In a partition based on a regular grid, the space is partitioned into a raster of identical rectangular axis-aligned volumes. This regular structure allows for simple techniques for enumerating the volume elements along a given ray. Each volume element contains a list of the objects that it intersects. Thus, only the listed objects in the enumerated volume elements are tested for intersection with the ray.

The memory footprint of the acceleration data structure cannot be determined a priori (i.e., in advance). Because objects can intersect multiple volume elements in the grid, the memory footprint cannot be determined until the space has been partitioned and the objects listed. Thus, dynamic memory management is required. The data structure is constructed by rasterizing the objects. Rasterization is typically performed using variants of an object-volume intersection routine, which is numerically unreliable due to the finite precision of floating point arithmetic. Rasterizing the bounding box of an object is numerically stable, but increases the memory footprint.

The efficiency of the regular grid approach suffers severely when traversing empty volume elements, especially in massive scenes. One solution to this problem is to use hierarchical grids that allow empty space to be traversed faster, while still having a moderate number of objects per volume element. Switching between the levels of the hierarchy, however, is computationally expensive and can be achieved more efficiently by other spatially adaptive schemes.

2.1.2. Binary Space Partition

A binary space partition is a hierarchical data structure. The general idea is to subdivide a scene space using arbitrary splitting planes. A first arbitrary plane is used to divide the scene space into two cells. Additional arbitrary planes are used to adaptively divide each of the two cells into sub-cells. The process is repeated recursively, in order to generate a binary search tree. Each leaf cell of the generated search tree is a volume element that contains a list of objects intersecting the leaf cell.

A binary space partitioning scheme helps to overcome the efficiency issues of regular grids caused by empty volume elements. In polygonal scenes, an obvious choice for the location of the splitting planes is to use the planes determined by the polygons themselves. However, it is currently not known how to do this in an optimal way, and randomized algorithms are expected to yield trees of quadratic size based on the number of objects in the scene.

A type of tree known as a "k-dimensional tree," or "kd-tree," restricts binary space partitions to using only planes that are perpendicular to the canonical axes. Since all normals of the subdivision planes coincide with a unit vector of one of the canonical axes, scalar products and object-volume element intersection tests become more efficient and numerically robust than those obtainable using a binary space partition scheme that is not axis-aligned. Along with heuristics for subdivision, kd-trees have been used successfully for accelerating ray tracing. However, the determination of how a volume element intersects an object remains a numerical issue.

As with all spatial partitioning schemes, in a kd-tree-based scheme, objects can reside in more than one volume element. Although the number of multiple references can be effectively reduced by allowing only partitioning planes through the vertices of the objects, or through the sides of axis-aligned bounding boxes, the number of references cannot efficiently be bounded a priori. Consequently, memory management becomes an issue during the construction of the hierarchy. Known heuristics used for memory estimation and allocation can be far too pessimistic for some scenes or, even worse, can result in various reallocations if the memory footprint increases during the construction phase. These reallocations can result in significant performance losses.

2.2. Accelerated Ray Tracing Based on Partitioning of Object Lists

When partitioning a list of objects, each object remains referenced at most once, and it is therefore possible to predict memory requirement a priori. In addition, each object is intersected at most once with a given ray. Consequently, mailboxes become redundant. As can unavoidable consequence, however, the volumes enclosing groups of objects often cannot be disjoint.

2.2.1. Bounding Volume Hierarchy

A bounding volume hierarchy is a type of partitioning scheme in which objects in a scene are bounded by axis-aligned volume elements. Bounding volume hierarchies are commonly used in industry since memory requirements can be bounded linearly, a priori, based upon the number of objects. Implementing bounding volume hierarchies does not require object-plane intersection routines. As a consequence, they are simpler to implement than spatial partitioning schemes. Using axis-aligned rectangular bounding volume elements avoids any numerical stability issues during construction as only minimum/maximum operations are used.

There exist heuristics for both bottom-up and top-down construction of bounding volume hierarchies. The usual heuristic is to minimize the overall volume or area of all bounding volume elements. Exact optimization procedures along these lines are prohibitively slow. Currently, it is not clear which construction technique is the most efficient.

Severe performance penalties stem from the fact that, in contrast with space partitions, the bounding volume elements are not ordered spatially. Thus, usually all child nodes have to be intersected with a ray, and an early pruning is impossible.

2.3. Summarizing Current Approaches to Accelerated Ray Tracing

The simplicity, numerical robustness, and predictable memory footprint make bounding volume hierarchies an attractive choice for accelerated ray tracing. However, current performance is far from what is obtainable using kd-trees. At the price of generally unpredictable memory requirements and numerical issues arising during the construction of the acceleration data structure. kd-trees can be used to obtain real-time performance for static and moderately dynamic scenes.

Both principal approaches, i.e., those based on either space partitioning or on object lists, suffer from construction routines that are far from real-time and use greedy algorithms Even the most successful implementation, the surface area heuristic, is extremely time-consuming. As thus heuristic requires a significant amount of analysis of scene geometry and twiddling, the construction of acceleration data structures for a complex mesh can easily range from minutes to even days.

Using current techniques, it is possible to reduce data structure construction times to the point where they amortize for static scenes, very moderate dynamics, or deformables. However, it is far more difficult for construction times to amortize in fully dynamic settings. Current attempts to deal with fully dynamic scenes use an approach based on regular grids, with all its disadvantages, and are only efficient for scenes of moderate complexity.

3. The Bounding Interval Hierarchy

An aspect of the present invention provides a technique, based on a "bounding interval hierarchy," that offers significantly increased speed for both static and dynamic scenes, features much higher numerical precision, and allows the memory footprint to be fixed a priori. The described techniques, thus, combine the advantages of spatial partitioning and partitioning object lists. Comparisons with two fully optimized, state-of-the-art, kd-tree-based ray tracers show that the described technique can outperform a kd-tree-based technique for most scenes by a factor of two or greater for both total rendering time and overall memory consumption. Some of the results obtained using the described techniques are set forth in the table shown in FIG. 37, discussed below.

3.1. Data Structure

For each node in the data structure, a bounding interval hierarchy stores, for one of the x-, y-, or z-axes, two parallel planes perpendicular to the axis. By contrast, in a classic bounding volume hierarchy a full axis-aligned bounding box is stored for each child.

According to the presently described technique, given a bounding box and a selected axis, a left child L is generated by replacing the maximum value along the selected axis by an L splitting plane. the right child R is generated by replacing the minimum value along the selected axis by an R splitting plane.

Thus, the left side of the generated L child will be inherited from the left side of the parent bounding box, and the right side of the L child will be the L splitting plane. The left side of the R child will be the R splitting plane, and the right side of the R child will be inherited from the right side of the parent bounding box. As described in greater detail below, the L child and R child may or may not overlap. If the placement of the splitting planes results in a child with zero volume, the zero volume is used to represent an empty child. As discussed below, the described technique allows the storage or empty leaf nodes to be omitted.

Figure 22A:
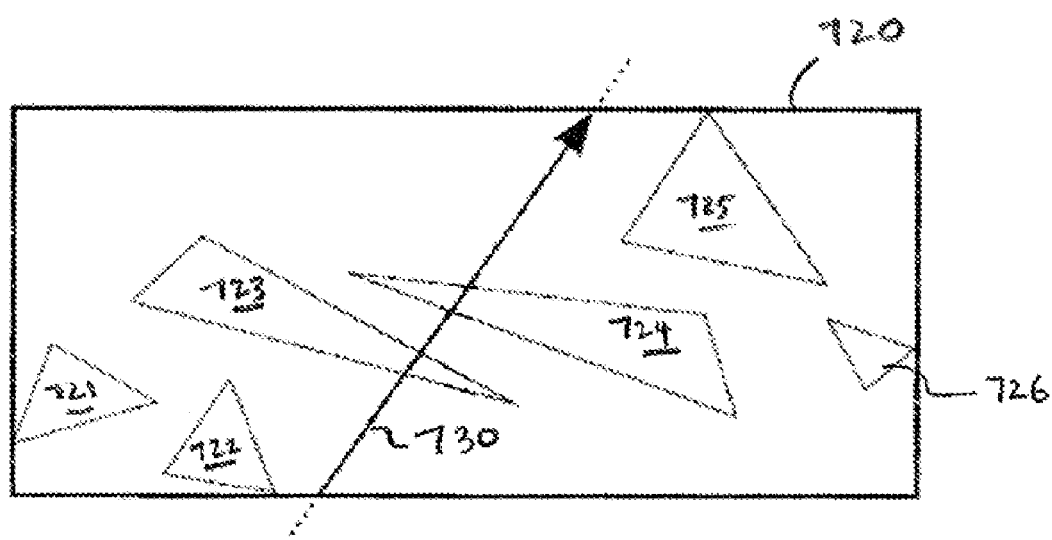
FIGS. 22A-E and 23A-D are a series of diagrams illustrating differences between a binary space partitioning technique and the described bounding interval hierarchy technique.

FIGS. 22A-E and 23A-D are a series of diagrams illustrating differences between a binary space partitioning technique and a bounding interval hierarchy. FIG. 22A shows a bounding box 720 containing six geometric primitive objects 721-726, in this case, triangles A ray 730 traverses the bounding box 720.

Figure 22B:
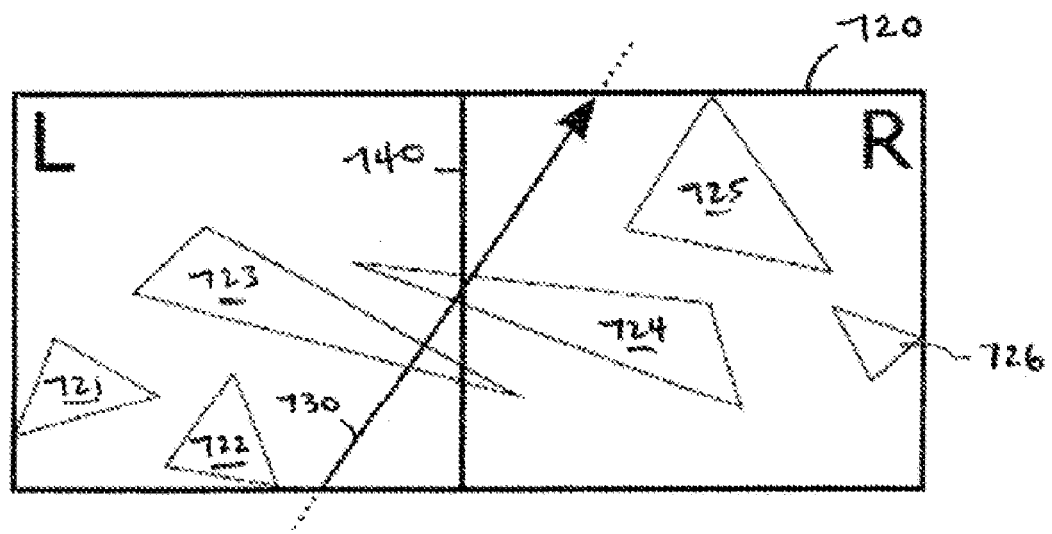

FIG. 22B illustrates the use of a binary space partitioning technique. A central splitting plane 740 is used to subdivide the bounding box 720 into an L child and an R child. As shown in FIG. 22B, objects 721 and 722 are entirely contained within the L child, and objects 725 and 726 are entirely contained with the R child. However, it will be seen that the middle two objects 723 and 724 intersect the splitting plane, and are therefore intersect both the L child and the R child. The middle objects 723 and 724 are therefore referenced in both the L and R child volume elements.

Figure 22C:
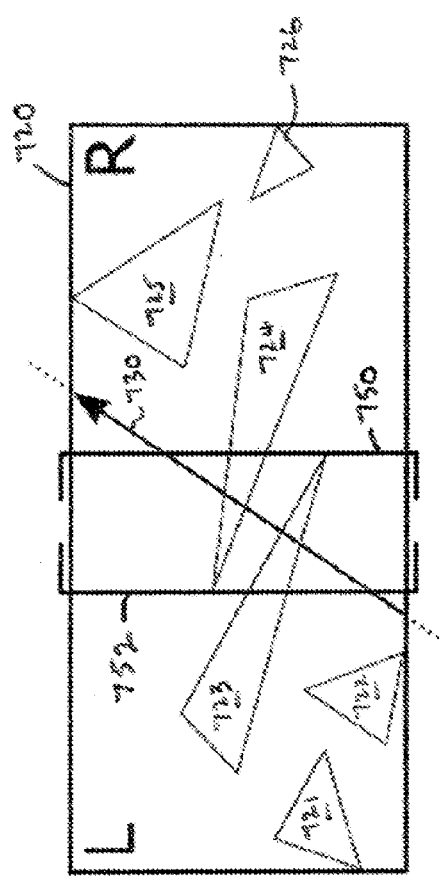
Figure 22E:
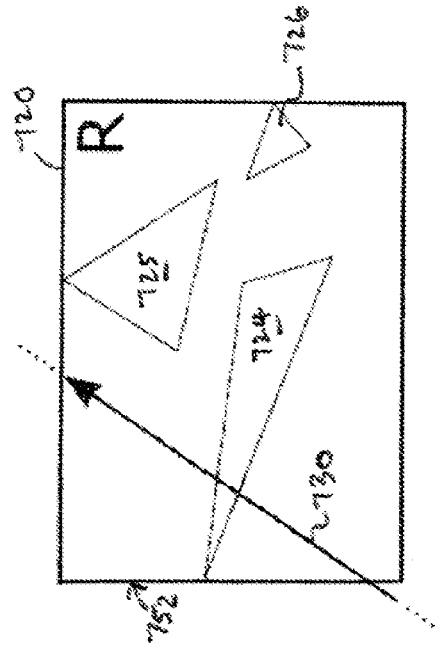

FIG. 22C shows the bounding box of FIG. 22A, which has been subdivided using a boundary interval hierarchy technique according to the present invention. Each of the primitive objects 721-726 in the bounding box 720 is classified as a left object or a right object, based upon their position relative to a candidate splitting plane. According to a further aspect of the invention, discussed below, the location of the candidate splitting plane may advantageously determined at a global, scenic level, rather than locally. Where an object is intersected by a candidate splitting plane, the object is classified as left or right depending upon which side of the plane the object intersects most.

Figure 22D:
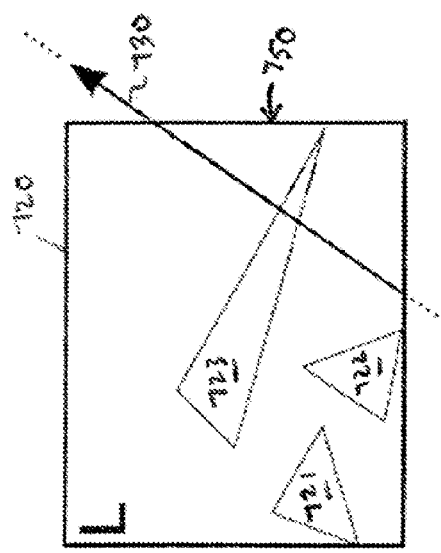

Once all of the objects have been classified as L objects or right objects, an axis-aligned L splitting plane is placed at the maximum, i.e., rightmost, point of the L objects, according to the selected axis. Similarly, an axis-aligned R splitting plane is placed at the minimum, i.e., leftmost, point of the R objects, according to the selected axis. In FIG. 22D, the L splitting plane is represented by bracket 750, and the R splitting plane is represented by bracket 752. The L and R splitting planes split the bounding box 720 into an L child and an R child that, in the present example, overlap.

As described above, the left side of the L child is inherited from the left side of the parent bounding box 720, and the right side of the L child is the L splitting plane 750. Similarly, the left side of the R child is the R splitting plane 752, and the right side of the R child is inherited from the parent bounding box 720. For purposes or clarity, the resulting L child and R child are drawn separately in FIGS. 22D and 22E.

Figure 23A:
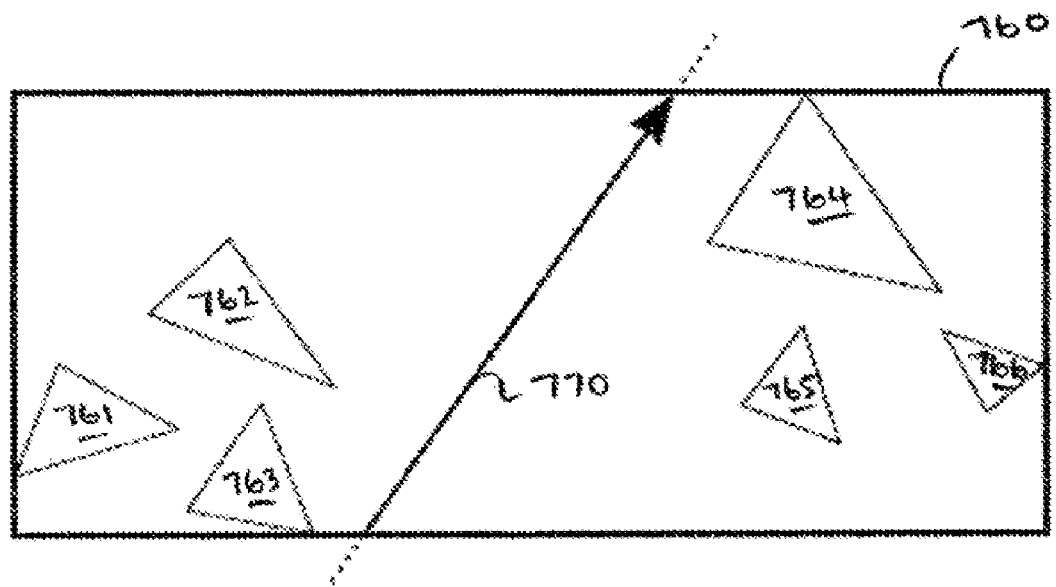

FIGS. 23A-D illustrate a second case illustrating the difference between a binary space partitioning scheme and a bounding interval hierarchy. FIG. 23A shows a diagram of a bounding box 760 is shown containing a number of objects 761-766. A ray 770 traverses the bounding box 500.

Figure 23B:
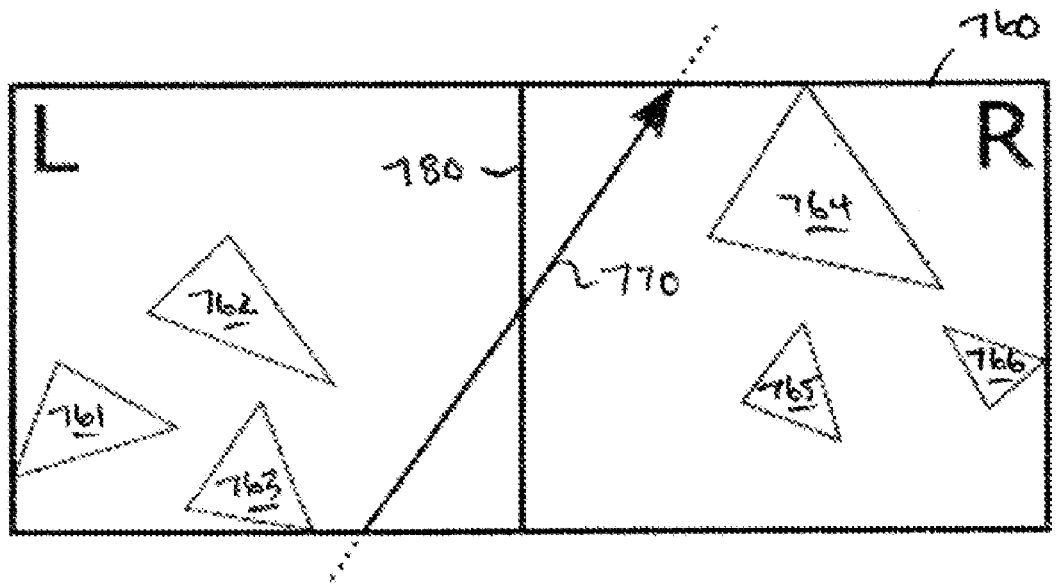

FIG. 23B shows the application of a binary space partitioning scheme. The bounding box is divided by a central splitting plane 780 into abutting L and R child volume elements. In this example, none of the contained objects 761-766 intersect the splitting plane 780. However, it will be seen that the ray 770 traverses a significant amount of empty space in both the L and R cells.

Figure 23C:
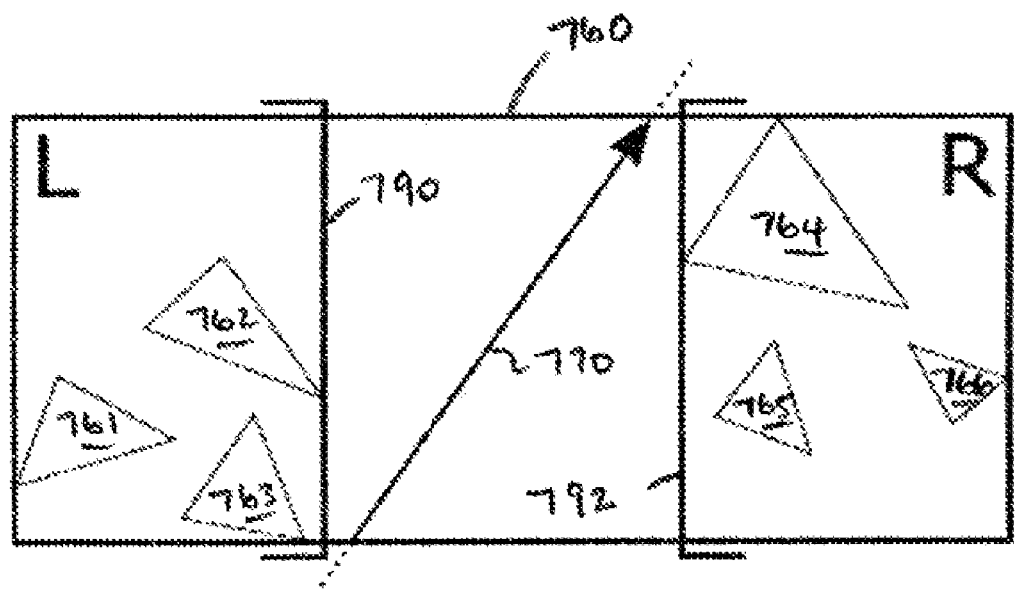

In FIG. 23C, a bounding interval hierarchy approach is applied. The objects are classified as L or R objects, based upon their position relative to a candidate splitting plane. Here, assuming a centrally located candidate splitting plane, the classification process is straightforward, since objects 761-763 are clearly to the left of center, and objects 764-766 are clearly to the right of center. An L splitting plane 790 is placed at the maximum, i.e., rightmost, point of the L objects and an R splitting plane 792 is located at the minimum, i.e., leftmost, point of the R objects.

Once again, the left side of the L child is inherited from the left side of the parent bounding box 760, and the right side of the L child is the L splitting plane 790. Similarly, the left side of the R child is the R splitting plane 792, and the right side of the R child is inherited from the parent bounding box 760. For purposes of clarity, the resulting L child and R child are drawn separately in FIG. 23D.

Figure 23D:
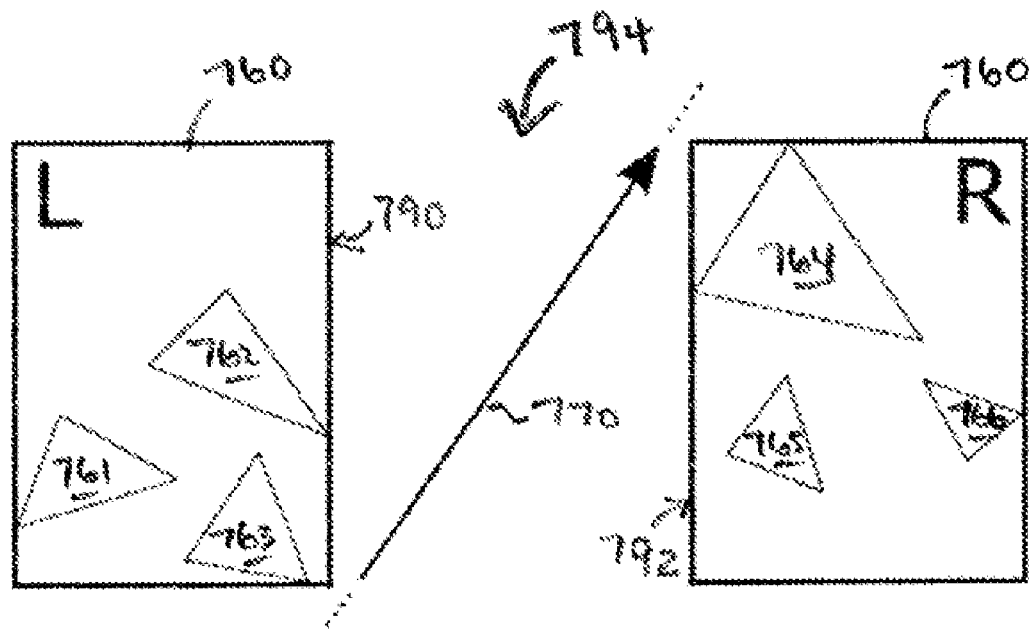

As shown in FIG. 23D, in this example, there is an empty space 794 between the two cells. Returning to FIG. 23B, it will be seen that in a binary space partitioning technique, only four traversal cases need to be accounted for: left only (L), right only (R), left-then-right (LR) and right-then-left (RL). However, as shown in FIG. 23D, in constructing a bounding volume hierarchy, there is a fifth case that needs to be accounted for, i.e., the "empty volume" case. However, it will be appreciated that the bounding interval hierarchy results in a significant savings in computational cost, because it reduces the amount of empty space that is processed within an individual cell.

Thus, it will be seen from FIGS. 22A-E and 23A-D that the described technique significantly improves over currently used binary space portioning techniques by, first, eliminating intersections between objects and splitting planes and, second, by significantly reducing the amount of empty space in child volume elements.

FIG. 24A shows an exemplary code listing 800 for defining a data structure for use with the above-described techniques, and FIG. 24B shows a 12-byte memory layout 810 of the data structure. The inner nodes of the tree are described by (1) the two splitting planes 812 and 814 defining a bounding interval and (2) a pointer 816 to a pair of children. As this sums up to 12 bytes in total, all nodes are aligned on four-byte boundaries. This alignment allows the use of the lower two bits 818 and 820 of the children-pointer to indicate the axis (00:x, 01:y, 10:z) or a leaf (case 11). Leaf nodes comprise a 32-bit pointer to the referenced objects 822 and their overall number 824. The overhead 826 of four bytes in the leaf nodes can be resolved by a careful implementation, as they use only eight bytes out of the node data structure. It should be noted that aspects of the depicted code listing and data structure, including the use of a 12-byte memory layout and a 32-bit pointer, are specific to the example implementation, and may be modified for different computing environments having different word sizes.

3.2. Ray Intersection

Intersecting a ray with a bounding interval hierarchy binary tree is similar to traversing a bounding volume hierarchy. (As discussed above, a bounding volume hierarchy is a partitioning technique based on a list of objects contained within a scene.) However, unlike the children in a bounding volume hierarchy, the children in a bounding interval hierarchy are spatially ordered. Thus, a bounding interval hierarchy can be processed much more efficiently than a bounding volume hierarchy, since it is possible to directly access the child that is closer to the ray origin by the sign of the ray direction. Thus, as illustrated in FIGS. 22A-E and 23A-D, discussed above, the traversal becomes almost identical to that of a kd-tree-based spatial partitioning.

In analogy to bounding volume hierarchies, it is also possible to not intersect any child at all if the valid ray segment is between tow non-overlapping children, as shown in FIG. 23D. Handling this additional case is beneficial, because it implicitly skips empty space. Consequently, empty leafs can never be accessed and therefore do not need to be stored, as mentioned above.

In contrast to spatial partitions, the volume elements of a bounding interval hierarchy can overlap. Consequently, the recursive traversal cannot stop as soon as an intersection is found. It is generally necessary to test all remaining volume elements on the stack for closer intersections. However, as soon as an intersection is found, branches of the hierarchy can be pruned if they represent volume elements farther away, than the current intersection.

3.3. Construction of the Hierarchy

The key to the performance of the described data structure is its efficient construction. Assuming a given candidate splitting plane, the technique used in the presently described implementation is relatively straightforward. Each object is classified as either a "left object" or a "right object" depending on which side of the plane it overlaps most. Other heuristics may be used to classify the objects as left objects or right objects. The two partitioning plane values of the child nodes are then determined, respectively, by the maximum (i.e., rightmost) coordinate of the classified left objects and the minimum (i.e., leftmost) coordinate the classified right objects, along a selected axis.

A further aspect of the invention provides a technique for determining the location of candidate splitting planes for use in the construction of bounding interval hierarchies.

3.3.1. Global Heuristic for Determining Splitting Planes

There is now described a technique for using a global heuristic to determine candidate splitting planes. Unlike previous approaches, the described heuristic is non-greedy and is cheap to evaluate, because it does not explicitly analyze the objects to be ray traced.

According to the presently described technique, candidate splitting planes are used that result from hierarchically subdividing an axis-aligned scene bounding box along the longest side in the middle. It should be noted that, applying this technique, all of the candidate planes form a regular grid.

Figure 25A:
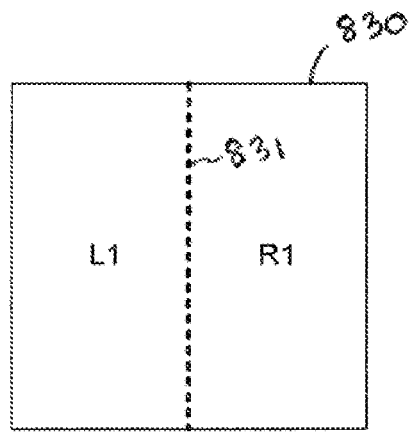
FIGS. 25A-D show a series of simplified diagrams illustrating a described technique for determining candidate splitting planes without object analysis.

FIGS. 25A-D show a series of simplified diagrams illustrating the determination of candidate splitting planes without object analysis. FIG. 25A shows a bounding box 830 that has been split by a "first generation" candidate splitting plane 831. The splitting plane 831 passes through the center of the bounding box 700 dividing it into an L1 region and an R1 region. It is important to note that the L1 and R1 regions are not children, but instead provide an indication as to how objects residing in those regions are to be classified. In actually, as described above, one or both of the children may overlap the splitting plane. Also there may be an empty space between the children. In addition, one of the children may have a zero volume.

Figure 25B:
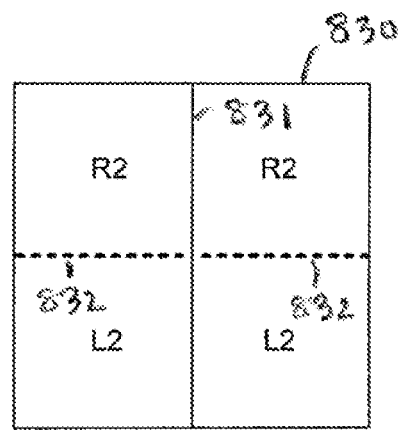

FIG. 25B shows the bounding box 830, which is split by the first splitting plane 831, and by a pair of "second generation" candidate splitting planes 832. The candidate splitting planes are all "single" planes, even if they coincide. They are generated during recursion. The second generation planes 832 are used to determine L2 and R2 for a second generation of children.

Figure 25C:
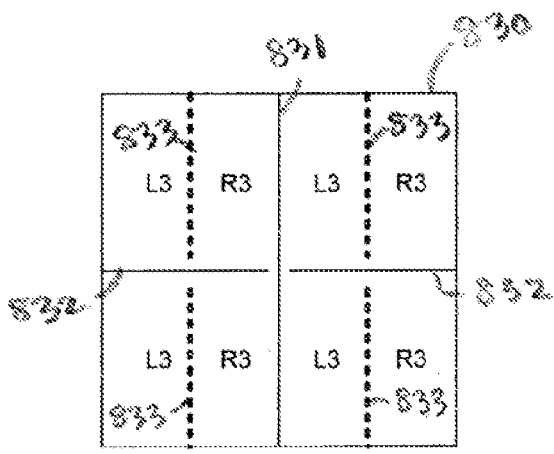
Figure 25D:
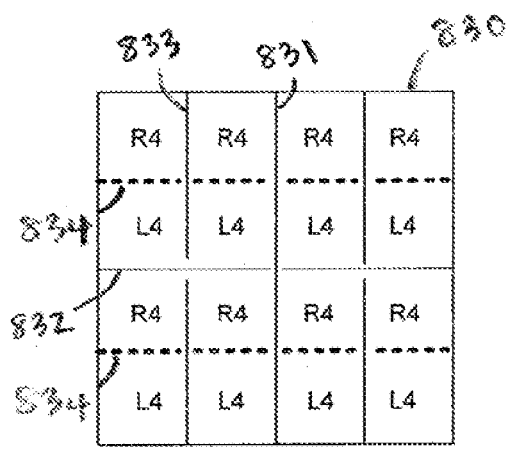

FIGS. 25C and 25D show the bounding box 830 split by third and fourth generation planes 833 and 834. These planes 833 and 834 determine L and R for the third and fourth generation of children (respectively, L3/R3 and L4/R4). The process continues recursively in order to generate as many generations of candidate splitting planes as necessary.

Because the candidate splitting planes are determined globally without an analysis of the particular objects contained in the bounding box 830, it will be seen that, in certain situations, it is possible that the globally determined candidate splitting plane for a particular generation may lie outside of the bounding box or a parent volume element of that generation to be subdivided. In that case, the process is continued with candidate planes lying within the half in which the parent volume element resides.

The use of the globally determined candidate splitting planes is now discussed with respect to a specific example.

Figure 26:
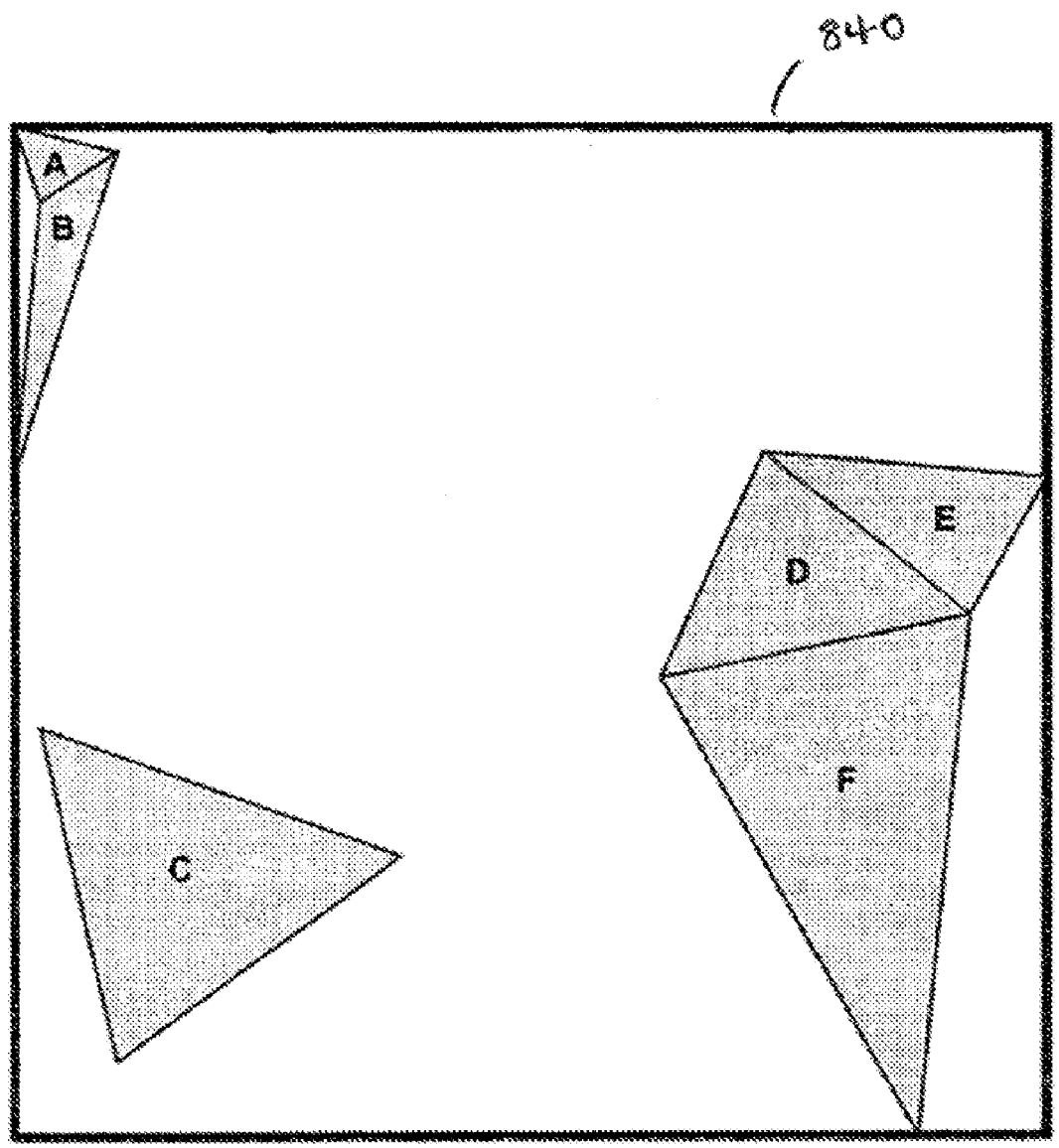
FIG. 26 shows a diagram of an exemplary bounding box containing six objects A-F.
Figure 27:
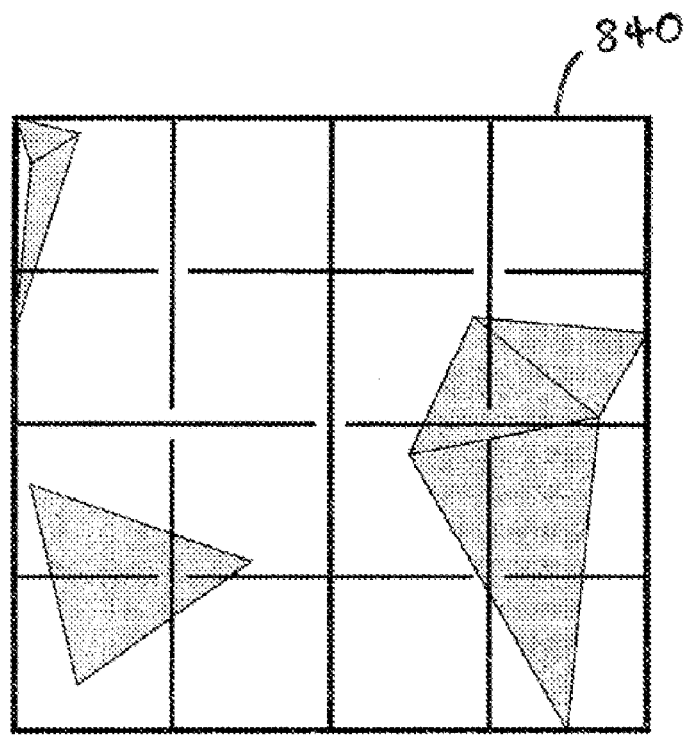
FIG. 27 shows four generations of candidate splitting planes superimposed over the bounding box shown in FIG. 26.
Figure 28:
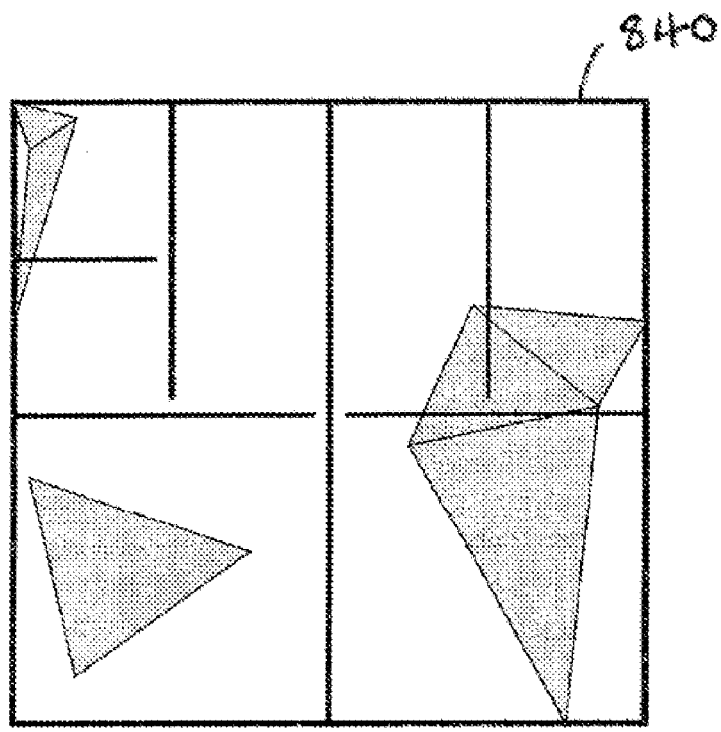
FIG. 28 shows the splitting planes of interest in FIG. 27.
Figure 29:
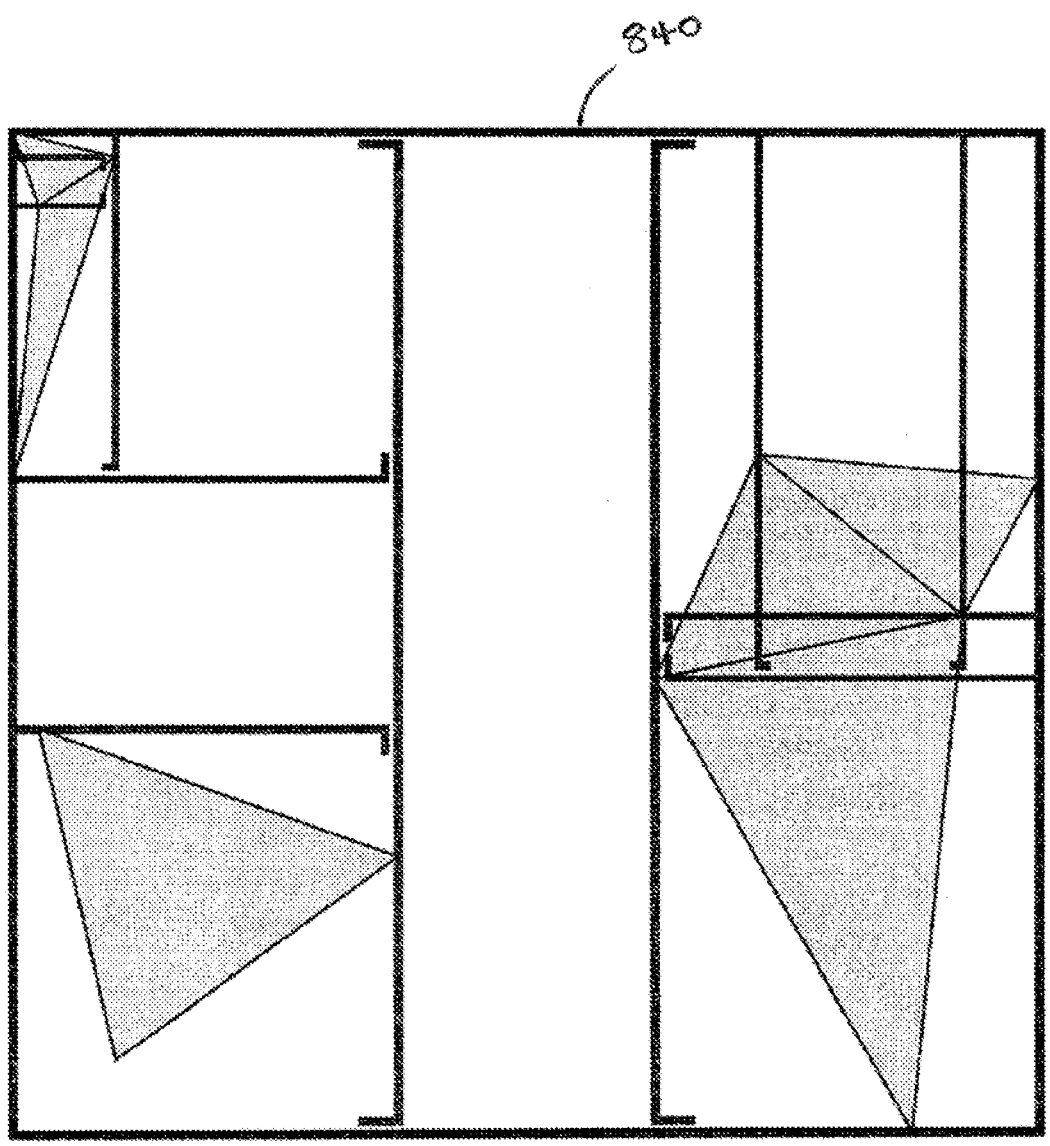
FIG. 29 shows a diagram illustrating how each of objects A-F are contained in child bounding boxes of various generations.

FIG. 26 shows a diagram of a bounding box 840 containing six objects A-F. FIG. 27 shows four generations of candidate splitting planes superimposed over the bounding box 840, and FIG. 28 shows the splitting planes of interest in building a bounding interval hierarchy based upon the particular set of objects A-F contained in the bounding box. FIG. 29 shows a diagram illustrating how each of objects A-F are contained in child bounding boxes of various generations, determined in accordance with the presently described techniques.

FIG. 29 is now explained, generation by generation.

Figure 30A:
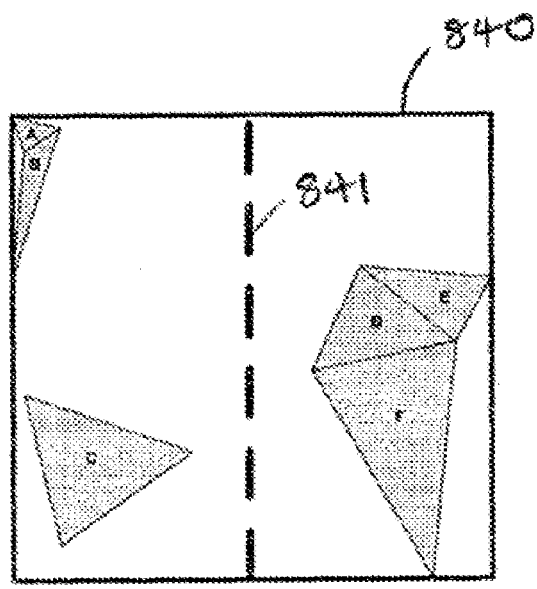
FIGS. 30A-C illustrate the first generation of children generated from the scene shown in FIG. 26.
Figure 30B:
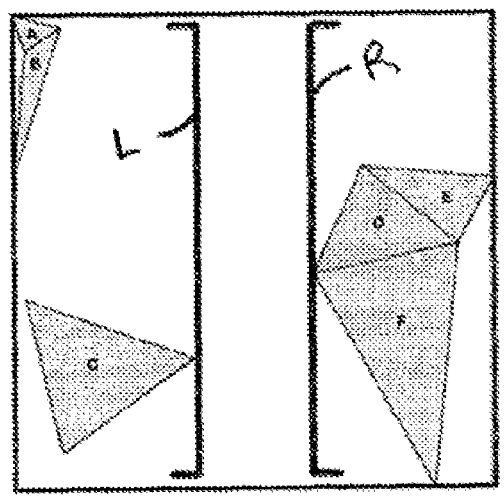
Figure 30C:
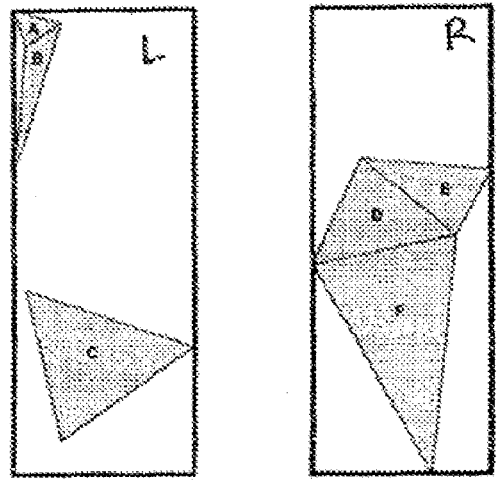

FIGS 30A-C illustrate the first generation children generated from the FIG. 26 scene 840. In FIG. 30A the globally determined the first generation candidate splitting plane 841 is used to classify objects A-F as L objects or R objects. Clearly, A-C are L objects and objects D-F are R objects. FIG. 30B shows the first generation of L and R children The right side of the L child is a plane passing through the rightmost point of the L objects, and the left side of the R child is a plane passing through the leftmost point of the R objects. FIG. 30C shows the result L and R children.

Figure 31A:
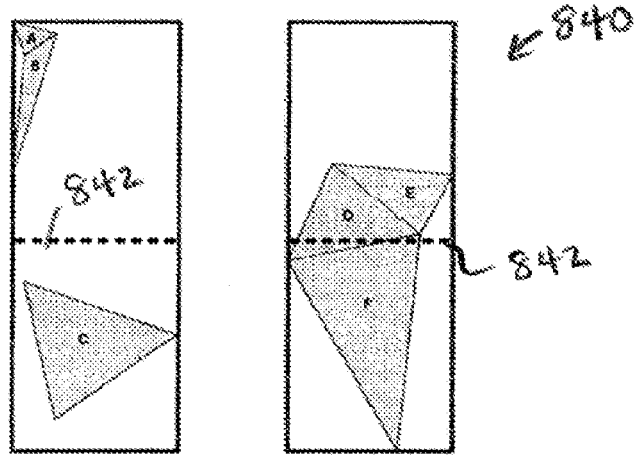
FIGS. 31A-C illustrate the second generation of children generated from the scene shown in FIG. 26.
Figure 31B:
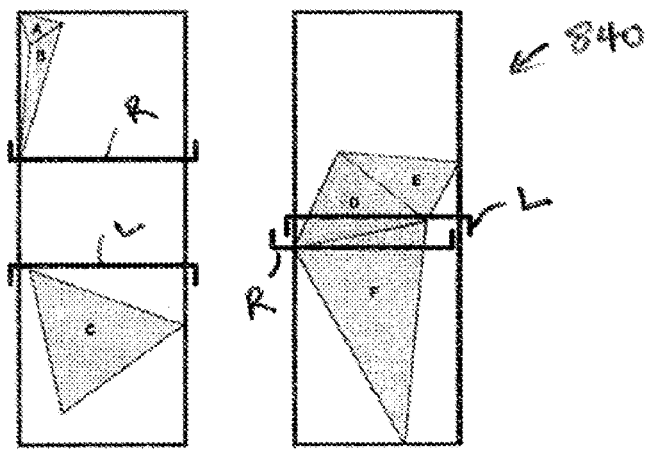
Figure 31C:
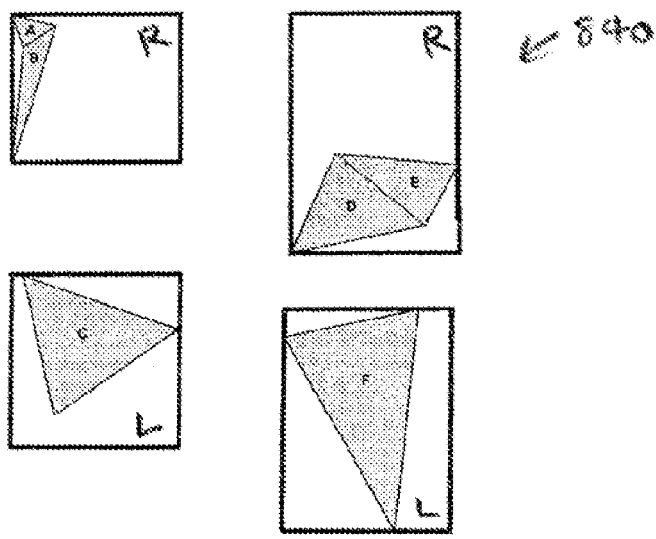

FIGS. 31A-C illustrate the second generation of children. In FIG. 31A, the globally determined second generation candidate splitting plane 842 is used to classify the objects in the first generation children into L and R objects, and as shown in FIG. 31B, L and R children are generated according to the technique. The resulting second generation children are shown in FIG. 31C. On the right side of the diagram, it will be seen that the position triangles D and F result in overlapping children, which have been separated for clarity.

Figure 32A:
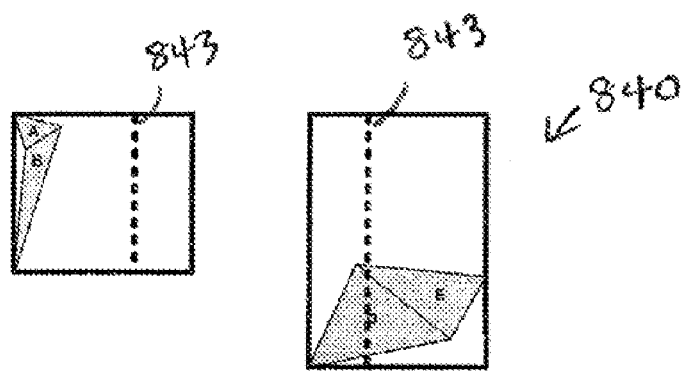
FIGS. 32A-C illustrate the third generation of children generated from the scene shown in FIG. 26.
Figure 32B:
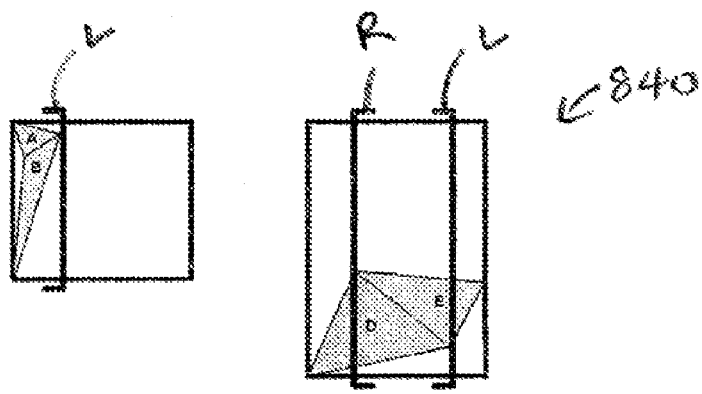
Figure 32C:
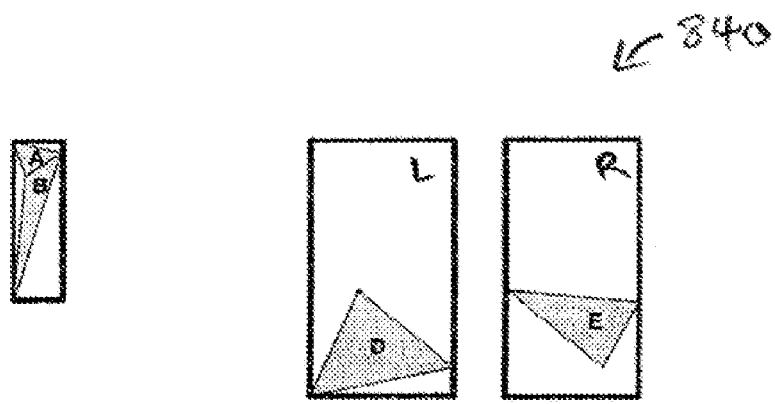

FIG. 32A-C illustrate the third generation of children. It will be seen that since the candidate planes have been generated globally, the candidate splitting planes 843 in the present example are off-center, and do not subdivide the child boxes into boxes of equal volume. FIG. 32B shows the placement of L and R splitting planes, and FIG. 32C shows the resulting children. It should be noted with respect to the bounding box containing objects A and B that the described technique results in an R child having an empty volume. The resulting L child contains objects A and B, but with reduced empty space.

FIGS. 33 A-E show the generation of children for objects A and B. As shown in FIG. 33A, the globally determined candidate fourth generation splitting plane 844 do not divide A and B into L and R objects. Rather, both are classified as R objects. Because the left side of the bounding box is determined by the leftmost point of the R objects, the result is an empty-volume L child and an R child inheriting all of its sides from its parent.

As shown in FIG. 33B, because the candidate splitting planes have been generated globally rather than locally, the fifth generation candidate splitting plane 845 does not bisect the bounding box, but rather lies outside of the bounding box. It will be seen in FIG. 33B that the bounding box resides to the left of plane 845. Thus, as described above, the process continues with candidate planes lying to the left of plane 845.

FIG. 33C shows the sixth generation candidate splitting plane 846. This time, the candidate splitting plane 846 divides the bounding box such that A is now an L object and B is an R object. FIG. 33D shows the placement of L and R splitting planes, and FIG. 33E shows the resulting L and R children.

Together with the technique described in the previous subsection, the object list is recursively partitioned and bounding boxes are always aligned to object bounding boxes. If a splitting plane candidate separates objects without overlap, the resulting splitting planes implicitly becomes tightly fitted to the objects on the left and right thus maximizing empty space, as shown in FIGS. 23C-D. Although the recursion terminates when only one object is left, it is efficient to define the number of objects, for which a recursion still pays off.

It is important to note that the splitting plane candidates are not adapted to actual bounding boxes of the inner nodes, but are solely determined by the global bounding box of the scene. In other words, after child cells have been defined after one iteration, the subsequently used candidate plane is not the midpoint of that new cell, but is rather the corresponding initial global candidate plane.

This aspect of the technique is different from previous approaches, and tends to keep bounding boxes as cubic as possible throughout the whole hierarchy.

3.3.2. Approximate Sorting

The amount or time required to construct the above-described data structures is σ(n log n), on the average. According to a further aspect of the invention, a bucket sorting preprocess is used to decrease the constant of the order.

In a bucket sorting preprocess, a high-level sort is performed in which individual items to be sorted are first sorted into "buckets." For example, sorting a deck of cards by rank and suit may be accomplished by first sorting the cards into four piles by suit, and then sorting each individual suit pile by rank. Each suit pile functions as a bucket. Generally speaking, dividing the sorting function in this way tends to decrease the overall amount of time required for the process.

Similarly, the amount of time required to sort the objects in a scene into a hierarchically ordered set of bounding boxes containing the objects may be significantly reduced if the objects are first preliminarily sorted into meaningful buckets containing like numbers of objects for which bounding boxes are to be constructed.

Figure 34:
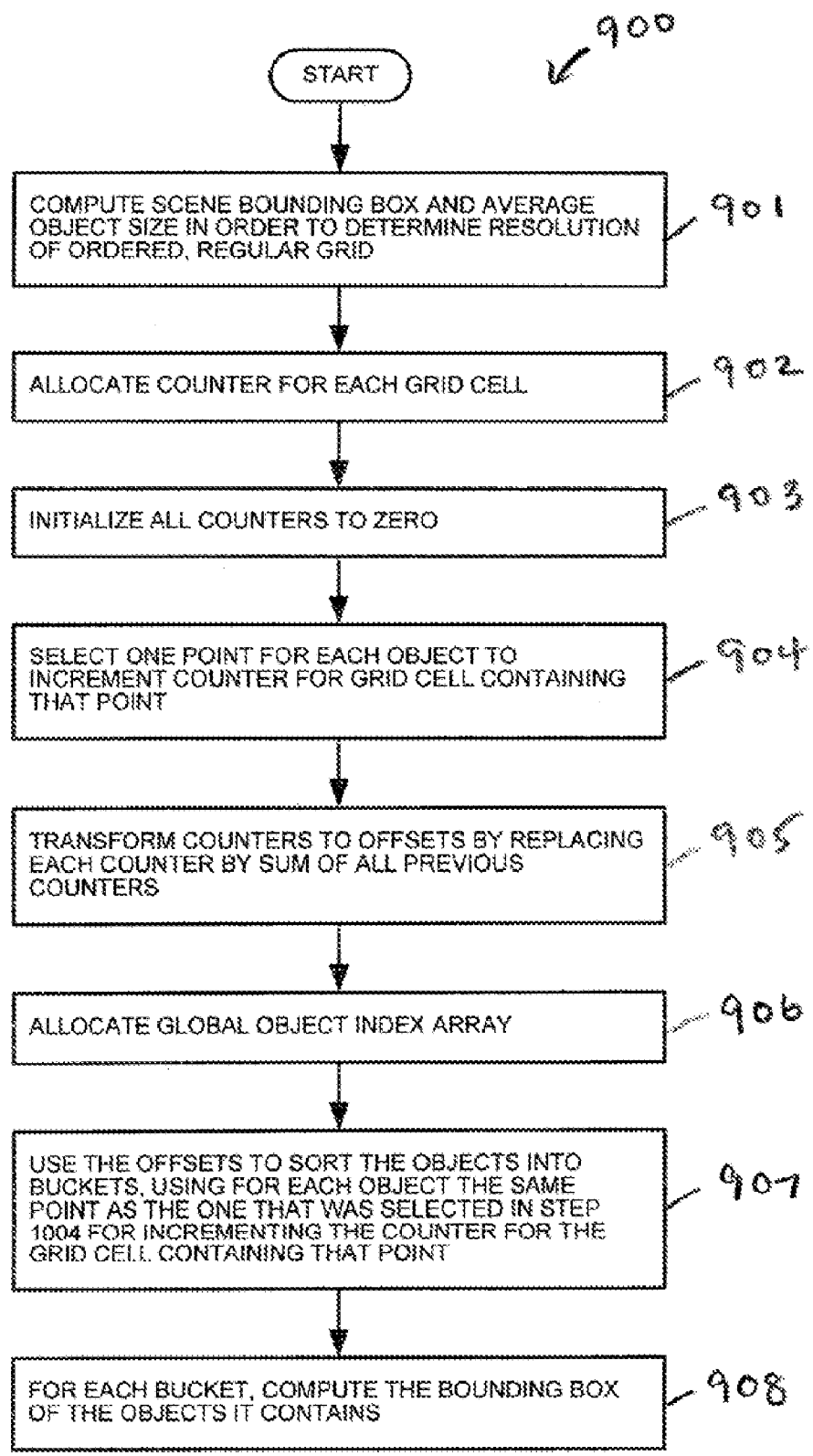
FIG. 34 shows a flowchart of a method according to a further aspect of the invention for performing a bucket-sorting preprocess in conjunction with the construction of the described data structures.

FIG. 34 shows a flowchart of a method 900 according to this aspect of the invention. In step 904, the size of a scene bounding box and the average size of the objects contained therein are computed in order to determine the resolution of a regular, ordered grid. Alternatively the resolution can be specified by the user. As shown in stp 902, each grid cell includes a counter. In step 903, all of the counters are set to zero.

In step 904, one point for each object, such as, for example, one corner of its bounding box, is used to increment the counter in the grid cell containing that point. It is worth noting that the point selected "for" an object does not necessarily need to be a point "on" the object. It will be seen that the number of points within a particular grid cell may vary widely, depending upon how the objects are distributed within the scene. It may be possible for some grid cells to contain only one point, or even zero points. It will further be seen that since one and only one point for each object is counted, the sum of all counters equals the number of objects.

It will further be seen that objects may overlap more than one cell, or even several grid cells. Also, it may be possible for most of an object to reside outside of the grid cell in which the object's selected point resides. It will be seen that such occurrences may reduce the overall amount of time saved by the bucket sort, but will not affect the validity of the final data structures.

In 905, the counters are then transformed into offsets by replacing each counter by the sum of all previous counters in the voxel order of the cells/voxels in the grid, or in the order in which they are laid out in memory.

In step 906, a global object index array is allocated. In step 907, using the same point of every object, the objects now can be sorted into buckets of like size, using the offsets from step 905. As discussed above, the sum of the grid counters yields the number of objects in the scene and determines the size of the index array. The bucket size is determined by the number of counted objects within.

In step 908, for each bucket, there is computed, as described above, the bounding box of the objects it contains.

Sorting the bounding boxes instead of the objects they contain speeds up construction by a factor of two to three. If a volume element consists of one container only, the container is replaced by the objects within. The resulting trees are very similar in rendering performance and size, as illustrated in FIG. 42, discussed above.

By using this simple streaming technique, it is possible to partition a scene using a limited amount of memory and a linear time. Even the index array can be processed in chunks.

3.3.3. Implementation Details

Because the bounding interval hierarchy is an object partitioning scheme, all object sorting can be done in place and no temporary memory management is required. The recursive construction procedure only needs two pointers to the left and right objects in the index array, similar to a quicksort-based technique.

On the other hand, spatial partitioning schemes need to handle objects that overlap volume elements. For example the recursive kd-tree construction needs a vast amount of temporary data to be placed on the stack to be able to continue with backtracking later on.

A variant of the above scheme can alleviate these inefficiencies and makes in-place sorting available for kd-tees. The procedure requires a second array of object references that is used to keep the objects that are classified as "both left and right" (i.e., as overlapping the kd-tree splitting plane). Testing with a large number of scenes has indicated that the size of the second array can be chosen by a default value. Generally speaking, a length equal to the number of objects is far more than what would be required 99 percent of the time. However, because the real length of the array cannot be predicted, it might be necessary to reallocate memory.

Figure 35:
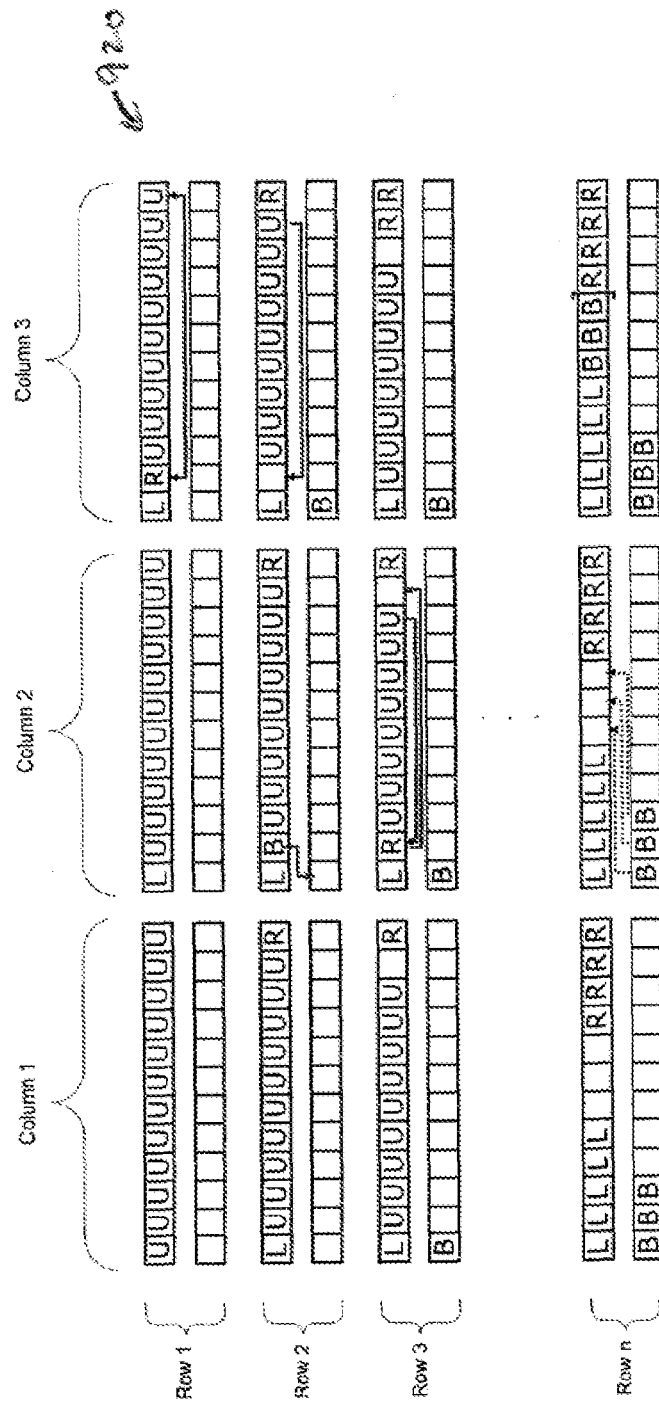
FIGS. 35-36 show a series of array pairs illustrating a technique for in-place sorting of object indices in accordance with a further aspect of the invention.
Figure 36:
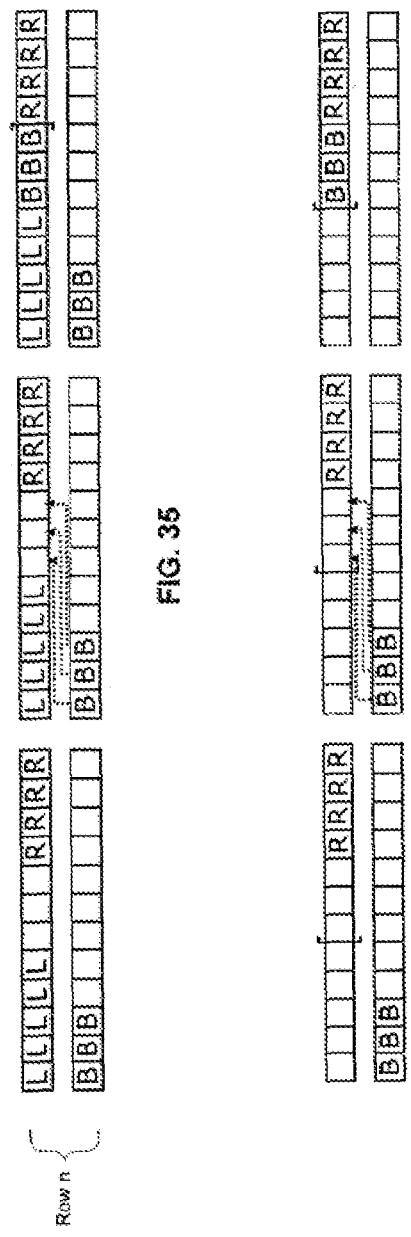

The procedure is illustrated in FIGS. 35 and 36. FIG. 35 shows a series of pairs of arrays 920, in which the upper array illustrates in-place sorting of object indices, and in which the lower array illustrates storing operations onto the global stack during tree construction. The series of array pairs proceeds from left to right and top to bottom.

In the first row, first column, the upper array contains a set of unordered elements. In the second column, sorting the unordered array has revealed a left element, which stays in place. In the third column, the second element is an R element, which must go to the right, and is therefore exchanged with an unsorted element from the right end of the upper array.

In the second row, first column, the second element has been exchanged for an unsorted element from the right end of the upper array. In the second column, the element now in second position is revealed to be a "both" (i.e., overlapping) element, and is therefore moved to the global stack, i.e., the lower array. In the third column, the rightmost unsorted element is moved into the vacant position in the array.

In the third row, first column, the rightmost unsorted element has been moved into the vacant second position in the array. This element is now revealed to be an "R" object and is moved to the vacant position at the right side of the array. The third column shows the upper array configuration that results after this move.

The process continues recursively until all of the elements in the array have been ordered, as shown in row n. As shown in the first column of row n, the sorting operating has revealed three "both" objects, which are stored in the first three positions in the lower array. In the second column, the three "both" objects are moved into the upper array in the vacant positions between the L and R objects. The third column shows the completed sort.

FIG. 36 shows a series of three array pairs 930, illustrating the restoring of stacked object indices after a stack "pop" operation.

3.4. Construction on Demand

So far the presented framework already allows for interactive ray tracing. However, construction time and memory footprint of the acceleration data structure can be further optimized by constructing it only, where rays traverse, i.e., where geometry is intersected. The implementation with the bounding interval hierarchy is relatively straightforward and is especially beneficial for large scenes that feature a high depth complexity. Since all object sorting is done in place, only a flag is required to mark volume elements that have not yet been subdivided. Upon traversal of a ray, the subdivision routine is called if the flag is set. A simple optimization is to subdivide a node completely, if all objects contained in it fit into the cache (e.g. L1- or L2-cache). The on-demand construction removes the classic separation of traversal and construction routines. Using this simple extension it was possible to render the Boeing 777 mesh shown in FIG. 22 at HDTV resolution in 3-9 minutes (depending on camera position) from scratch on a single core Opteron 2.2 GHz 32 GB RAM machine. Compared to previous approaches only a fraction of memory is used.

4. Discussion

The bounding interval hierarchy is an object partitioning scheme that benefits from the efficient traversal techniques of spatial partitioning schemes. In this section, there are discussed some of the advantages of this approach.

4.1. Memory Footprint

Since the construction algorithm matches splitting planes to object bounding boxes, the number of inner nodes in the hierarchy is bounded by six times the number objects. In the case of polygons this number is bounded by the minimum of the previous bound and three times the number of vertices. The number of object references exactly matches the number of objects in the scene.

Due to multiple object references, the latter bound is not available for spatial partitioning schemes as for example the kd-tree. The problem becomes apparent, where objects feature a locally high number of overlapping bounding boxes or almost random distribution. In the BART museum the number of replicated triangle indices was about 400 times (peak value) the number of triangles, which also resulted in a 40 times higher number of nodes than in the bounding interval hierarchy. This problem is intrinsic to kd-trees, as the first top level splits already duplicate a lot of object references. This duplicative effect is often continued during recursion.

4.2. Numerical Precision

The bounding interval hierarchy construction only uses bounding box information and minimum/maximum operations in the canonical coordinate system. As such the procedure is numerically unconditionally robust. Spatial partitioning schemes require object plane intersection routines that rely on operations that suffer from floating point imprecisions. In order to make the schemes stable, tolerances must be added. As a consequence, performance suffers.

4.3. Tracing Ensembles of Rays

If rays are coherent, it can pay off to trace ensembles (or arrays) of rays instead of single rays. While primary rays easily can be grouped in coherent sets, it becomes already difficult to get the same benefits for ensembles of shadow rays from point light sources. Transparent, reflected, or rays from random walk simulations lack sufficient coherency. Nevertheless, given an ensemble of coherent rays, the approaches to trace ensembles of rays benefit from the data structure described herein. This benefit is due to the reduced memory bandwidth and increased cache coherency resulting from the small memory footprint. Furthermore the volume elements appear generally larger than the corresponding volumes of a kd-tree, which relaxes the conditions on coherency. Experiments have indicated that the speedup-ratio from single ray to 2×2-ray-bundle-tracing is slightly higher for the bounding interval hierarchy as compared to a kd-tree. Frustum-culling techniques have been successfully transferred to bounding volume hierarchies. These techniques can be readily transferred to the bounding interval hierarchy by tracking the current volume element bounding box on the stack. Although the hierarchy also can be updated in other ways, the described construction routine is significantly faster than the surface area heuristic, and removes the severe restriction to meshes animated by deformations. For 2×2 ensembles of rays the ray tracing performance obtained by the more general technique is at least as fast. Finally, the node data structure is much smaller For the sake of completeness, it is noted that ensembles of rays also can be efficiently traced using the grid acceleration data structure. However, large objects overlapping multiple grid cells, as well as secondary rays, cause severe performance losses. In general, the shaft-culling techniques fail over distance for diverging ensembles of rays.

4.4. Hardware Considerations

Based on the recent findings in real-time ray tracing the RPU (ray processing unit) chip has been designed. While the architecture efficiently can ray trace and shade bundles of rays, it can be easily improved by our approach. The bounding interval hierarchy has a much smaller memory footprint and as an object partitioning scheme does not need a mailbox unit. Only the TPU unit has to be extended by a second plane intersection. These modifications easily can be incorporated due to the similarity of the bounding interval hierarchy traversal to a kd-tree traversal. More important the above-described data structure construction technique uss only simple operations and therefore is a very good candidate for hardware.

4.5. Massive Data Sets

Current data sets used in industrial applications and production rendering consist of massive amounts of geometry, which usually range from hundreds of megabytes to several gigabytes of raw data. Although, as discussed above, the small memory footprint of the boundary interval hierarchy allows massive scenes to be efficiently ray-traced by simple means, there still may be situations in which the data does not fit into the main memory. Accordingly, a minimal memory footprint renderer has been implemented, which is able to render pictures of the Boeing 777 using only 50 MB of RAM. If more RAM is available (1 GB was assumed for measurement purposes), it is possible to render a picture front scratch in less than an hour even on a standard consumer desktop PC, as illustrated in FIG. 38. To achieve the minimal memory usage, the above-described preprocessing step is used to sort the objects into buckets, which are then stored on the computer's hard drive. For the rendering step, a top-level bounding interval hierarchy is created out of the buckets, without the need to touch any object. Each bucket that is intersected by a ray creates its own tree using the on-demand policy. The bucket's objects and the acceleration data structure are kept in a cache of either dynamic (i.e., able to grow until no more RAM is available) or fixed, user-defined size. The bucket with the largest number of objects defines the maximum memory footprint. It should be noted that this result is obtained for free from the bucket sorting preprocess. In this scenario, the processing speed is determined by the speed of the hard drives. The tree construction algorithm is so fast that, if parts of the acceleration data structure have to be flushed, they are just thrown away and rebuilt on demand.

It might be suggested that the bounding interval hierarchy performance suffers when encountering a mixture of small and large geometric elements. While this is partially true, it is also true for spatial partitioning schemes. In this situation a kd-tree subdivides the scene by inserting more splitting planes. This results in deeper trees, a duplication of object references, and an overall increased memory footprint. Deeper trees increase the traversal time. The performance problem of boundary interval hierarchies in such a scenario can be spotted by the example of the BART robots, shown in FIG. 39. The scene is made up of large triangles for the streets and houses, but also features a lot of finer geometry, such as the signs and the walking robots. As the large triangles cause large overlapping volumes in the hierarchy, an early pruning of the tree becomes impossible and more triangles per ray have to be tested. The classic workaround in a rendering system is to subdivide large objects beforehand. In order to moderately increase memory, the objects should be divided by planes perpendicular to the canonical axis. While the memory consumption now increases similar to the kd-tree, it is still possible to determine memory consumption a priori. As the described approach is intended for production systems with displacement mapping and a significant amount geometric detail, the above discussion does not impose problems. In fact, the problem only persists for low-polygon-count architectural scenarios. Even older games typically use 200,000 to 500,000 visible triangles per frame.

5. Results

The results of comparisons between currently used techniques and the improved techniques described herein are set forth in FIGS. 37-42.

FIG. 37 shows a table 940 comparing the presently described techniques and state-of-the-art-kd-tree implementations, using a very simple shader and 2×2 (SSE accelerated) ray bundles. The performance data were measured on a P4HT 2.8 GHz, with a resolution of 640×480. The InView column refers to a professional real-time rendering product (in Trace GmbH, www.intrace.com). The WH06 column refers to data achieved using techniques described in Wald and Havran, "On Building Fast kD-Trees for Ray Tracing," Technical Report, SCI Institute, University of Utah, No. UUSCI-2006-009 (submitted for publication) (2006). The WH06 performance data were measured on a faster Opteron 2.6 GHz. The term "time to image" refers to a measurement of the total rendering time for one picture, thus including on-demand tree construction, ray tracing, and shading. As shown in FIG. 37, the bounding interval hierarchy (BIH) achieved superior results in both memory and total time to image.

FIG. 38 shows a table 950 comparing the present described techniques and a state-of-the-art-kd-tree implementation, using advanced shades that trace single rays only (640×480, P4HT 2.8 GHz). "Time to image" measures the total rendering time for one picture, thus including on-demand tree construction, ray tracing, and shading. FIG. 38 illustrates a stress test for on-demand construction, because the global illumination computations require a construction of almost the entire tree.

FIG. 39 shows a table 960 setting forth the results of a comparison using dynamic environments (640×480, P4HT 2.8 GHz). The complete data structure is rebuilt per frame, from scratch. The museum is traced using (a) simple shading and (b) full shading, using an average of 4 rays per pixel. In both cases, only single rays were traced. The remaining BART scenes were rendered using the simple shader, while the Utah Fairy Forest used full shading FIG. 40 shows a table 970 setting forth total rendering times (1280×1024, single-core Opteron 875 2.2 GHz 32 GB) including on-demand tree construction for the huge Boeing 777 data set (349,569,456 triangles, which amounts to 12,584,500,416 bytes). Reading the triangle data from hard disk is omitted, since it depends heavily on the hard disks used. In the present example, with the particular equipment used, the loading time was 40-90 seconds.

FIG. 41 shows a table 980 setting forth rendering times (1280×1024, P4HT 2.8 GHz 2 GB RAM), including low-level, on-demand tree construction and loading all necessary triangle groups from disk. The top-level bucket sort preprocess, done once for all views, required an additional 53 minutes, but only used a peak 737 MB of RAM. The cache sizes for the preprocessing and rendering were chosen to be suitable for any consumer machine offering at least 1 GB of RAM. More RAM allows for even faster rendering times, as in the previous figure, whereas the preprocessing step is mainly limited by the hard disk, which in the present example was relatively slow and inexpensive.

FIG. 42 shows a table 990 comparing the bounding interval hierarchy (BIH) with and without the above-described bucket sort preprocess (640×480, P4 HT 2.8 GHz) to numbers taken from Wald and Havran, where a faster Opteron 2.6 GHz process was used. Frames per second (FPS) are given relative to the "pure" bounding interval hierarchy, as FPS for several camera positions was averaged. The bounding interval hierarchy shows superior results, particular when combined with a bucket sort preprocess.

6. Conclusion

Aspects of the present invention provide improved techniques for accelerating ray tracing, particularly when used in fully dynamic environments or for massive data sets. Both the memory footprint and construction time of the described data structure are significantly smaller, compared to previous approaches. The described techniques allow for real-time ray tracing of dynamic content without restrictions to the geometry. These techniques also enable the much more efficient computation of unbiased motion blur. The simplicity and predictability of the technique along with its global heuristic make it a good candidate for a hardware implementation. First experiments using the bounding interval hierarchy with freeform surfaces have been promising. The new global heuristic was compared to the much more complicated kd-tree construction heuristics that were used for measurement purposes in the paper. The simpler scheme results in almost identical performance.

Figure 43:
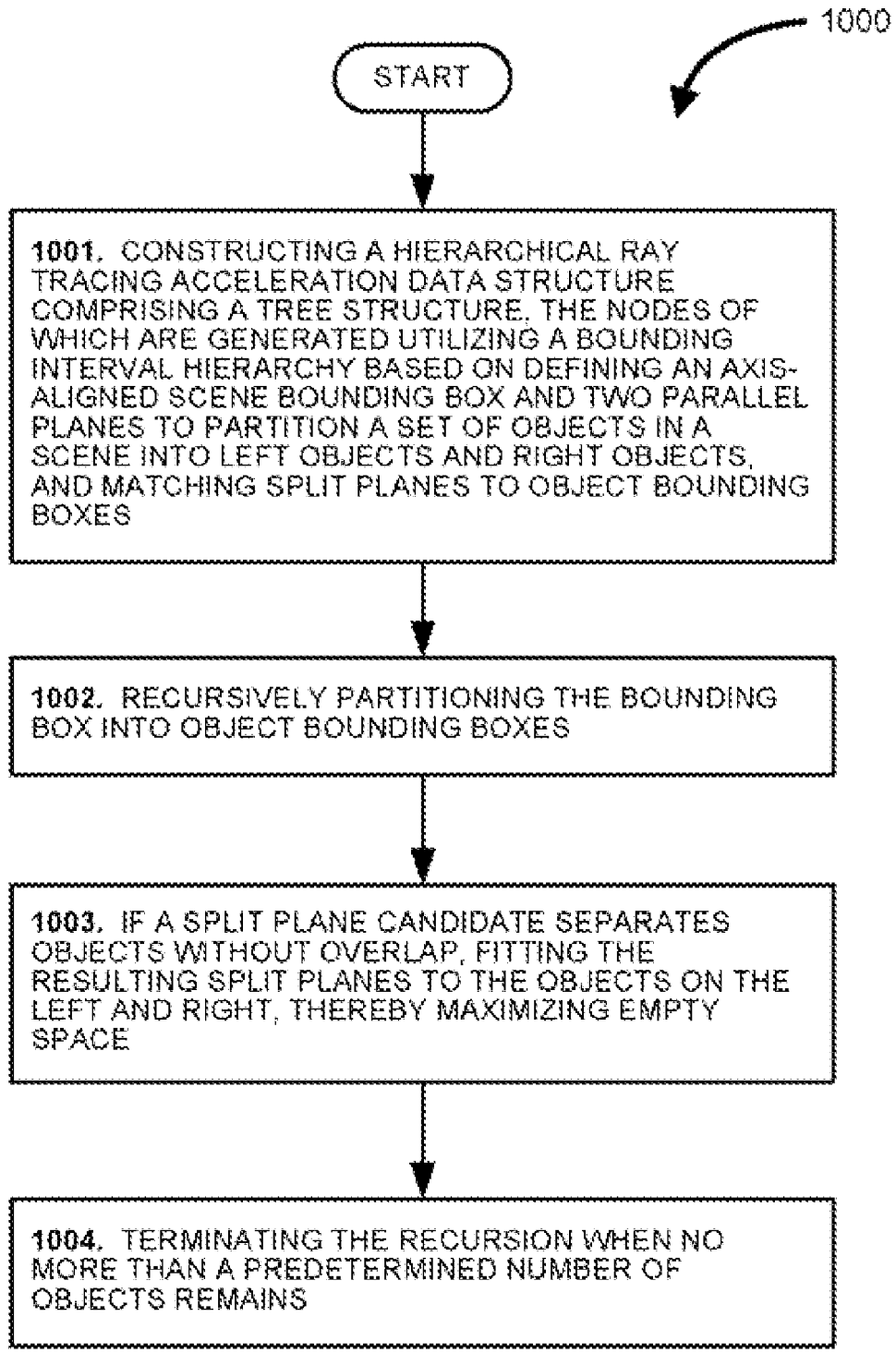
FIGS. 43 and 44 show flowcharts of overall techniques in accordance with described aspects of the invention.

FIG. 43 shows a flowchart 1000 of an overall technique according to described aspects of the invention. As discussed above, the technique is advantageously implemented in a computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of points in a scene as recorded on an image plane of a simulated camera, the computer being operable to generate pixel values for an image using a ray-tracing methodology, the ray-tracing methodology comprising the use of a ray tree and an associated ray tracing data structure, the ray tree including at least one ray shot from the pixel into a scene along a selected direction, the ray-tracing methodology further comprising the calculating of the intersections of rays and surfaces of objects in the scene, and the ray-tracing being determined in response to the results of processing of objects in an image.

In step 1001, a hierarchical ray tracing acceleration data structure is constructed comprising a tree structure. The nodes of the tree structure are generated utilizing a bounding interval hierarchy based on defining an axis-aligned scene bounding box and two parallel planes to partition a set of objects in a scene into left objects and right objects, and matching split planes to object bounding boxes.

In step 1002, the bounding box is recursively partitioned into object bounding boxes.

In step 1003, if a split plane candidate separates objects without overlap, the resulting split planes are fitted to the objects on the left and right, thereby maximizing empty space.

In step 1004, recursion is terminated when no more than a predetermined number of objects remains.

Figure 44:
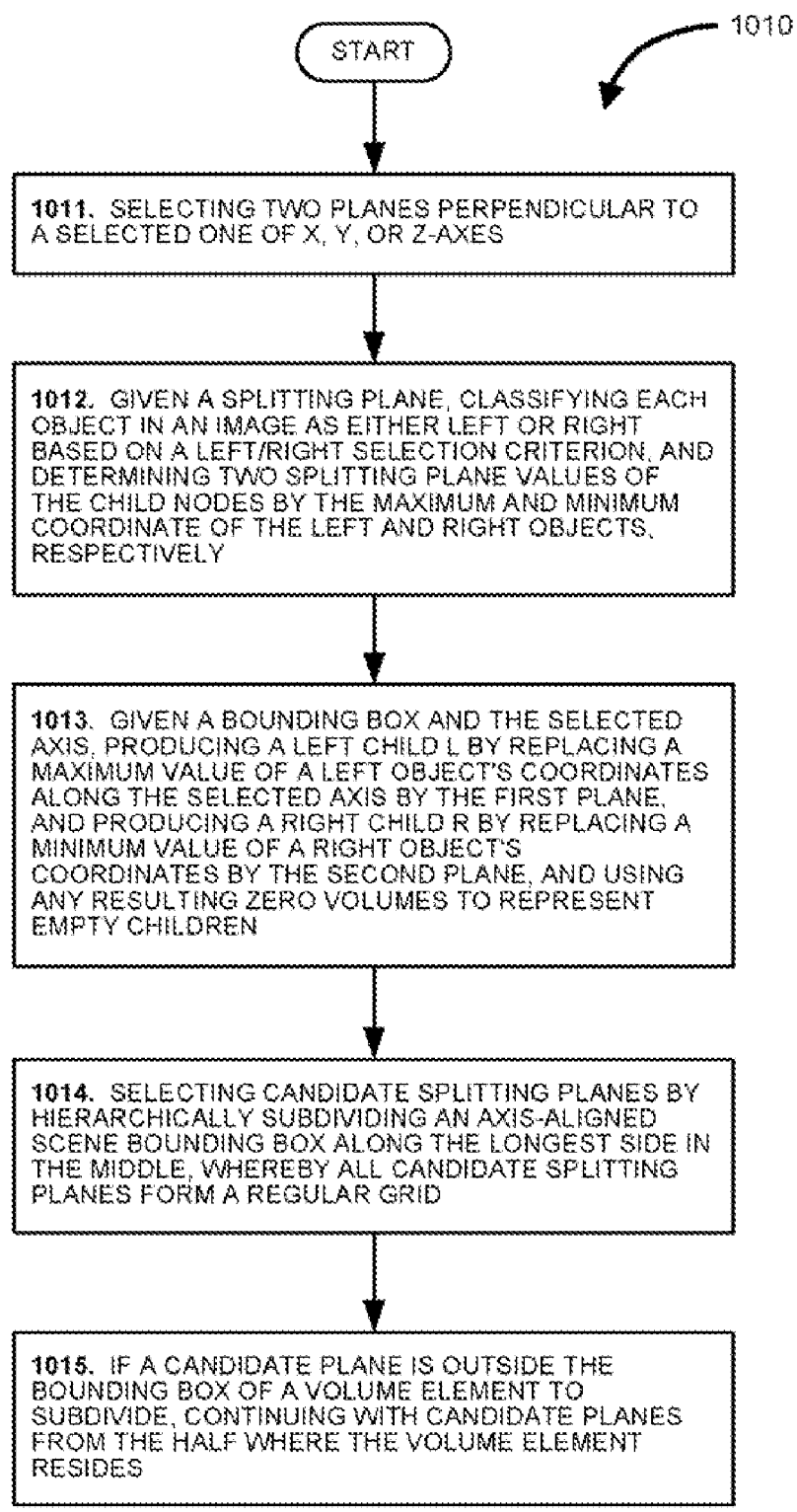

FIG. 44 shows a flowchart 1010 setting forth further aspects of constructing a hierarchical ray tracing acceleration data structure in step 1001 shown in FIG. 43.

In step 1011, two planes are selected that perpendicular to a selected one of x, y, or z-axes.

In step 1012, given a splitting plane, each object in an image is classified either left or right based on a left/right selection criterion, and two splitting plane values of the child nodes are determined by the maximum and minimum coordinate of the left and right objects, respectively.

In step 1013, given a bounding box and the selected axis, a left child L results from replacing a maximum value of a left object's coordinates along the selected axis by the first plane, and a right child R results from replacing a minimum value of a right object's coordinates by the second plane. Any resulting zero volumes are used to represent empty children.

In step 1014, splitting planes are determined by selecting candidate splitting planes by hierarchically subdividing an axis-aligned scene bounding box along the longest side in the middle, whereby all candidate splitting planes form a regular grid.

In step 1015, if a candidate plane is outside the bounding box of a volume element to subdivide, the process is continued with candidate planes from the half where the volume element resides.

FIG. 45 is a schematic block diagram of processing modules 122 within a computer 102 in accordance with one process of the invention. As shown in FIG. 45, the computer 102, or other processing device, when operating in conjunction with the present invention, contains some or all of the processing modules and/or other components shown therein. These modules correspond to and execute the method aspects shown in FIGS. 43 and 44. Such method aspects may be implemented by those skilled in the art using known computer operating system and applications programming techniques.

FIG. 46 is a schematic block diagram of software product modules 124 within a disk (removable or non-removable) or other storage element 120 in a computer or other processing device in accordance with the invention. As shown in FIG. 46, disk or other storage device 120, whether removable or non-removable, can contain computer program code executable by a conventional computing device to implement the method aspects of the invention, such as those shown in FIGS. 43 and 44.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method, executable in a computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of points in a scene as recorded on an image plane of a simulated camera, the computer being operable to generate pixel values for an image using a ray-tracing methodology, the ray-tracing methodology comprising the use of a ray tree and an associated ray tracing data structure, the ray tree including at least one ray shot from the pixel into a scene along a selected direction, the ray-tracing methodology further comprising the calculating of the intersections of rays and surfaces of objects in the scene, and the ray-tracing being determined in response to the results of processing of objects in an image, the method comprising:

constructing a hierarchical ray tracing acceleration data structure comprising a tree structure, the nodes of which are generated utilizing a bounding interval hierarchy based on defining an axis-aligned scene bounding box and two parallel planes to partition a set of objects in a scene into left objects and right objects, and matching split planes to object bounding boxes, wherein the two planes are perpendicular to a selected one of x, y, or z-axes, wherein, given a splitting plane, each object in an image is classified either left or right based on a left/right selection criterion, and two splitting plane values of the child nodes are determined by the maximum and minimum coordinate of the left and right objects, respectively, wherein, given a bounding box and the selected axis, a left child L results from replacing a maximum value of a left object's coordinates along the selected axis by the first plane, and a right child R results from replacing a minimum value of a right object's coordinates by the second plane, and wherein any resulting zero volumes are used to represent empty children, wherein splitting planes are determined by:

(a) selecting candidate splitting planes by hierarchically subdividing an axis-aligned scene bounding box along the longest side in the middle, wherein all candidate splitting planes form a regular grid, (b) if a candidate plane is outside the bounding box of a volume element to subdivide, continuing with candidate planes from the half where the volume element resides, and further comprising:

(a) recursively partitioning the bounding box into object bounding boxes, (b) if a split plane candidate separates objects without overlap, fitting the resulting split planes to the objects on the left and right, thereby maximizing empty space, and (c) terminating the recursion when no more than a predetermined number of objects remains; and wherein:

A. the left/right selection criterion comprises, given a splitting plane, classifying each object in an image either left or right depending on which side of the plane it extends most; and B. the construction of the hierarchical ray tracing acceleration data structure is based on bucket sorting, and comprises hierarchical execution of:

(a) computing a scene bounding box and average object size to determine resolution of an ordered, regular grid for partitioning space, or alternatively, using a user-specified resolution, (b) allocating a counter for each grid cell, (c) initializing all counters, each corresponding to a respective grid cell, to zero, (d) selecting a point for each object to increment the respective counter for the grid cell containing the selected point, (e) transforming counter values to offset values by replacing each counter value by the sum of values of all previous counters, (f) allocating a global object index array, (g) using the offset values to sort the objects into buckets, using for each respective object the corresponding point selected for incrementing the counter for the grid cell containing that point, and (h) for each bucket, computing the bounding box of the objects it contains.

2. The method of claim 1 wherein:

inner nodes of the tree structure are described by the two clipping planes and a pointer to a pair of children.

3. The method of claim 2 wherein split plane candidates are not adapted to bounding boxes of the inner nodes, but are determined by a global bounding box of the scene, so that bounding boxes are maintained as cubic as possible throughout the hierarchy.

4. The method of claim 1 wherein all nodes are aligned on selected byte-based boundaries such that the lower bits of the children-pointer can be used to indicate the axis or a leaf.

5. The method of claim 4 wherein leaf nodes consist of a multiple-bit pointer to the referenced objects and their overall number.

6. The method of claim 1 wherein it is possible for a ray to not intersect any child if the corresponding valid ray segment is between two non-overlapping children, and wherein processing this additional case implicitly skips empty leaves, such that empty leaves need not be stored.

7. The method of claim 6 wherein as soon as an intersection is determined, branches of the hierarchy tree can be pruned if they represent volume elements further away than the current intersection.

8. The method of claim 1 further comprising constructing the hierarchical acceleration data structure only where rays traverse or where geometry is visible to the ray.

9. The method of claim 8 wherein, since object sorting is done in place, only a flag is required to mark volume elements that have not yet been subdivided, and wherein, upon traversal of a ray, subdivision is performed if the flag is set.

10. The method of claim 9 further comprising subdividing a node of the hierarchical acceleration data structure completely if all objects contained in it fit into a dedicated memory cache.

11. The method of claim 1 further comprising tracing arrays of rays.

12. The method of claim 8, further comprising:

determining whether the bounding box of a bundle of rays lies on one side of a splitting plane or intersects the splitting plane; and if the box lies on one side of the splitting planes identified by the inner node of the tree, using this branch for further traversal;

upon encountering a leaf node or a plane that intersects the ray bounding box, identifying this node as the common entry node for the bundle of rays, and then, instead of traversing the rays from the root node of the acceleration data structure, starting traversal from the entry node.

13. The method of claim 11 further comprising utilizing frustum ray culling techniques in connection with the bounding interval hierarchy.

14. The method of claim 1, further comprising:
configuring a processing and memory structure in accordance with the foregoing method, the processing and memory structure being operable to provide:
pre-processing by sorting image triangles into buckets and storing corresponding bucket values on a storage device,
for rendering, creating a top-level bounding interval hierarchy out of the buckets, without needing to construct the tree for the triangles immediately, and wherein each bucket that is intersected by a ray creates its own tree utilizing on-demand creation of the tree,
wherein the bucket's triangles and the acceleration data structure are stored in a cache of either dynamic or fixed user-defined size,
wherein the bucket with the largest number of triangles defines the maximum memory footprint.

15. The method of claim 1, wherein memory required can be bounded in advance, linearly in the number of objects to be ray traced.

16. The method of claim 1, further comprising using only one clipping plane.

17. The method of claim 1, further comprising using four clipping planes.

18. The method of claim 1, further comprising constructing the construction of the hierarchical ray tracing acceleration data structure only on demand.

19. In a computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of points in a scene as recorded on an image plane of a simulated camera, the computer being operable to generate pixel values for an image using a ray-tracing methodology, the ray-tracing methodology comprising the use of a ray tree and an associated ray tracing data structure, the ray tree including at least one ray shot from the pixel into a scene along a selected direction, the ray-tracing methodology further comprising the calculating of the intersections of rays and surfaces of objects in the scene, and the ray-tracing being determined in response to the results of processing of objects in an image, a computer software product comprising:
computer-executable code stored in computer-readable form on a computer-readable medium, the computer software product further comprising computer- executable code stored on the computer-readable medium and executable by the computer to enable the computer to construct a hierarchical ray tracing acceleration data structure comprising a tree structure, the nodes of which are generated utilizing a bounding interval hierarchy based on defining an axis-aligned scene bounding box and two parallel planes to partition a set of objects in a scene into left objects and right objects, and matching split planes to object bounding boxes,
wherein the two planes are perpendicular to a selected one of x, y, or z-axes,
wherein, given a splitting plane, each object in an image is classified either left or right based on a left/right selection criterion, and two splitting plane values of the child nodes are determined by the maximum and minimum coordinate of the left and right objects, respectively,
wherein, given a bounding box and the selected axis, a left child L results from replacing a maximum value of a left object's coordinates along the selected axis by the first plane, and a right child R results from replacing a minimum value of a right object's coordinates by the second plane, and wherein any resulting zero volumes are used to represent empty children,
wherein splitting planes are determined by:
(a) selecting candidate splitting planes by hierarchically subdividing an axis-aligned scene bounding box along the longest side in the middle, wherein all candidate splitting planes form a regular grid,
(b) if a candidate plane is outside the bounding box of a volume element to subdivide, continuing with candidate planes from the half where the volume element resides,
and further comprising;
(a) recursively partitioning the bounding box into object bounding boxes,
(b) if a split plane candidate separates objects without overlap, fitting the resulting split planes to the objects on the left and right, thereby maximizing empty space, and
(c) terminating the recursion when no more than a predetermined number of objects remains; and wherein:
A. the left/right selection criterion comprises, given a splitting plane, classifying each object in an image either left or right depending on which side of the plane it extends most; and
B. the construction of the hierarchical ray tracing acceleration data structure is based on bucket sorting, and comprises hierarchical execution of:
(a) computing a scene bounding box and average object size to determine resolution of an ordered, regular grid for partitioning space, or alternatively, using a user-specified resolution,
(b) allocating a counter for each grid cell,
(c) initializing all counters, each corresponding to a respective grid cell, to zero,
(d) selecting a point for each object to increment the respective counter for the grid cell containing the selected point,
(e) transforming counter values to offset values by replacing each counter value by the sum of values of all previous counters,
(f) allocating a global object index array,
(g) using the offset values to sort the objects into buckets, using for each respective object the corresponding point selected for incrementing the counter for the grid cell containing that point, and
(h) for each bucket, computing the bounding box of the objects it contains.

20. In a computer graphics system comprising a computer and a display element, the display element being operable to display a human-perceptible image in response to a display-controlling electrical output from the computer, the computer being operable to generate the display-controlling electrical output based on calculations of pixel values for pixels in the image, respective pixel values being representative of points in a scene as recorded on an image plane of a simulated camera, the computer being operable to generate pixel values for an image using a ray-tracing methodology, the ray-tracing methodology comprising the use of a ray tree and an associated ray tracing data structure, the ray tree including at least one ray shot from the pixel into a scene along a selected direction, the ray-tracing methodology further comprising the calculating of the intersections of rays and surfaces of objects in the scene, and the ray-tracing being determined in response to the results of processing of objects in an image, a sub-system comprising:

means for constructing a hierarchical ray tracing acceleration data structure comprising a tree structure, the nodes of which are generated utilizing a bounding interval hierarchy based on defining an axis-aligned scene bounding box and two parallel planes to partition a set of objects in a scene into left objects and right objects, and matching split planes to object bounding boxes, wherein the two planes are perpendicular to a selected one of x, y, or z-axes, wherein, given a splitting plane, each object in an image is classified either left or right based on a left/right selection criterion, and two splitting plane values of the child nodes are determined by the maximum and minimum coordinate of the left and right objects, respectively, wherein, given a bounding box and the selected axis, a left child L results from replacing a maximum value of a left object's coordinates along the selected axis by the first plane, and a right child R results from replacing a minimum value of a right object's coordinates by the second plane, and wherein any resulting zero volumes are used to represent empty children, wherein splitting planes are determined by:

(a) selecting candidate splitting planes by hierarchically subdividing an axis-aligned scene bounding box alone the longest side in the middle, wherein all candidate splitting planes form a regular grid, (b) if a candidate plane is outside the bounding box of a volume element to subdivide, continuing with candidate planes from the half where the volume element resides and further comprising:

(a) recursively partitioning the bounding box into object bounding boxes, (b) if a split plane candidate separates objects without overlap, fitting the resulting split planes to the objects on the left and right, thereby maximizing empty space, and (c) terminating the recursion when no more than a predetermined number of objects remains; wherein:

A. the left/right selection criterion comprises, given a splitting plane, classifying each object in an image either left or right depending on which side of the plane it extends most; and B. the construction of the hierarchical ray tracing acceleration data structure is based on bucket sorting, and comprises hierarchical execution of:

(a) computing a scene bounding box and average object size to determine resolution of an ordered, regular grid for partitioning space, or alternatively, using a user-specified resolution, (b) allocating a counter for each grid cell, (c) initializing all counters, each corresponding to a respective grid cell, to zero, (d) selecting a point for each object to increment the respective counter for the grid cell containing the selected point, (e) transforming counter values to offset values by replacing each counter value by the sum of values of all previous counters, (f) allocating a global object index array, (g) using the offset values to sort the objects into buckets, using for each respective object the corresponding point selected for incrementing the counter for the grid cell containing that point, and (h) for each bucket, computing the bounding box of the objects it contains.

\* \* \* \* \*